United States Patent
Akiyama et al.

(10) Patent No.: US 10,332,690 B2
(45) Date of Patent: Jun. 25, 2019

(54) METHOD OF PRODUCING COMPOSITE PHOTOCATALYST AND COMPOSITE PHOTOCATALYST

(71) Applicants: MITSUBISHI CHEMICAL CORPORATION, Chiyoda-ku (JP); The University of Tokyo, Bunkyo-ku (JP); Japan Technological Research Association of Artificial Photosynthetic Chemical Process, Chiyoda-ku (JP)

(72) Inventors: Seiji Akiyama, Kanagawa (JP); Kazunari Domen, Tokyo (JP)

(73) Assignees: MITSUBISHI CHEMICAL CORPORATION, Chiyoda-ku (JP); The University of Tokyo, Bunkyo-ku (JP); Japan Technological Research Association of Artificial Photosynthetic Chemical Process, Chiyoda-ku (JP)

( * ) Notice: Subject to any disclaimer, the term of this patent is extended or adjusted under 35 U.S.C. 154(b) by 104 days.

(21) Appl. No.: 15/476,116

(22) Filed: Mar. 31, 2017

(65) Prior Publication Data

US 2017/0250031 A1    Aug. 31, 2017

Related U.S. Application Data

(63) Continuation of application No. PCT/JP2015/082804, filed on Nov. 20, 2015.

(30) Foreign Application Priority Data

Nov. 21, 2014  (JP) ................ 2014-236221
Jan. 27, 2015  (JP) ................ 2015-013006
Aug. 18, 2015  (JP) ................ 2015-161131

(51) Int. Cl.
*H01G 9/20*  (2006.01)
*B01J 37/34*  (2006.01)
(Continued)

(52) U.S. Cl.
CPC ............ *H01G 9/2036* (2013.01); *B01J 27/24* (2013.01); *B01J 35/02* (2013.01); *B01J 37/34* (2013.01);
(Continued)

(58) Field of Classification Search
None
See application file for complete search history.

(56) References Cited

U.S. PATENT DOCUMENTS

| | | | |
|---|---|---|---|
| 5,759,948 A | 6/1998 | Takaoka et al. | |
| 2006/0283701 A1* | 12/2006 | Li | B01J 27/04 204/157.52 |
| 2016/0028092 A1 | 1/2016 | Kudo et al. | |

FOREIGN PATENT DOCUMENTS

| | | | |
|---|---|---|---|
| CN | 102125858 A | * | 7/2011 |
| JP | 7-88370 | | 4/1995 |

(Continued)

OTHER PUBLICATIONS

Maeda et al, effect of post-calcination on photocatalytic activity of (Ga1-xZnx)(N1-xOx) (Ga1-xZnx)(N1-xOx), journal of catalytsis, 254, pp. 198-204 (Year: 2008).*

(Continued)

*Primary Examiner* — Melvin C. Mayes
*Assistant Examiner* — Stefanie J Cohen
(74) *Attorney, Agent, or Firm* — Oblon, McClelland, Maier & Neustadt, L.L.P.

(57) ABSTRACT

The present invention provides a method of producing a composite photocatalyst having a remarkable water splitting activity, which is capable of efficiently loading a co-catalyst (Continued)

having a small particle size in a highly dispersed manner on a surface of an optical semiconductor. According to the present invention, the method of producing a composite photocatalyst from a plurality types of optical semiconductors includes a step of heating a solid-liquid mixture containing a solvent, a co-catalyst or a co-catalyst source, and a plurality of types of optical semiconductors by irradiating the solid-liquid mixture with microwave.

20 Claims, 26 Drawing Sheets

(51) Int. Cl.
    *B01J 27/24*     (2006.01)
    *B01J 35/02*     (2006.01)
    *C25B 1/04*     (2006.01)
    *C01B 3/04*     (2006.01)

(52) U.S. Cl.
    CPC ............... *C01B 3/042* (2013.01); *C25B 1/04* (2013.01); *Y02E 60/364* (2013.01); *Y02E 60/366* (2013.01)

(56) References Cited

FOREIGN PATENT DOCUMENTS

| | | |
|---|---|---|
| JP | 7-303835 | 11/1995 |
| JP | 10-244164 | 9/1998 |
| JP | 2003-260356 | 9/2003 |
| JP | 2004-57878 | 2/2004 |
| JP | 2012-50913 | 3/2012 |
| JP | 2012-187520 | 10/2012 |
| JP | 2013-180245 | 9/2013 |
| WO | WO 2014/136783 | 9/2014 |

OTHER PUBLICATIONS

English translation of CN102125858A (Year: 2011).*
SocMan Ho-Kimura, et al., "Enhanced photoelectrochemical water splitting by nanostructured $BiVO_4$-$TiO_2$ composite electrodes", Journal of Chemistry A, 2014, 6 pgs.
Zheng Wang, et al., "In situ chemical reduction of the $Ta_3N_5$ quantum dots coupled TaON hollow spheres heterojunction photocatalyst for water oxidation", Journal of Materials Chemistry, 2012, 7 pgs.
Liyuan Mao, et al., "Microwave-assisted deposition of metal sulfide/ oxide nanocrystals onto a 3D hierarchical flower-like $TiO_2$ nanostructure with improved photocatalytic activity", Journal of Materials Chemistry A, The Royal Society of Chemistry, 2013, 4 pgs.
Michinori Matsukawa, et al., "Enhancing Photocatalytic Activity of $LaTiO_2N$ by Removal of Surface Reconstruction Layer", Nano Letters, American Chemical Society, 2014, 4 pgs.
International Search Report dated Feb. 9, 2016 in PCT/JP2015/ 082804 filed on Nov. 20, 2015 (with English translation).
Written Opinion dated Feb. 9, 2016 in PCT/JP2015/082804 filed on Nov. 20, 2015.
Jun Xing, et al. "Inorganic Photocatalysts for Overall Water Splitting", Chemistry Asian Journal, 2012, 16 pgs.
Anthony Harriman, et al., "Metal Oxides as Heterogeneous Catalysts for Oxygen Evolution under Photochemical Conditions", J. Chem. Soc., Faraday Trans. 1, 1988, 12 pgs.
Sayoko Shironita, et al., "Application of Microwave-Assisted Deposition for the Synthesis of Noble Metal Particles on Ti-Containing Mesoporous Silica", Catal Lett, 2009, 4 pgs.

* cited by examiner

METHOD OF PRODUCING COMPOSITE PHOTOCATALYST AND COMPOSITE PHOTOCATALYST

TECHNICAL FIELD

The present invention relates to a method of producing a composite photocatalyst which is capable of producing hydrogen and/or oxygen through water splitting reaction by utilizing sunlight.

BACKGROUND ART

In recent years, a technique of decomposing water by using a photocatalyst and solar energy so as to producing hydrogen and oxygen has attracted attention. The photocatalyst which has been currently studied is ordinarily obtained by loading a co-catalyst on a surface of an optical semiconductor such as an oxide, an oxynitride, or a nitride. It is possible to improve the activity of the photocatalyst by loading the co-catalyst (for example, refer to NPLs 1 and 2).

As a method of loading the co-catalyst on the surface of the optical semiconductor, an impregnation loading method has been known (for example, refer to PTL 1). Various methods in addition to the impregnation loading method have been proposed (for example, refer to NPLs 3 and 4).

On the other hand, when the photocatalyst is formed by using the optical semiconductor, the surface of the optical semiconductor is subjected to an acid treatment by using an inorganic acid in advance (refer to PTLs 2 to 4, NPL 5, and the like). For example, in PTL 2, an H-type layered perovskite photocatalyst is obtained through the acid treatment performed on an auribilian phase compound by using an inorganic acid such as a hydrochloric acid. In addition, in PTL 3, the photocatalytic activity is improved through the acid treatment performed on the photocatalyst represented by General formula (I): $ABCO_4$ (A represents silver, B represents at least one or more types of elements selected from the group consisting of the lanthanoid and yttrium, and C represents at least one or more types of elements selected from a Group IVa element) by using a nitric acid having a low concentration. In addition, in PTL 4, the photocatalytic activity is improved through a mineral acid treatment (inorganic acid treatment) performed on a titanium oxide. Further, in NPL 5, the water splitting activity in a case where the photocatalyst is obtained by bringing aqua regia into contact with the surface of the optical semiconductor for 15 seconds is improved.

CITATION LIST

Patent Literature

[PTL 1] JP-A-2012-050913
[PTL 2] JP-A-2003-260356
[PTL 3] JP-A-10-244164
[PTL 4] JP-A-7-303835

Non Patent Literature

[NPL 1] Chem. Asian. J., 2012, 7, 642-657
[NPL 2] J. Chem. Soc., Faraday Trans. 1, 1988, 84(8), 2795-2806
[NPL 3] Catal. Lett., 2009, 129, 404
[NPL 4] J. Mat. Chem., 2013, 1, 8101
[NPL 5] Nano. Lett., 2014, 14, 1038-1041

SUMMARY OF INVENTION

Technical Problem

However, in the impregnation loading method disclosed in PTL 1, it was difficult to control the particle size of the co-catalyst loaded on the surface of the optical semiconductor, and it was difficult to load the co-catalyst on the surface of the optical semiconductor in a highly dispersed manner. Further, in the method disclosed in NPLs 3 and 4, manufacturing processes and manufacturing equipment were complicated. From this circumstance, it is possible to control the particle size of the co-catalyst and to load the co-catalyst in a highly dispersed manner without requiring complicated processes and equipment, and thus a method of producing a photocatalyst capable of improving the water splitting activity has been required.

In addition, as disclosed in PTLs 2 to 4 and NPL 5, in a case where the acid treatment of the optical semiconductor is performed by using an inorganic acid, the inorganic acid enters the optical semiconductor in a short time, and thus the optical semiconductor corrodes, thereby rather deteriorating the photocatalytic activity in some cases. In addition, there is a concern that the inorganic acid is easily immersed into the optical semiconductor, and the acid treatment may be unevenly performed. In actual, as described in NPL 5, in a case where the time for the acid treatment is longer than 15 seconds, the water splitting activity is deteriorated. That is, in a case of using an inorganic acid, it was difficult to control the acid treatment. In addition, the inorganic acid having high volatility, and thus when the inorganic acid is reused after performing the acid treatment, it was difficult to collect. On the other hand, in a case of using a carboxylic acid (particularly, a monocarboxylic acid and a dicarboxylic acid), the acid treatment of the optical semiconductor is not properly performed in some cases, and thus it was not always possible to improve the water splitting activity. From this circumstance, a method of producing an optical semiconductor and a method of producing a photocatalyst which is capable of improving the water splitting activity by properly performing the acid treatment on the surface of the optical semiconductor have been required. In this regard, an object of the invention is to provide a method of producing a photocatalyst having excellent water splitting activity.

For example, the present invention provides a photocatalyst which improves water splitting activity and a method of producing the same by efficiently loading a co-catalyst having a small particle size on a surface of an optical semiconductor in a highly dispersed manner, and a method of loading a co-catalyst on the photocatalyst.

In addition, the present invention provides a method of producing an optical semiconductor and a method of producing a photocatalyst in which water splitting activity is improved through a proper acid treatment performed on a surface of the optical semiconductor by using a method of easily controlling acid treatment.

Solution to Problem

As a result of intensive research by the present inventors so as to solve the above problem, the following findings were obtained.

(1) It is possible to produce a composite photocatalyst in which water splitting activity is improved by compositing a plurality of types of different optical semiconductors with a co-catalyst in a solution by using the heat from microwave.

(2) It is possible to load the co-catalyst by heating with the microwave in the closed system, without complicated process it is possible to load the co-catalyst having a small particle size on the optical semiconductor in a highly dispersed manner. In addition, the photocatalyst produced by using such a way has water splitting activity improved more than the photocatalyst in the related art.

(3) In a case where a solution of polyorganic acid is brought into contact with a predetermined surface of the optical semiconductor, the polyorganic acid does not easily enter the optical semiconductor, and the surface of the optical semiconductor is polished so as to be gradually dissolved. That is, the acid treatment is easily controlled, and thus it is possible to properly perform the acid treatment on the entire surface of the optical semiconductor without unevenness. With this, it is possible to properly improve the water splitting activity by properly removing a surface defect, an interface defect, or the like of the optical semiconductor.

(4) In a case where a solution of organic sulfonic acid is brought into contact with a predetermined surface of the optical semiconductor, it is possible to gradually dissolving the surface of the optical semiconductor without excessively causing corroding the optical semiconductor. That is, the acid treatment is easily controlled, and thus it is possible to properly perform the acid treatment on the entire surface of the optical semiconductor without unevenness. With this, it is possible to properly improve the water splitting activity by properly removing a surface defect, an interface defect, or the like of the optical semiconductor.

According to a first aspect of the invention based on the above-description (1), the above-described object can be achieved.

In other words, the first aspect of the present invention is a method of producing a composite photocatalyst from a plurality of types of optical semiconductors, and the method includes a heating step of heating a solid-liquid mixture containing a solvent, a co-catalyst or a co-catalyst source and the plurality of types of optical semiconductors by irradiating the solid-liquid mixture with microwave.

The "optical semiconductor" means a semiconductor which can produce a hole and an electron by absorbing light.

The "co-catalyst source" is a material (component, element, and ion) which can be a co-catalyst by being heated together with the optical semiconductor in the liquid.

The "microwave" means an electromagnetic wave at a frequency in a range of 300 MHz to 30 GHz.

In the first aspect of the present invention, before the microwave irradiation, the co-catalyst source in the solid-liquid mixture is preferably present in a state of being dissolved in a solvent.

In addition, in the first aspect of the present invention, before the microwave irradiation, the co-catalyst and the optical semiconductor in the solid-liquid mixture are present as a solid in the solvent, and the co-catalyst may be in a state of being loaded on the optical semiconductor.

In this case, according to the first aspect of the present invention, as a pre-step of the heating step, it is possible to include, for example, a first loading step of loading a co-catalyst on a first optical semiconductor by heating with the microwave in a state where the first optical semiconductor is brought into contact with a solution in which a co-catalyst source is dissolved; a second loading step of loading a co-catalyst on a second optical semiconductor by heating with the microwave in a state where the second optical semiconductor is brought into contact with the solution in which the co-catalyst source is dissolved; and a mixing step of mixing the first optical semiconductor on which the co-catalyst is loaded and the second optical semiconductor on which the co-catalyst is loaded, into the solvent so as to obtain the above-described solid-liquid mixture.

In the first aspect of the present invention, it is preferable that at least one of the plurality of types of optical semiconductors be an oxide, a nitride, an oxynitride, a chalcogenide, or an oxychalcogenide which contains one or more elements selected from the group consisting of Ti, V, Ga, Zn, Bi, Nb, and Ta.

In the first aspect of the present invention, it is preferable that at least one of the plurality of types of optical semiconductors be $BaTaO_2N$, $BaNbO_2N$, $TaON$, $Ta_3N_5$, $LaTiO_2N$, $BiVO_4$, GaN:ZnO, or a partial substitution thereof. The "partial substitution thereof" means some of the constituent elements of the compound are substituted by a doping element.

In the first aspect of the present invention, it is preferable that the co-catalyst or the co-catalyst source contain Co or Co-ion. The co-catalyst or the co-catalyst source may be a material containing a simple substance of Pt or a compound containing Pt.

In the first aspect of the present invention, it is preferable that the solvent be water, alcohols, or a mixed solvent thereof.

In the heating step according to the first aspect of the present invention, it is preferable that the solid-liquid mixture be heated by being irradiated with the microwave in a closed system.

The phrase "in closed system" means "in a system" in which the pressure rises more than outside the system as the temperature rises in a case where the temperature of the solution in the system exceeds the boiling point outside the system.

In the first loading step and the second loading step according to the first aspect of the present invention, it is preferable that the microwave irradiation be performed in the closed system.

In the case where the heating step, the first loading step, and the second loading step are performed in the closed system, the pressure in the closed system is preferably higher than the pressure outside the system.

In the first aspect of the present invention, according to the first aspect of the present invention, it is preferable that a pre-step of the heating step include an organic acid contact step of bringing a solution of one or more types organic acids containing a polyorganic acid into contact with a surface of an oxide, an oxynitride, or a nitride containing one or more elements selected from Ti, V, Ga, Ge, La, Nb, and Ta, and a collecting step of collecting the oxide, the oxynitride, or the nitride which remains as a solid content after the organic acid contact step, and the collected solid contents be used as the above-described optical semiconductor.

The term of "polyorganic acid" includes an oligomer of an organic acid in addition to a polymer of an organic acid. Here, the "oligomer" in the present invention has a degree of polymerization of equal to or greater than 10.

According to the first aspect of the present invention, it is preferable that each of pre-steps of the first loading step and the second loading step include an organic acid contact step of bringing a solution of one or more types organic acids containing a polyorganic acid into contact with a surface of an oxide, an oxynitride, or a nitride containing one or more elements selected from Ti, V, Ga, Ge, Nb, La, and Ta; and a collecting step of collecting the oxide, the oxynitride, or the nitride which remains as a solid content after the organic acid contact step, and the collected solid contents be used as the first optical semiconductor and the second optical semiconductor.

In the first aspect of the present invention, it is preferable that the organic acid be a polysulfonic acid.

In the first aspect of the present invention, it is preferable that the organic acid have an aryl group.

In the first aspect of the present invention, it is preferable that the organic acid have a weight average molecular weight in a range of 1,000 to 1,000,000.

The first aspect of the present invention has an aspect of a composite photocatalyst. That is, the composite photocatalyst comprises a plurality of types of optical semiconductors on which the co-catalyst is loaded, in which the co-catalyst is present on the surfaces of the plurality of types of the optical semiconductors, and is present in a state of being interposed between bonding surfaces of the plurality of types of the optical semiconductors, or is present in a state of covering the optical semiconductor.

The meaning "being present in a state of being interposed between bonding surfaces of the plurality of types of the optical semiconductors, or being present in a state of covering the optical semiconductor" is, that is, a state where the plurality of types of the optical semiconductors are bonded to each other with the co-catalyst interposed therebetween. The term "bond" does not merely mean "contact", but means to be fixed on the surface of the optical semiconductor. Further, the term "cover" means that the layered co-catalyst is present along the shape of the surface of the optical semiconductor, and a case where the co-catalyst particles are "aggregated" on the surface of the optical semiconductor is not included in the case of using the term "cover".

In the composite photocatalyst according to the first aspect of the present invention, it is preferable that at least one of the plurality of types of optical semiconductors be an oxide, a nitride, an oxynitride, a chalcogenide, or an oxychalcogenide, each of which contains one or more elements selected from the group consisting of Ti, V, Ga, Zn, Bi, Nb, and Ta.

In the composite photocatalyst according to the first aspect of the present invention, it is preferable that at least one of the plurality of types of optical semiconductors be $BaTaO_2N$, $BaNbO_2N$, TaON, $Ta_3N_5$, $LaTiO_2N$, $BiVO_4$, GaN:ZnO, or a partial substitution thereof.

On the other hand, in the composite photocatalyst according to the first aspect of the present invention, it is preferable that the co-catalyst contain Co. In addition, the co-catalyst may be a material containing a simple substance of Pt or a compound containing Pt.

According to a second aspect of the invention based on the above-description (2), the above-described object can be achieved.

In other words, the second aspect of the present invention is a method of producing a photocatalyst, and the method includes a step of heating with a microwave while bringing an optical semiconductor into contact with a solution in which a co-catalyst source is dissolved, in a closed system.

According to the second aspect of the present invention, it is preferable that pressure in the closed system be higher than pressure outside the system due to the heat with the microwave. With this, it is possible to more efficiently load the co-catalyst on the surface of the optical semiconductor.

According to the second aspect of the present invention, it is preferable that the optical semiconductor be an oxide, a nitride or an oxynitride, or a chalcogenide or an oxychalcogenide which contains one or more elements selected from the group consisting of Ti, V, Ga, Zn, Bi, Nb, and Ta.

According to the second aspect of the present invention, it is preferable that optical semiconductor be $BaNbO_2N$, TaON, $Ta_3N_5$, $LaTiO_2N$, $SnNb_2O_6$, $BaTaO_2N$, $La_5Ti_2CuS_5O_7$, $BiVO_4$, GaN:ZnO, or a partial substitution thereof.

According to the second aspect of the present invention, it is preferable that the solution containing the co-catalyst source be a solution containing Co-ion. In addition, the co-catalyst source may be a material containing a simple substance of Pt or a compound containing Pt. In this case, as the co-catalyst, it is possible to load $CoO_x$ or Pt on the surface of the optical semiconductor.

According to the second aspect of the present invention, it is preferable that the solvent forming the solution containing the co-catalyst source be water, alcohols such as ethylene glycol, or a mixed solvent thereof.

Note that, the second aspect of the present invention has an aspect of a method of loading a co-catalyst. That is a method of loading the co-catalyst on the surface of the optical semiconductor by heating with the microwave while bringing the optical semiconductor into contact with the solution containing the co-catalyst source in the closed system.

In addition, the second aspect of the present invention has an aspect of a photocatalyst. That is, the photocatalyst in which the co-catalyst is loaded on the surface of the optical semiconductor has coverage per unit area of the optical semiconductor due to the co-catalyst is equal to or greater than 30%.

In this case, the particle size of the co-catalyst which is loaded on the surface of the optical semiconductor is preferably equal to or less than 20 nm.

According to a third aspect of the invention based on the above-descriptions (3) and (4), the above-described object can be achieved.

In other words, the third aspect of the present invention is a method of producing an optical semiconductor, and the method includes a first step of bringing a solution of at least one or more types organic acids containing a polyorganic acid into contact with a surface of an oxide, an oxynitride, or a nitride, each of which contains at least one or more elements selected from Ti, V, Ga, Ge, Nb, La, and Ta; and a second step of collecting the oxide, the oxynitride, or the nitride which remains as a solid content after the first step.

In addition, the third aspect of the present invention may be a method of producing an optical semiconductor, and the method includes a first step of bringing a solution of at least one or more types organic acids containing a sulfonic acid into contact with a surface of an oxide, an oxynitride, or a nitride, each of which contains at least one or more elements selected from Ti, V, Ga, Ge, Nb, La, and Ta; and a second step of collecting the oxide, the oxynitride, or the nitride which remains as a solid content after the first step.

According to the third aspect of the present invention, it is preferable that the organic acid be a polysulfonic acid.

According to the third aspect of the present invention, it is preferable that the organic acid have an aryl group.

According to the third aspect of the present invention, it is preferable that the organic acid have a weight average molecular weight in a range of 1,000 to 1,000,000.

According to the third aspect of the present invention, it is preferable that pKa of the solution be in a range of −4 to 4.

According to the third aspect of the present invention, it is preferable that the oxide, the oxynitride or the nitride be particulate or sheet-like.

The term "sheet-like" means a material having a thickness in a range of 1 nm to 10 and the material having a configuration in which a layered oxide or the like is formed on the surface of any member in addition to a configuration in which a sheet formed of the oxide or the like is independently provided. Examples of the configurations thereof include a configuration in which powder is layered on the surface of the substrate to form a layered structure having the aforementioned thickness, a configuration in which the powder is compacted and integrated to form a layered structure having the aforementioned thickness, a configuration in which the powder is sintered and integrated to form a layered structure having the aforementioned thickness, and a configuration in which a layered oxide, oxynitride, or nitride is formed on the surface of the substrate by forming a layer made of a precursor on the surface of the substrate and oxidizing or nitriding the aforementioned layer.

According to the third aspect of the present invention, it is preferable that the oxide, the oxynitride or the nitride be at least one or more types selected from $LaTiO_2N$, $CaNbO_2N$, $BaNbO_2N$, $SrNbO_2N$, $LaNbO_2N$, $Ta_3N_5$, $BaTaO_2N$, $BiVO_4$, $GaN:ZnO$, and $ZnGeN_2:ZnO$.

Note that, the third aspect of the present invention also has an aspect of a method of producing a photocatalyst. That is, the method of producing a photocatalyst includes a step of loading the co-catalyst on the surface of the optical semiconductor obtained by the method of producing an optical semiconductor according to the third aspect of the present invention.

Advantageous Effects of Invention

According to the present invention, it is possible to produce a photocatalyst having excellent water splitting activity.

BRIEF DESCRIPTION OF DRAWINGS

FIG. 3A is a schematic view of a step of obtaining a photocatalyst 20'*a*, and FIG. 3B is a schematic view of a step of obtaining a photocatalyst 20'*b*.

FIG. 4A is a schematic view of a step of obtaining a photocatalyst 20'*a*, and FIG. 4B is a schematic view of a step of obtaining a photocatalyst 20'*b*.

FIG. 7A illustrates an oxide or the like 201*a*, and FIG. 7B illustrates an oxide or the like 201*b*.

FIG. 9A is a TEM observation image, FIG. 9C is an enlarged image in which a part of FIG. 9A is enlarged, FIG. 9B is an image of elemental EDS mapping of the same field of view as in FIG. 9A, and FIG. 9D is an image of the elemental EDS mapping of the same field of view as FIG. 9C.

FIG. 11A is a TEM observation image, FIG. 11C is an enlarged image in which a part of FIG. 11A is enlarged, FIG. 11B is an image of elemental EDS mapping of the same field of view as in FIG. 11A, and FIG. 11D is an image of the elemental EDS mapping of the same field of view as FIG. 11C.

FIG. 15A corresponds to Example 2-2-1, and FIG. 15B corresponds to Comparative Example 2-2-1.

FIG. 18A corresponds to Example 2-3-1, and FIG. 18B corresponds to Comparative Example 2-3-1.

FIG. 21A illustrates the photocatalyst surface treated by the microwave, and FIG. 21B illustrates the photocatalyst surface treated by using the conventional method (impregnation loading method).

FIG. 24A is a HRTEM observation image, FIG. 24B is an enlarged image in which a part of FIG. 24A is enlarged, FIG. 24C is an enlarged image in which a part of FIG. 24B is enlarged, and FIG. 24D is a diffraction grating image incident from the [210] plane.

FIG. 25A is a HRTEM observation image, FIG. 25B is an enlarged image in which a part of FIG. 25A is enlarged, FIG. 25C is an enlarged image in which a part of FIG. 25B is enlarged, and FIG. 25D is a diffraction grating image incident from the [210] plane.

FIG. 26A is a HRTEM observation image, FIG. 26B is an enlarged image in which a part of FIG. 26A is enlarged, FIG. 26C is an enlarged image in which a part of FIG. 26B is enlarged, and FIG. 26D is a diffraction grating image incident from the [210] plane.

DESCRIPTION OF EMBODIMENTS

Figure 1:
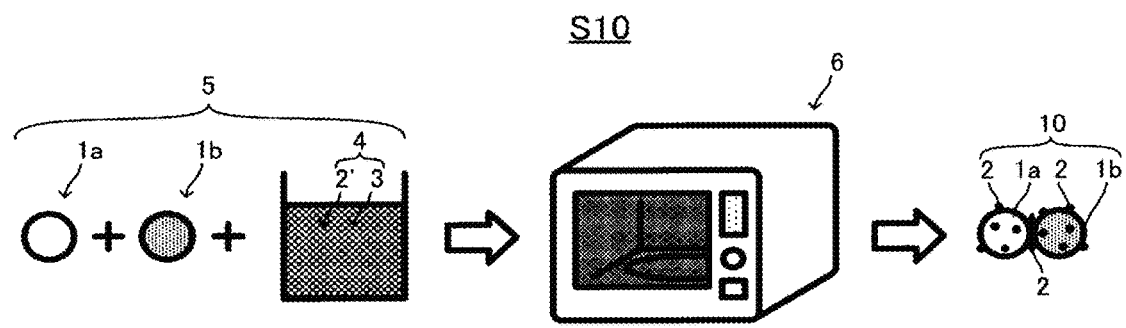
FIG. 1 is a schematic view illustrating a first embodiment of a first aspect of the present invention.

1. First Aspect of the Present Invention

1.1. Method of Producing Photocatalyst

A method of producing a photocatalyst according to the first aspect of the present invention is a method of producing a composite photocatalyst from the plurality of types of optical semiconductors, and the method includes a heating step of heating a solid-liquid mixture containing a solvent, a co-catalyst or a co-catalyst source, and the plurality of types of the optical semiconductors by irradiating a solid-liquid mixture with microwave.

(Optical Semiconductor)

The optical semiconductor used in the first aspect of the present invention may be a semiconductor which is capable of producing a hole and an electron by absorbing light, and capable of catalyzing photolytic water splitting reaction. The optical semiconductor is preferably a compound containing a metal element (including a metalloid element) which can be d0 or d10 of metal ion, and is further preferably a compound containing d0 or d10 of transition metal. Examples of the metal element which can be d0 of metal ion include Ti, Zr, Nb, Ta, V, W, and La. In addition, examples of the metal element which can be d10 of metal ion include Zn, Ga, Ge, In, Sn, Sb, Pb, and Bi. Preferred examples thereof include an oxide, a nitride, an oxynitride, a chalcogenide, or an oxychalcogenide which contains one or more elements selected from the group consisting of Ti, V, Ga, Zn, Bi, Nb, and Ta. Specifically, examples thereof include a titanium-containing oxide such as $TiO_2$, $CaTiO_3$, $SrTiO_3$, $Sr_3Ti_2O_7$, $Sr_4Ti_3O_7$, $K_2La_2Ti_3O_{10}$, $Rb_2La_2Ti_3O_{10}$, $Cs_2La_2Ti_3O_{10}$, $CsLaTi_2NbO_{10}$, a $L_2TiO_5$, $La_2Ti_3O_9$, $La_2Ti_2O_7$, $La_2Ti_2O_7$:Ba, $KaLaZr_{0.3}Ti_{0.7}O_4$, $La_4CaTi_5O_7$, $KTiNbO_5$, $Na_2Ti_6O_{13}$, $BaTi_4O_9$, $Gd_2Ti_2O_7$, $Y_2Ti_2O_7$, $Na_2Ti_3O_7$, $K_2Ti_2O_5$, $K_2Ti_4O_9$, $Cs_2Ti_2O_5$, $H^+$—$Cs_2Ti_2O_5$ ($H^+$—Cs represents that Cs is ion-exchanged with $H^+$. The same applies hereafter), $Cs_2Ti_5O_{11}$, $Cs_2Ti_6O_{13}$, $H^+$—$CsTiNbO_5$, $H^+$—$CsTi_2NbO_7$, $SiO_2$-pillared $K_2Ti_4O_9$, $SiO_2$-pillared $K_2Ti_{2.7}Mn_{0.3}O_7$, $BaTiO_3$, $BaTi_4O_9$, and $AgLi_{1/3}Ti_{2/3}O_2$; a titanium-containing oxynitride such as $LaTiO_2N$; a titanium-containing (oxy) chalcogenide such as $La_5Ti_2CuS_5O_7$, $La_5Ti_2AgS_5O_7$, and $Sm_2Ti_2O_5S_2$; a gallium-containing nitride such as GaN:ZnO (ZnO solid solution of gallium-containing nitride); a germanium-containing nitride such as ZnGe $N_2$:ZnO (ZnO solid solution of germanium-containing nitride); a vanadium-containing oxide such as $BiVO_4$ and $Ag_3VO_4$; a niobium-containing oxide such as $K_4Nb_6O_{17}$, $Rb_4Nb_6O_{17}$, $Ca_2Nb_2O_7$, $Sr_2Nb_2O_7$, $BasNb_4O_{15}$, $NaCa_2Nb_3O_{10}$, $ZnNb_2O_6$, $Cs_2Nb_4O_{11}$, $La_3NbO_7$, $H^+$—$KLaNb_2O_7$, $H^+$—$RbLaNb_2O_7$, $H^+$—$CsLaNb_2O_7$, $H^+$—$KCa_2Nb_3O_{10}$, $SiO_2$-pillared $KCa_2Nb_3O_{10}$ (Chem. Mater. 1996, 8, 2534), $H^+$—$RbCa_2Nb_3O_{10}$, $H^+$—$CsCa_2Nb_3O_{10}$, $H^+$—$KSr_2Nb_3O_{10}$, $H^+$—$KCa_2NaNb_4O_{13}$, and $PbBi_2Nb_2O_9$; a niobium-containing oxynitride such as $CaNbO_2N$, $BaNbO_2N$, $SrNbO_2N$, and $LaNbON_2$; a tantalum-containing oxide such as $Ta_2O_5$, $K_2PrTa_5O_{15}$, $K_3Ta_3Si_2O_{13}$, $K_3Ta_3B_2O_{12}$, $LiTaO_3$, $NaTaO_3$, $KTaO_3$, $AgTaO_3$, $KTaO_3$:Zr, $NaTaO_3$:La, $NaTaO_3$:Sr, $Na_2Ta_2O_6$, $K_2Ta_2O_6$ (pyrochlore), $CaTa_2O_6$, $SrTa_2O_6$, $BaTa_2O_6$, $NiTa_2O_6$, $Rb_4Ta_6O_{17}$, $H_2La_{2/3}Ta_2O_7$, $K_2Sr_{1.5}Ta_3O_{10}$, $LiCa_2Ta_3O_{10}$, $KBa_2Ta_3O_{10}$, $SrSTa_4O_{15}$, $Ba_5Ta_4O_{15}$, $H_{1.8}Sr_{0.81}Bi_{0.19}Ta_2O_7$, Mg—Ta oxide (Chem. Mater. 2004 16, 4304-4310), $LaTaO_4$, and $La_3TaO_7$; a tantalum-containing nitride such as $Ta_3N_5$; and a tantalum-containing oxynitride such as $CaTaO_2N$, $SrTaO_2N$, $BaTaO_2N$, $LaTaO_2N$, $Y_2Ta_2ON_2$, and $TaON$. Further, the compound may have a different metal as a dopant.

From the viewpoint of more efficiently generating the photolytic water splitting reaction using sunlight, among the plurality of types of the optical semiconductors, it is preferable to use a visible light responsive type optical semiconductor. Specific examples thereof include $BaNbO_2N$, $TaON$, $Ta_3N_5$, $LaTiO_2N$, $SnNb_2O_6$, $BaTaO_2N$, $LaTi_2CuS_5O_7$, and $BiVO_4$, and among them, $BaNbO_2N$, $TaON$, $Ta_3N_5$, $LaTiO_2N$, $BaTaO_2N$, $BiVO_4$, and GaN:ZnO are particularly preferable. Note that, these compounds may be partially substituted by the doping element. The plurality of types of the optical semiconductors can be easily synthesized by known synthesis methods such as a solid phase method and a solution method.

In a case where the composite photocatalyst is produced from the plurality of types of the optical semiconductors, a selecting method of the types of the optical semiconductors is not particularly limited; however, it is preferable to select two or more types of the optical semiconductors which have very different absorption ranges from each other. The reason of this is that when the absorption ranges of the optical semiconductors are different from each other, the absorption width of the obtained composite photocatalyst is widened, and thus more photons become available. In addition, the co-catalyst and/or an energy barrier to a conductor becomes smaller due to the different absorption ranges, and thus a charge transfer is smoothly performed.

For example, in a case of selecting two types of the optical semiconductors, it is preferable that an absorption edge of one optical semiconductor be in a range of 350 nm to 550 nm, and an absorption edge of the other optical semiconductor be in a range of 500 to 750 nm. In a case of selecting three or more types of the optical semiconductors, it is preferable that at least two types of the optical semiconductors among them have the above-described absorption edge.

In addition, in a case of comparing the absorption edges of two types of the optical semiconductors among the plurality of types of the optical semiconductors to be used, it is preferable to include an optical semiconductor having the difference in the absorption edge is equal to or greater than 25 nm. The difference in the absorption edge is further preferably equal to or greater than 50 nm, and preferably equal to or less than 250 nm. In a case of selecting three or more types of the optical semiconductors, it is preferable that at least two types of the optical semiconductors satisfy the above-described relationship, and it is further preferable that all of the optical semiconductors satisfy the above-described relationship.

Examples of preferred combination of the optical semiconductors include GaN and $LaTiO_2N$, GaN and $BaTaO_2N$, TaON and $LaTiO_2N$, $BiVO_4$ and $LaTiO_2N$, TaON and $BaTaO_2N$, TaON and $Ta_3N_5$, and $BiVO_4$ and $BaTaO_2N$.

A form (shape) of the optical semiconductor is not particularly limited as long as the optical semiconductor can serve as the photocatalyst by loading the co-catalyst described below, and particulate, bulky, plate-like, or the like may be appropriately selected in accordance with the installation form of the photocatalyst. It is also possible to form a thin film-like (sheet-like) optical semiconductor on an electrode by epitaxially growing the optical semiconductor. Here, the optical semiconductor is necessary to be present as a solid in a case of being contact with the solution. In a case of using a composite photocatalyst produced by the first aspect of the present invention as a photocatalyst for water splitting reaction, it is preferable to load the particulate co-catalyst described blow on the surface of the optical semiconductor. In this case, the lower limit of the particle size of the optical semiconductor is preferably equal to or greater than 50 nm, and the upper limit thereof is equal to or less than 500 μm. Note that, in the present application "the particle size" means an average value (average particle size) of a directional tangent line diameter (Feret diameter), and can be measured by known means such as XRD, TEM, and SEM methods.

The above-described optical semiconductor is preferably subjected to an acid treatment in advance by the third aspect of the present invention described below. That is, in the first aspect of the present invention, a pre-step of the heating step includes an organic acid contact step of bringing a solution of at least one or more types organic acids containing a polyorganic acid into contact with a surface of an oxide, an oxynitride, or a nitride containing at least one or more elements selected from Ti, V, Ga, Ge, Nb, and Ta; and a collecting step of collecting the oxide, the oxynitride, or the nitride which remains as a solid content after the organic acid contact step, and the collected solid contents be used as the above-described optical semiconductor. Details will be described below.

(Co-Catalyst or Co-Catalyst Source)

The co-catalyst source used in the first aspect of the present invention is a material (component, element, and ion) which can be a co-catalyst by being heated together with the optical semiconductor in the liquid. For example, in a case of loading the co-catalyst ($CoO_x$ which is a co-catalyst for producing oxygen) containing Co on the optical semiconductor, it is possible to use a compound containing Co as a co-catalyst source. Preferred examples of the compound containing Co include salt containing Co, and specific examples thereof include $Co(NO_3)_2$, $Co(NH_3)_6Cl_3$, and $Co(OAc)_2$ (Ac represents an acetyl group). Further, it is possible to load CoPi and CoBi as the co-catalyst source by adding sodium phosphate or sodium borate. Note that, the co-catalyst for producing oxygen is not limited to $CoO_x$, and in the first aspect of the present invention, metal such as Cr, Sb, Nb, Th, Mn, Fe, Co, Ni, Ru, Rh, and Ir, and an oxide, a sulfide, or a composite oxide (excluding $CoO_x$) thereof can be loaded as the co-catalyst for producing oxygen, and among them, these oxides are preferably used in terms of the stability with respect to oxidation. In a case of loading these, salt containing these elements can be used as the co-catalyst source.

On the other hand, it is possible to load the co-catalyst for producing hydrogen on the optical semiconductor. For example, in a case where Pt is loaded as the co-catalyst for producing hydrogen on the optical semiconductor, it is possible to use a single substance of Pt or a compound containing Pt as the co-catalyst source. Preferred examples of the compound containing Pt include salt containing Pt such as $H_2PtCl_6$. Note that, the co-catalyst for producing hydrogen is not limited to Pt, and in the first aspect of the present invention, Pd, Rh, Ru, Ni, Au, Fe, Ru—Ir, Pt—Ir, NiO, $RuO_2$, $IrO_2$, $Rh_2O_3$, a Cr—Rh composite oxide, and a sulfide obtained by adding sulfur and thiourea to the aforementioned metal can be loaded as the co-catalyst for producing hydrogen. Among them, in terms of reducing ability, metal or an oxidizable noble metal oxide is preferably used. In a case of loading these, salt containing these elements can be used as the co-catalyst source.

(Solvent)

In the first aspect of the present invention, water and various types of organic solvents can be used as a solvent. Here, it is limited to a solvent which can keep a solid of the optical semiconductor even when being brought into contact with the above-mentioned optical semiconductor. Specifically, examples thereof include water, alcohols such as ethylene glycol, DMF, DMSO, NMP, nitrobenzene, and mixtures thereof. Particularly, a solvent having a high boiling point is preferably used. Specifically, a solvent having a boiling point of equal to or higher than 100° C., and water, alcohols, or a mixed solvent thereof is particularly preferable.

(Solid-Liquid Mixture)

In the first aspect of the present invention, the plurality of types of the optical semiconductors are mixed with the co-catalyst or the co-catalyst source, and the solvent so as to make a solid-liquid mixture. The mixing ratio of the optical semiconductor, the co-catalyst or the co-catalyst source, and the solvent is not particularly limited, and may be appropriately adjusted in accordance with the characteristics of the composite photocatalyst to be produced.

(Microwave)

In the first aspect of the present invention, the above-described solid-liquid mixture is heated by being irradiated with microwave. The microwave means an electromagnetic wave at a frequency in a range of 300 MHz to 30 GHz. The lower limit of the frequency is preferably equal to or higher than 900 MHz, and the lower limit thereof is preferably equal to or lower than 18 GHz. In the first aspect of the present invention, irradiation conditions (wavelength, output, and irradiation time) of the microwave are not particularly limited. It can be appropriately adjusted in consideration of heating temperature and the like.

In the first aspect of the present invention, it is preferable that the solid-liquid mixture be heated by being irradiated with the microwave in a closed system. The phrase "in closed system" means "in a system" in which the pressure rises more than outside the system as the temperature rises in a case where the temperature of the solution in the system exceeds the boiling point outside the system. Examples of the "in closed system" include a configuration in which a solid-liquid mixture is put into a container, the container is closed with a lid, and then the solid-liquid mixture is heated by being irradiated with the microwave. Examples of the sealable container include a container to which the microwave is permeable, and does not react with the solid-liquid mixture (for example, a container made of quartz, Teflon (registered trademark), or silicon carbide). Since the operation is performed in the closed system, it is possible to rapidly increase the temperature and pressure, the reaction rate can be greatly improved, and thereby the entire processing time can be shortened. Further, the heating can be performed by a simple process, the yield can be improved, and the purity can be improved. In other words, in the first aspect of the present invention, it is preferable that the pressure in closed system be higher than the pressure outside the system due to the heat with the microwave. The pressure in the system is further preferably set to be in a range of 1.01 bar to 50 bar.

In the first aspect of the present invention, it is possible to produce the composite photocatalyst at a first stage by heating the solid-liquid mixture with irradiation of the microwave. That is, after performing the heating with the microwave, a solid content may be merely extracted without performing a sintering treatment and a re-nitriding treatment thereafter. In addition, in the composite photocatalyst produced in the first aspect of the present invention, the co-catalyst is present on the surfaces of the plurality of types of the optical semiconductors, is present in a state of being interposed between bonding surfaces of the plurality of types of the optical semiconductors, or is present in a state of covering the optical semiconductor, and is excellent in the water splitting activity.

Hereinafter, the producing method according to the first aspect of the present invention will be described in detail with reference to specific examples.

1.1.1. First Embodiment

A producing method S10 of a composite photocatalyst according to a first embodiment will be described with reference to FIG. 1. As illustrated in FIG. 1, the producing method S10 includes a step in which a solvent 3, a co-catalyst source 2', and a plurality of types of optical semiconductors 1a and 1b are mixed with each other so as to form a solid-liquid mixture 5, and the solid-liquid mixture 5 is heated by being irradiated with a microwave by using a microwave oven 6. In the producing method S10, before the microwave irradiation, the co-catalyst source 2' in the solid-liquid mixture 5 is present in a state of being dissolved in the solvent 3 (a state of a solution 4). That is, in the producing method S10, when the solid-liquid mixture 5 is heated by being irradiated with the microwave, a co-catalyst 2 is precipitated on the surfaces of the optical semiconductors 1a and 1b, thus the optical semiconductors 1a and 1b can be composited, and thereby it is possible to easily produce a composite photocatalyst 10.

In a case of normal heating, it is considered that a medium (the solvent) is heated, a precursor of the co-catalyst is decomposed by the heat so as to obtain a nuclear, the nuclear is attached onto the surface of the optical semiconductor, and then the nuclear is further grown. For this reason, the co-catalysts to be loaded tend to be ununiform and are easy to aggregate. On the other hand, in a case of using the microwave, the optical semiconductor itself absorbs the microwave, and thus the surface of the optical semiconductor is heated first, and the nuclear growth for decomposition of the co-catalyst precursor concurrently occurs on the surface of the optical semiconductor. With this, it is considered that the co-catalyst is uniformly and entirely loaded on the surface.

Accordingly, in the first aspect of the present invention, the co-catalyst source 2' in the solid-liquid mixture 5 may be in a state of being dissolved in the solvent 3 at the time of the microwave irradiation, and it is possible that the solution in which the co-catalyst source is dissolved is brought into contact with the plurality of types of the optical semiconductors while performing the microwave irradiation so as to form a solid-liquid mixture. It is preferable that the co-catalyst source 2' in the solid-liquid mixture 5 be present in a state of being dissolved in the solvent 3 (the state of the solution 4) before the microwave irradiation.

The concentration of the co-catalyst source 2' in the solution 4 is not particularly limited; however, the lower limit is preferably equal to or greater than 0.1% by mass, and is further preferably equal to or greater than 0.5% by mass, and the upper limit is preferably equal to or lower than 10% by mass, and is further preferably equal to or lower than 5% by mass. If the concentration of the co-catalyst source 2' is within the aforementioned range, in the produced composite photocatalyst 10, the co-catalyst 2 does not inhibit the light absorption of the composite photocatalyst 10.

Further, in the first aspect of the present invention, the solution 4 is not particularly limited as long as it is formed of the co-catalyst source 2' and the solvent 3; however, it may be a solution containing the aforementioned co-catalyst source, is preferably a solution containing a Co-ion, a Ru-ion, or a Pt-ion, and is further preferably a solution containing a Co-ion.

In the producing method S10, the plurality of types of co-catalyst sources 2' may be dissolved in the solvent 3. With this, in the composite photocatalyst 10, it is possible to load the plurality of types of co-catalysts 2 on the surfaces of the optical semiconductors 1a and 1b. For example, it is possible to sequentially co-load the precursors of the co-catalyst for producing oxygen and the co-catalyst for producing hydrogen. In addition, in the first aspect of the present invention, it is possible to use the plurality of oxides obtained by mixing the plurality of types of the co-catalyst sources.

Note that, in the producing method S10, in the solid-liquid mixture 5 before the microwave irradiation, the optical semiconductors 1a and 1b may be composited in advance. That is, the particle of the optical semiconductor 1a and the particle of the optical semiconductor 1b may form a second particle. For example, the optical semiconductors 1a and 1b are contained in the solvent and the solvent is irradiated with the microwave so as to obtain the secondary particle formed of the particle of the optical semiconductor 1a and the particle of the optical semiconductor 1b, and the secondary particle is contained in the solution 4 so as to form the solid-liquid mixture 5. Even in a case of using such a secondary particle as the plurality of types of the optical semiconductors, it is possible to produce the composite photocatalyst having excellent water splitting activity. Here, according to the findings of the present inventors, when the plurality of types of the optical semiconductors are not composited with each other in the solid-liquid mixture 5, it is possible to produce the composite photocatalyst having excellent water splitting activity.

1.1.2. Second Embodiment

Figure 2:
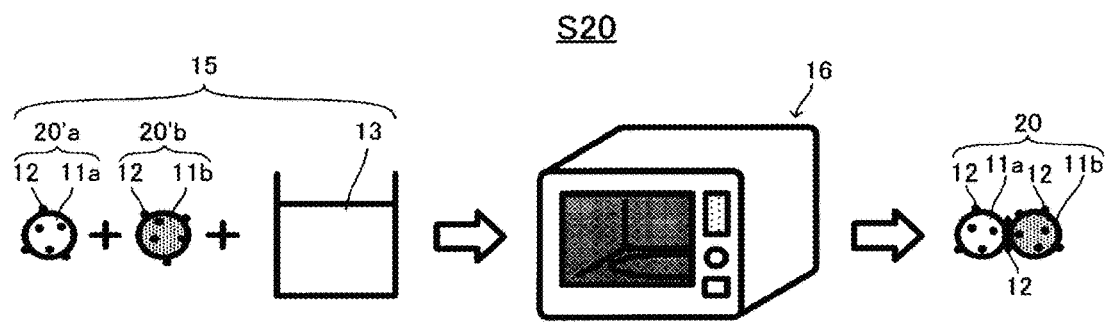
FIG. 2 is a schematic view illustrating a second embodiment of the first aspect of the present invention.

A producing method S20 of the composite photocatalyst according to the second embodiment will be described with reference to FIG. 2. As illustrated in FIG. 2, the producing method S20 includes a step in which a solvent 13, a co-catalyst 12, and plurality of types of optical semiconductors 11a and 11b are mixed with each other so as to form a solid-liquid mixture 15, and the solid-liquid mixture 15 is heated by being irradiated with a microwave by using a microwave oven 16. In the producing method S20, before the microwave irradiation, the co-catalyst 12 and the optical semiconductors 11a and 11b in the solid-liquid mixture 15 are present in the solvent 13 as a solid, and the co-catalyst 12 is present in a state of being loaded on the optical semiconductors 11a and 11b (a state of photocatalysts 20'a and 20'b). That is, in the producing method S20, when the solid-liquid mixture 15 is heated by being irradiated with the microwave, the photocatalysts 20'a and 20'b can be composited, and thereby it is possible to easily produce a composite photocatalyst 20.

In other words, in the producing method S20, it is necessary to produce the photocatalysts 20'a and 20'b in advance. It is preferable to obtain the photocatalysts 20'a and 20'b by the following method, for example.

Figure 3A:
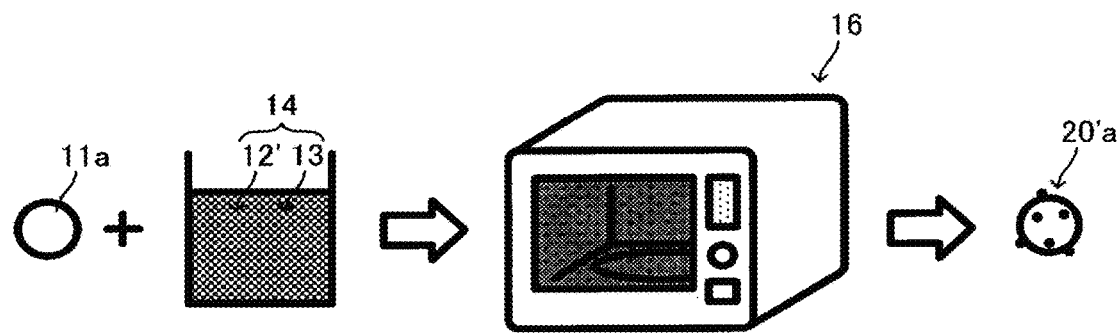
FIG. 3A and FIG. 3B are schematic views illustrating the second embodiment of the first aspect of the present invention.
Figure 3B:
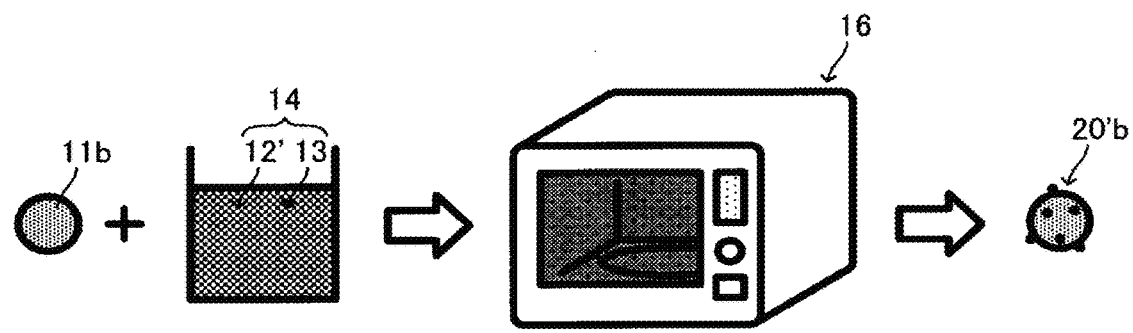

A method of obtaining the photocatalysts 20'a and 20'b will be described with reference to FIG. 3. As illustrated in FIG. 3A, it is possible to load the co-catalyst 12 on the first optical semiconductor 11a by heating with the microwave while bringing the first optical semiconductor 11a into contact with the solution 14 in which the co-catalyst source 12' is dissolved, and it is possible to easily obtain the photocatalyst 20'a (a first loading step). On the other hand, as illustrated in FIG. 3B, it is possible to load the co-catalyst 12 on the second optical semiconductor 11b by heating with the microwave while bringing the second optical semiconductor 11b into contact with the solution 14 in which the co-catalyst source 12' is dissolved, and it is possible to easily obtain the photocatalyst 20'b (a second loading step). In addition, the photocatalyst 20'a and the photocatalyst 20'b obtained through the first loading step and the second loading step are contained in the solvent so as to form a solid-liquid mixture (a mixing step).

Note that, when the plurality of types of the co-catalyst sources 12' are dissolved in the solution 14, the plurality of types of the co-catalysts 12 may be loaded on each of the optical semiconductors 11a and 11b.

In the first loading step and the second loading step, the microwave irradiation is preferably performed in the closed system. The definition of "in the closed system" and the effect in the case where the microwave irradiation is performed in the closed system are as described above.

The optical semiconductors 11a and 11b are preferably subjected to an acid treatment in advance by the third aspect of the present invention described below. That is, in the second embodiment, a pre-step of each of the first loading step and the second loading step includes an organic acid contact step of bringing a solution of at least one or more types organic acids containing a polyorganic acid into contact with a surface of an oxide, an oxynitride, or a nitride containing at least one or more elements selected from Ti, V, Ga, Ge, Nb, and Ta; and a collecting step of collecting the oxide, the oxynitride, or the nitride which remains as a solid content after the organic acid contact step, and the collected solid contents be used as the above-described optical semiconductors 11a and 11b.

Figure 4A:
FIG. 4A and FIG. 4B are schematic views illustrating the second embodiment of the first aspect of the present invention.
Figure 4B:
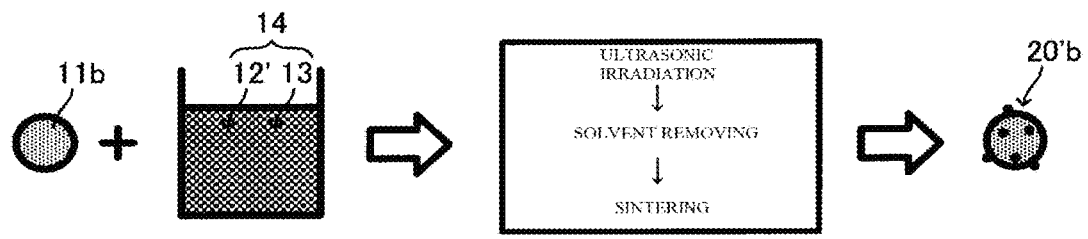

In addition, it is possible to obtain the photocatalysts 20'a and 20'b by an impregnating method as illustrated in FIG. 4. For example, as illustrated in FIG. 4A, the first optical semiconductor 11a is impregnated into the solution 14 in which the co-catalyst source 12' is dissolved, then the solution is irradiated with an ultrasonic wave, thereafter, the solvent is removed by being distilled off under reduced pressure so as to obtain powders, and the powders are sintered so as to obtain the photocatalyst 20'a. The same is true for the photocatalyst 20'b (refer to FIG. 4B).

Note that, the plurality of types of the co-catalysts 12 may be loaded on each of the photocatalysts 20'a and 20'b by dissolving the plurality of types of the co-catalyst sources 12' to the solution 14.

1.1.3. Third Embodiment

Figure 5:
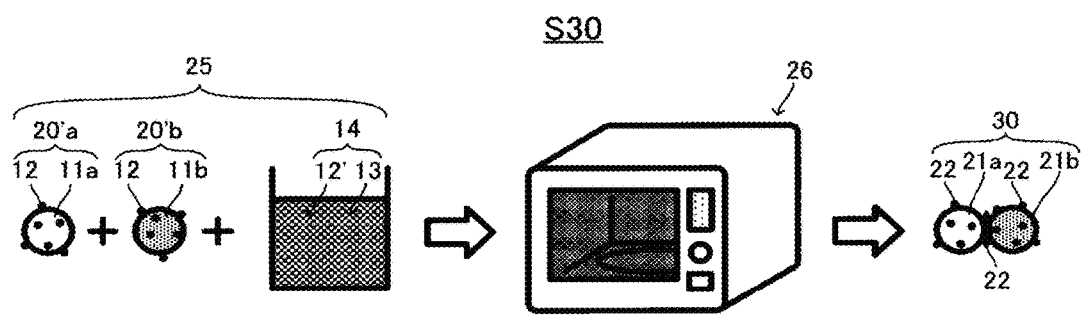
FIG. 5 is a schematic view illustrating a third embodiment of the first aspect of the present invention.

A producing method S30 of the composite photocatalyst according to the third embodiment will be described with reference to FIG. 5. As illustrated in FIG. 5, the producing method S30 includes a step in which a solution 14 in which a co-catalyst source 12' is dissolved, and a plurality of types of photocatalysts 20'a and 20'b are mixed with each other so as to form a solid-liquid mixture 25, and the solid-liquid mixture 25 is heated by being irradiated with a microwave by using a microwave oven 26. In the producing method S30, before the microwave irradiation, the co-catalyst 12 and the optical semiconductors 11a and 11b in the solid-liquid mixture 25 are present in the solution 14 as a solid, and the co-catalyst source 12' is further dissolved in the solution 14 while the co-catalyst 12 is in a state of being loaded on the optical semiconductors 11a and 11b (a state of the photocatalysts 20'a and 20'b). That is, the producing method S30, when the solid-liquid mixture 25 is heated by being irradiated with the microwave, the co-catalyst derived from the co-catalyst source 12' can be loaded and composited with respect to the photocatalysts 20'a and 20'b, and thereby it is possible to easily produce a composite photocatalyst 30.

As described in the producing methods S10 to S30, it is possible to produce a composite photocatalyst in which water splitting activity is improved by compositing the plurality of types of different optical semiconductors with a co-catalyst in a solution by using the heat from microwave.

Note that, a configuration in which two types of the optical semiconductors 1a and 1b (11a and 11b) are used as the optical semiconductor was described in the producing methods S10 to S30; however, the first aspect of the present invention is not limited to this configuration. It is possible to produce the composite photocatalyst by using three or more types of the optical semiconductors.

1.2. Composite Photocatalyst

The composite photocatalyst produced by using the producing method according to the first aspect of the present invention has remarkable water splitting activity that cannot be found in the related art. That is, the first aspect of the present invention has an aspect of a composite photocatalyst. Specifically, the composite photocatalyst is formed of the plurality of types of the optical semiconductors on which the co-catalyst is loaded, in which the co-catalyst is present on the surfaces of the plurality of types of the optical semiconductors, and is present in a state of being interposed between bonding surfaces of the plurality of types of the optical semiconductors, or is present in a state of covering the optical semiconductor.

The composite photocatalyst according to the first aspect of the present invention has the coverage per unit area of the optical semiconductor due to the co-catalyst is equal to or greater than 30%.

In a case where the co-catalyst is loaded on the surface of the optical semiconductor by using the conventional impregnating method, there is a tendency that crystal nuclei are localized, and thus the co-catalysts are aggregated and the co-catalyst having relatively large particle size are loaded on the surface of the optical semiconductor. This tendency was also found in a case where the concentration of the solution in which the co-catalyst source is dissolved is set to be high, and the coverage per unit area of the optical semiconductor was less than 30% without being necessarily proportional to the solution concentration of the co-catalyst source. In contrast, the present inventors have found that the composite photocatalyst obtained by the producing method according to the first aspect of the present invention has a tendency that the co-catalyst having relatively small particle size is loaded on the optical semiconductor in a dense state. With the composite photocatalyst according to the first aspect of the present invention, the coverage per unit area of the optical semiconductor can be set to be equal to or greater than 30% in a case where the solution concentration (the concentration of the co-catalyst sources 2' and 12' in the solutions 4 and 14 in FIGS. 1 and 3) of the co-catalyst source is relatively low (1% by mass), preferably set to be equal to or greater than 50%, and further preferably set to be equal to or greater than 60%. In addition, the coverage tends to be increased by being proportional to the solution concentration of the co-catalyst source. For this reason, with the composite photocatalyst according to the first aspect of the present invention, the surface of the optical semiconductor is uniformly covered with the co-catalyst particles, and thus it is possible to improve the photoactivity compared with the conventional method.

The composite photocatalyst of the present invention can have the same form as the form (shape) of the optical semiconductor. In accordance with the installation form of the photocatalyst, the particulate, bulky, plate-like, or the like may be appropriately selected. It is also possible to form a thin film-like (sheet-like) optical semiconductor on an electrode by epitaxially growing the optical semiconductor.

In the composite photocatalyst of the first aspect of the present invention, the co-catalyst having the particle size of equal to or smaller than 20 nm, preferably equal to or smaller than 15 nm, further preferably equal to or smaller than 10 nm, and most preferably equal to or smaller than 5 nm is loaded on the surface of the optical semiconductor. Since the size of the co-catalyst particle is equal to or smaller than 20 nm, and the surface area of the co-catalyst on the optical semiconductor can be set to be increased, it is possible to provide a photocatalyst having a higher photoactivity than a photocatalyst in which the co-catalyst is loaded by a conventional method.

Note that, similar to the particle size of the above-described optical semiconductor, the particle size of the co-catalyst particle means an average value (average particle size) of a directional tangent line diameter (Feret diameter), and can be calculated by the average value of the co-catalyst particle size measured by electron microscopic photographs such as TEM.

In the composite photocatalyst according to the first aspect of the present invention, the amount of the co-catalysts loaded on the surface of the optical semiconductor is not particularly limited as long as it is sufficient to improve the photocatalytic activity. In this regard, if the loaded amount of the entre co-catalysts is excessively small, no effect is obtained, and if the loaded amount is excessively large, the co-catalyst itself absorbs or scatters the light so as to inhibit the light absorption of the photocatalyst, or serves as a recombination center, and therefore, the catalytic activity is rather deteriorated. From this viewpoint, for example, in a case where the composite photocatalyst is formed through the composition performed in such a manner that the co-catalyst having a particle size of equal to or smaller than 20 nm is loaded on the surfaces of the plurality of types of the optical semiconductor particles having a primary particle size in a range of 50 nm to 500 µm, the loaded amount of the co-catalyst particles may be in a range of 0.008 parts by mass to 20.0 parts by mass with respect to 100 parts by mass of the optical semiconductor (optical semiconductor particle). The lower limit thereof is preferably equal to or greater than 0.009 parts by mass, and is further preferably equal to or greater than 0.010 parts by mass, and the upper limit is preferably equal to or smaller than 10.0 parts by mass, is further preferably equal to or smaller than 5.0 parts by mass, and is particularly preferably equal to or smaller than 4.0 parts by mass. With this, it is possible to uniformly cover almost the entire surface of the optical semiconductor with the co-catalyst particles, and thus the photocatalytic activity is improved. Note that, in order to adjust the loaded amount of the co-catalyst, for example, the irradiation conditions of the microwave may be adjusted in the producing method according to the first aspect of the present invention.

1.3. Electrode for Photolytic Water Splitting Reaction

The composite photocatalyst produced in the first aspect of the present invention can be preferably used as a photocatalyst for photolytic water splitting reaction. In this case, the form of the composite photocatalyst is not particularly limited, and examples of the configurations thereof include a configuration in which a particulate composite photocatalyst is dispersed in water, a configuration in which the composite photocatalyst is solidified to form a mold and the mold is installed in water, a configuration in which a layer formed of the composite photocatalyst is provided on the substrate so as to form a laminate, and the laminate is installed in water, and a configuration in which the composite photocatalyst is fixed on a current collector so as to form the electrode for photolytic water splitting reaction, and the electrode is installed in water together with a counter electrode.

Among them, the electrode for photolytic water splitting reaction can be manufactured by using known method. For example, it is possible to easily manufacture the electrode for photolytic water splitting reaction by using a so-called particle transfer method (Chem. Sci., 2013, 4, 1120-1124). That is, a laminate of a composite photocatalyst layer and a first substrate layer is obtained by placing a composite photocatalyst on a first substrate such as glass. A conductive layer (current collector) is provided on the surface of the composite photocatalyst layer of the obtained laminate through the deposition or the like. Here, the composite photocatalyst which is present on the surface layer on the conductive layer side of the composite photocatalyst layer is fixed onto the conductive layer. Thereafter, the second substrate is adhered onto the surface of the conductive layer, and the conductive layer and the composite photocatalyst layer are lifted off the first substrate layer. A portion of the composite photocatalyst is fixed onto the surface of the conductive layer, and thus is detached together with the conductive layer. As a result, it is possible to obtain the electrode for photolytic water splitting reaction including the composite photocatalyst layer, the conductive layer, and the second substrate layer.

In addition, the electrode for photolytic water splitting reaction may be obtained in such a manner that the surface of the current collector is coated with slurries in which the composite photocatalyst is dispersed, and the coated surface is dried, or the electrode for photolytic water splitting reaction may be obtained by integrating the composite photocatalyst and the current collector through pressure-molding or the like. In addition, the composite photocatalyst may be accumulated on the current collector by electrophoresis by immersing the current collector into the slurries in which the composite photocatalyst is dispersed, and applying a voltage thereto.

In addition, a configuration in which the co-catalyst is loaded in a post-step may be employed. For example, in the above-described particle transfer method, a laminate including a composite optical semiconductor layer, a conductive layer, and a second substrate layer is obtained by using the composite optical semiconductor particle instead of the composite photocatalyst particle with the same method, thereafter, the composite optical semiconductor layer of the laminate is heated by being irradiated with the microwave while being brought into contact with the above-described solution (solutions 4 and 14) so as to load the co-catalyst on the surface of the composite optical semiconductor layer, and thereby it is possible to obtain the electrode for photolytic water splitting reaction including the composite photocatalyst layer. At this time, a metal oxide such as ITO and FTO as an electrode is preferably used. In a case of metal, sparks are generated by the microwave irradiation.

1.4. Method of Producing Hydrogen and/or Oxygen

It is possible to produce hydrogen and/or oxygen in such a manner that the composite photocatalyst produced in the first aspect of the present invention, or the above-described electrode for photolytic water splitting reaction is immersed into water or an electrolyte aqueous solution, and then the photolytic water splitting is performed by irradiating the composite photocatalyst or the electrode for photolytic water splitting reaction with light.

For example, the electrode for photolytic water splitting reaction for producing oxygen and an electrode for water splitting reaction for producing hydrogen are obtained by fixing the composite photocatalyst onto the current collector formed of the above-described conductor, and then the water splitting reaction is performed by irradiating the electrodes with light while supplying liquid or gaseous water after connecting the electrodes. It is possible to promote the water splitting reaction by providing a potential difference between the electrodes if necessary.

On the other hand, the water splitting reaction may be performed by irradiating a material obtained by fixing the composite photocatalyst on an insulating substrate, or a mold obtained by pressure-molding the composite photocatalyst with light while supplying water thereto. In addition, the water splitting reaction may be performed by dispersing the composite photocatalyst into water or an electrolyte aqueous solution and then irradiating the obtained solution with the light. In this case, it is possible to prompt the reaction by stirring the solution if necessary.

The reaction conditions for producing hydrogen and/or oxygen is not particularly limited, and for example, a reaction temperature is set to be in a range of 0° C. to 200° C., and a reaction pressure is set to be equal to or lower than 2 MPa(G).

Although the irradiation light is dependent on the types of the composite photocatalysts, a visible light or a ultraviolet light having a wavelength of equal to or shorter than 650 nm can be preferably used. Examples of a light source of the irradiation light include sunlight, a lamp such as a xenon lamp and metal halide lamp which are capable of applying light approximating sunlight, a mercury lamp, and a LED.

2. Second Aspect of the Present Invention

In the first aspect of the present invention, a configuration in which the "composite photocatalyst" is produced by using "the plurality of types" of the optical semiconductors was described. Similarly, also in the second aspect of the present invention described below, it is possible to produce the photocatalyst having excellent water splitting activity.

2.1. Method of Producing Photocatalyst

Figure 6:
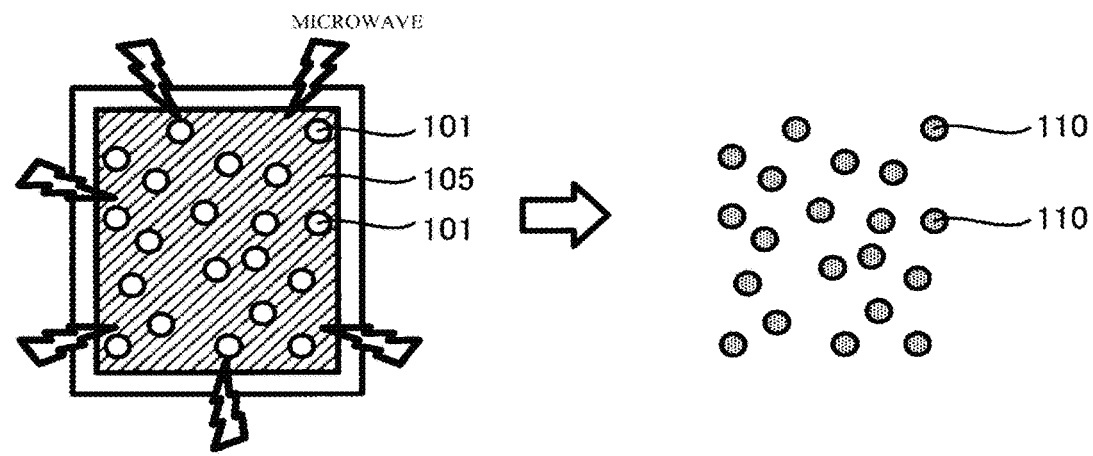
FIG. 6 is a schematic view illustrating a second aspect of the present invention.

As illustrated in FIG. 6, the method of producing a photocatalyst according to the second aspect of the present invention includes a step of heating with a microwave while bringing an optical semiconductor 101 into contact with a solution 105 in which a co-catalyst source is dissolved, in a closed system. Through the aforementioned step, it is possible to produce a photocatalyst 110 in which a co-catalyst 102 having a small particle size is loaded on a surface of an optical semiconductor 101 in a highly dispersed manner.

2.1.1. In Closed System

In the second aspect of the present invention, the heating with the microwave is performed in the closed system. "In closed system" exemplified in the second aspect of the present invention can be the same as "in closed system" exemplified in the first aspect of the present invention.

2.1.2. Optical Semiconductor 101

The optical semiconductor 101 used in the second aspect of the present invention may be a semiconductor which is capable of producing a hole and an electron by absorbing light, and capable of catalyzing photolytic water splitting reaction. Specifically, it may be used by being appropriately selected from the optical semiconductor exemplified in the above-described first aspect of the present invention. The preferred optical semiconductor is also the same as that in the first aspect of the present invention.

2.1.3. Solution 105 in which Co-Catalyst Source is Dissolved (Co-Catalyst Source)

The co-catalyst source used in the second aspect of the present invention is a material (component, element, and ion) which can be a co-catalyst by being heated together with the optical semiconductor 101 in the liquid. Specifically, it may be used by being appropriately selected from the co-catalyst source exemplified in the above-described first aspect of the present invention.

As described above, in the second aspect of the present invention, it is possible to appropriately select and use the co-catalyst source which can be a co-catalyst (so as to be precipitated as a co-catalyst) on the surface of the optical semiconductor in the solution by heating with the microwave. Note that, in the second aspect of the present invention, it is possible to load a plurality of types of co-catalysts on the surface of the optical semiconductor. For example, it is possible to sequentially co-load the precursors of the co-catalyst for producing oxygen and the co-catalyst for producing hydrogen. In addition, in the second aspect of the present invention, the plurality of co-catalyst sources may be mixed with each other in the solution. In this case, the plurality of types of the co-catalyst sources may be dissolved in the solution 5.

(Solvent)

In the second aspect of the present invention, it is possible to make a solution 105 in which the co-catalyst source is dissolved by dissolving the co-catalyst source in a solvent. As the aforementioned solvent, a solvent which is capable of dissolving the above-described co-catalyst source may be used, and water and various types of organic solvents can be used. Here, it is limited to a solvent which can keep a solid of the optical semiconductor 101 even when being brought into contact with the above-mentioned optical semiconductor 101. Specifically, examples thereof include water, alcohols such as ethylene glycol, DMF, DMSO, NMP, nitrobenzene, and mixtures thereof. Particularly, a solvent having a high boiling point is preferably used. Specifically, a solvent having a boiling point of equal to or higher than 100° C., and water, alcohols, or a mixed solvent thereof is particularly preferable. Note that, the concentration of the co-catalyst source contained in the solution 105 is not particularly limited; however, the lower limit is preferably equal to or greater than 0.1% by mass, and is further preferably equal to or greater than 0.5% by mass, and the upper limit is preferably equal to or lower than 10% by mass, and is further preferably equal to or lower than 5% by mass. If the concentration of the co-catalyst source is within the aforementioned range, the co-catalyst does not inhibit the light absorption of the photocatalyst. In addition, in the second aspect of the present invention, the solution containing the co-catalyst source is not particularly limited as long as it is formed of the co-catalyst source and the solvent; however, it is preferably a solution containing a Co-ion, a Ru-ion, or a Pt-ion, and is further preferably a solution containing a Co-ion.

2.1.4. Microwave

In the second aspect of the present invention, the above-described solution 105 and the optical semiconductor 101 are heated with the microwave. The irradiation conditions of the microwave can be set to be the same as the conditions exemplified in the first aspect of the present invention. In the second aspect of the present invention, it is possible to easily adjust the amount of the co-catalysts loaded on the surface of the optical semiconductor 101 by adjusting the irradiation conditions (wavelength, output, and irradiation time) of the microwave in accordance with the concentration of the co-catalyst source contained in the above-described solution 105 and the shape or the amount of the optical semiconductor being contact with the solution 105.

In the second aspect of the present invention, since the heating is performed with the microwave in the closed system, it is possible to rapidly increase the temperature and pressure, the reaction rate can be greatly improved, and thereby the entire processing time can be shortened. In the case of using the microwave, the optical semiconductor itself absorbs the microwave, and thus the surface of the optical semiconductor is heated first, and the nuclear growth for decomposition of the co-catalyst precursor concurrently occurs on the surface of the optical semiconductor. With this, it is considered that the co-catalyst is uniformly and entirely loaded on the surface.

Further, the heating can be performed by a simple process, the yield can be improved, and the purity can be improved. In other words, in the second aspect of the present invention, it is preferable that the pressure in closed system be higher than the pressure outside the system due to the heat with the microwave. The pressure in the system is further preferably set to be in a range of 1.01 bar to 50 bar.

The amount of the co-catalysts loaded on the surface of the optical semiconductor is not particularly limited as long as it is sufficient to improve the photocatalytic activity. In this regard, if the loaded amount of the entre co-catalysts is excessively small, no effect is obtained, and if the loaded amount is excessively large, the co-catalyst itself absorbs or scatters the light so as to inhibit the light absorption of the photocatalyst, or serves as a recombination center, and therefore, the catalytic activity is rather deteriorated. From this viewpoint, for example, in a case where the co-catalyst having a particle size of equal to or smaller than 20 nm is loaded on the surface of the optical semiconductor particle having a particle size in a range of 50 nm to 500 µm, the irradiation conditions of the microwave is preferably adjusted such that the loaded amount of the co-catalyst particles in a range of 0.008 parts by mass to 20.0 parts by mass with respect to 100 parts by mass of the optical semiconductor (optical semiconductor particle). The lower limit thereof is preferably equal to or greater than 0.009 parts by mass, and is further preferably equal to or greater than 0.010 parts by mass, and the upper limit is preferably equal to or smaller than 10.0 parts by mass, is further preferably equal to or smaller than 5.0 parts by mass, and is particularly preferably equal to or smaller than 4.0 parts by mass. With this, it is possible to uniformly cover almost the entire surface of the optical semiconductor with the co-catalyst particles, and thus the photocatalytic activity is improved.

In the second aspect of the present invention, it is possible to easily produce a composite photocatalyst 110 in the closed system at a first stage through the above-described steps. That is, after performing the heating with the microwave, the solid content may be merely extracted from the closed system without performing the sintering treatment and the re-nitriding treatment thereafter. In addition, in the photocatalyst 110 produced in the present invention, the co-catalyst having a small particle size is loaded on the surface of the optical semiconductor 101 in a highly dispersed manner, and the photolytic water splitting activity is excellent.

2.2. Method of Loading Co-Catalyst

The second aspect of the present invention has an aspect of a method of loading a co-catalyst in addition to the aspect of the method of producing a photocatalyst. That is a method of loading the co-catalyst on the surface of the optical semiconductor by heating with the microwave while bringing the optical semiconductor into contact with the solution containing the co-catalyst source in the closed system. Each detail is as described above, and the description will be omitted here.

2.3. Electrode for Photolytic Water Splitting Reaction

The photocatalyst produced in the second aspect of the present invention can be preferably used as a photocatalyst for photolytic water splitting reaction. In this case, the configuration of the photocatalyst is not particularly limited, and is the same as the configuration described in the first aspect of the present invention. Particularly, in a case where the photolytic water splitting reaction is performed in a large scale, the electrode for photolytic water splitting reaction may be used from the viewpoint that the water splitting reaction can be prompted by applying bias. The method of manufacturing the electrode for photolytic water splitting reaction is as described above.

2.4. Method of Producing Hydrogen and/or Oxygen

It is possible to produce hydrogen and/or oxygen in such a manner that the composite photocatalyst produced in the present invention, or the above-described electrode for photolytic water splitting reaction is immersed into water or an electrolyte aqueous solution, and then the photolytic water splitting is performed by irradiating the composite photocatalyst or the electrode for photolytic water splitting reaction with light. The details are as described in the first aspect of the present invention.

2.5. Photocatalyst

The second aspect of the present invention has an aspect of a photocatalyst. In the photocatalyst according to the second aspect of the present, the co-catalyst is loaded on the surface of the optical semiconductor has coverage per unit area of the optical semiconductor due to the co-catalyst is equal to or greater than 30%.

In a case where the co-catalyst is loaded on the surface of the optical semiconductor by using the conventional impregnating method, there is a tendency that crystal nuclei are localized, and thus the co-catalysts are aggregated and the co-catalyst having relatively large particle size are loaded on the surface of the optical semiconductor. This tendency was also found in a case where the concentration of the solution in which the co-catalyst source is dissolved is set to be high, and the coverage per unit area of the optical semiconductor was less than 30% without being necessarily proportional to the solution concentration of the co-catalyst source. In contrast, the present inventors have found that the composite photocatalyst obtained by the producing method according to the second aspect of the present invention has a tendency that the co-catalyst having relatively small particle size is loaded on the optical semiconductor in a dense state. With the composite photocatalyst according to the second aspect of the present invention, the coverage per unit area of the optical semiconductor can be set to be equal to or greater than 30% in a case where the solution concentration of the co-catalyst source is relatively low (1% by mass), preferably set to be equal to or greater than 50%, and further preferably set to be equal to or greater than 60%. In addition, the coverage tends to be increased by being proportional to the solution concentration of the co-catalyst source. For this reason, with the composite photocatalyst according to the second aspect of the present invention, the surface of the optical semiconductor is uniformly covered with the co-catalyst particles, and thus it is possible to improve the photoactivity compared with the conventional method.

In the composite photocatalyst of the second aspect of the present invention, the co-catalyst having the particle size of equal to or smaller than 20 nm, preferably equal to or smaller than 15 nm, further preferably equal to or smaller than 10 nm, and most preferably equal to or smaller than 5 nm is loaded on the surface of the optical semiconductor. Since the size of the co-catalyst particle is equal to or smaller than 20 nm, and the surface area of the co-catalyst on the optical semiconductor can be set to be increased, it is possible to provide a photocatalyst having a higher photoactivity than a photocatalyst in which the co-catalyst is loaded by a conventional method.

Note that, similar to the particle size of the above-described optical semiconductor, the particle size of the co-catalyst particle means an average value (average particle size) of a directional tangent line diameter (Feret diameter), and can be calculated by the average value of the co-catalyst particle size measured by electron microscopic photographs such as TEM.

The photocatalyst according to the second aspect of the present invention is preferably obtained by the method of producing a photocatalyst of the present invention. In the method of producing a photocatalyst of the present invention, it is possible to use raw materials and the like described in the producing method of the present invention.

3. Third Aspect of the Present Invention

It is possible to improve the water splitting activity of the photocatalyst by properly performing an acid treatment on the optical semiconductor in advance. Hereinafter, as the third aspect of the present invention, a method of producing an optical semiconductor will be described.

3.1. Method of Producing Optical Semiconductor

Figure 7A:
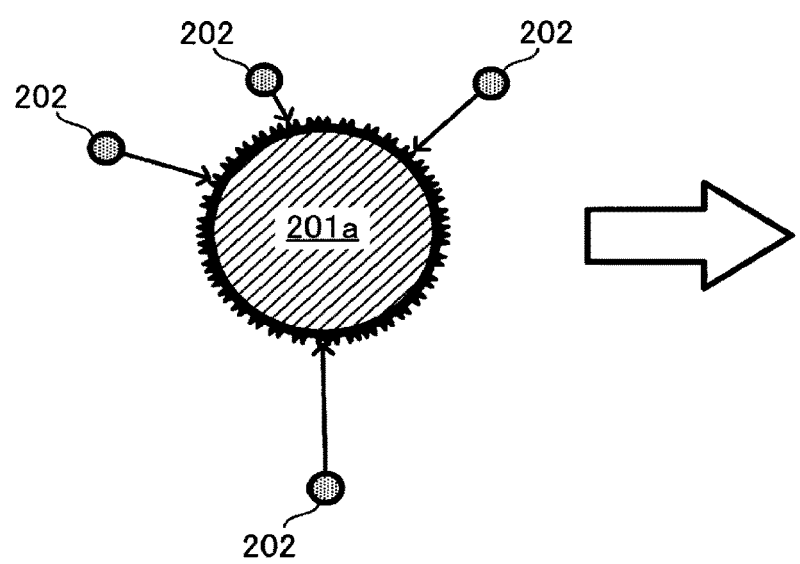
FIG. 7A and FIG. 7B are schematic views illustrating the third embodiment of the first aspect of the present invention.
Figure 7B:

As illustrated in FIGS. 7A and 7B, the method of producing an optical semiconductor according to the third aspect of the present invention includes a first step (an organic acid contact step) of bringing a solution 202 of a predetermined organic acid into contact with a surface of an oxide, an oxynitride, or a nitride 201a (hereinafter, referred to as "oxide or the like 201a" in some cases) containing at least one or more elements selected from Ti, V, Ga, Ge, Nb, La, and Ta; and a second step (a collecting step) of collecting oxide, oxynitride or nitride of collecting the oxide, the oxynitride, or the nitride 201b (hereinafter, referred to as "oxide or the like 201b" in some cases) which remains as a solid content after the first step.

3.1.1. First Step (Organic Acid Contact Step)

The first step is a step of bringing the solution 202 of a predetermined organic acid into contact with the surface of the oxide or the like 201a as illustrated in FIG. 7A. Specifically, the first step is (i) a step of bringing a solution of at least one or more types organic acids containing a polyorganic acid into contact with the surface of the oxide or the like 201a, or (ii) a step of bringing a solution of at least one or more types organic acids containing a sulfonic acid into contact with the surface of the oxide or the like 201a.

(Oxide or the Like 201a)

The oxide or the like 201a used in the third aspect of the present invention is an oxide, a nitride, or an oxynitride which contains at least one or more elements selected from Ti, V, Ga, Ge, Nb, La, and Ta, and is capable of producing a hole and an electron by absorbing light. It may be a material capable of catalyzing photolytic water splitting reaction. The oxide or the like 201a generally has a surface defect and an interface defect, and if the surface defect and the interface defect are smoothly removed by performing the acid treatment, it is possible to improve the photolytic water splitting activity of the optical semiconductor. Among them, in a case where the oxide or the like 201a contains Ti or Nb, the effect of acid treatment is remarkably exhibited in particular, which is preferable.

Specific examples of the oxide or the like 201a may be used by appropriately selecting from an oxide, a nitride, or an oxynitride exemplified as the optical semiconductor in the first aspect of the present invention. The oxide or the like 201a can be easily synthesized by known synthesis methods such as a solid phase method and a solution method.

From the viewpoint of more efficiently generating the photolytic water splitting reaction using sunlight, it is particularly preferable to use a visible light responsive type oxide. Specifically, the oxide or the like 201a is preferably at least one or more types selected from $LaTiO_2N$, $CaNbO_2N$, $BaNbO_2N$, $SrNbO_2N$, $LaNbO_2N$, $Ta_3N_5$, $BaTaO_2N$, $BiVO_4$, TaON, $LaTiO_2N$, $SnNb_2O_6$, $La_5Ti_2CuS_5O_7$, GaN:ZnO and $ZnGeN_2$:ZnO. Among them, when the oxide or the like 201a is $LaTiO_2N$, $SrNbO_2N$, or $BaNbO_2N$, the effect of acid treatment is remarkably exhibited in particular, which is preferable.

The shape of the oxide or the like 201a is not particularly limited. It may be a mold such as a sheet or a pellet in addition to the particulate (powdery) or bulky shape. From the viewpoint that an optical semiconductor having a shape which is particularly suitable for the water splitting reaction can be easily produced, the particulate or sheet is preferable. The particulate is particularly preferable.

In a case of the particulate oxide or the like 201a, the lower limit of the average particle size is typically equal to or greater than 10 nm, preferably equal to or greater than 50 nm, and further preferably equal to or greater than 100 nm, and the upper limit thereof is typically equal to or smaller than 50 μm, preferably equal to or smaller than 10 μm, and further preferably equal to or smaller than 5 μm. Note that, in the present application "the particle size" means an average value (average particle size) of a directional tangent line diameter (Feret diameter), and can be measured by known means such as XRD, TEM, and SEM methods.

In a case of the sheet-like oxide or the like 201a, the lower limit of the thickness thereof is typically equal to or greater than 1 nm, preferably equal to or greater than 10 nm, and further preferably equal to or greater than 100 nm, and the upper limit thereof is typically equal to or smaller than 10 μm, preferably equal to or smaller than 5 μm, and further preferably equal to or smaller than 1 μm. Note that, the sheet-like oxide or the like 201a may be formed as a thin film on the substrate as described above (may be formed by being directly crystal grown on the surface of the substrate or the like).

(Solution 202)

The solution 202 used in the present invention is (i) a solution of at least one or more types organic acids containing a polyorganic acid, or (ii) a solution of at least one or more types organic acids containing a sulfonic acid.

(Polyorganic Acid)

The polyorganic acid has a large molecular weight, and the size (chain length) thereof is almost the same as the particle size of the oxide, and in a case where the polyorganic acid solution is brought into contact with the surface of the oxide or the like 201a, the polyorganic acid does not easily enter the oxide or the like 201a, and the surface of the optical semiconductor is polished so as to be gradually dissolved. That is, the acid treatment is easily controlled, and thus it is possible to properly perform the acid treatment on the entire surface of the oxide or the like 201a without unevenness. With this, it is possible to properly improve the water splitting activity by properly removing a surface defect, an interface defect, or the like of the oxide or the like 201a.

As a monomer forming a polyorganic acid, various types of organic acids can be used, that is, a sulfonic acid and an acrylic acid are preferable, and a sulfonic acid is particularly preferable. As a sulfonic acid, various types of sulfonic acids can be used, particularly, a sulfonic acid having a hydrocarbon group having 6 or more carbon atoms are preferable, and a sulfonic acid having an aryl group is particularly preferable. Since the aryl group can stabilize the anionic state of sulfonic acid through conjugation, it has high acidity and is more preferable as an acid. In addition, the aryl group is hydrophobic, difficult to enter the inside of the oxide or the like, and does not cause excessive corrosion of oxides or the like. Specifically, a benzenesulfonic acid, a toluenesulfonic acid, a styrenesulfonic acid, and a styrene sulfonic acid are particularly preferable. In a case of using a polystyrene sulfonic acid is used as polyorganic acid, the balance between the solubility of the optical semiconductor by the acid treatment and the controllability of the acid treatment becomes particularly excellent. That is, it does not excessively dissolve the optical semiconductor while performing the acid treatment appropriately.

If the degree of polymerization of the polyorganic acid is equal to or greater than 10, the effect according to the present invention will be exhibited. When the degree of polymerization is equal to or greater than 10, the polyorganic acid becomes not easy to be immersed into the oxide or the like 201a, and the surface of the oxide or the like 201a can be properly dissolved without unevenness.

Particularly, the polyorganic acid preferably has the weight average molecular weight in a range of 1,000 to 1,000,000. The lower limit of the weight average molecular weight is preferably equal to or greater than 1000, and further preferably equal to or greater than 2000, and the upper limit thereof is preferably equal to or smaller than 1,000,000, and further preferably equal to or smaller than 100,000. The polyorganic acid having the molecular weight within the aforementioned range is becomes not easy to be immersed into the oxide or the like 201a, and the surface of the oxide or the like 201a can be properly subjected to the acid treatment without unevenness. That is, the control of the acid treatment becomes easier.

(Sulfonic Acid)

In the first step, it is possible to use a sulfonic acid instead of the polyorganic acid, or together with the polyorganic acid. As a sulfonic acid, it is possible to use the same sulfonic acid as that exemplified as a monomer forming the above-described polyorganic acid. In a case where the acid treatment is performed on the surface of the oxide or the like 201a by using a sulfonic acid, the surface of the oxide or the like 201a can be gradually dissolved without excessively corroding the oxide or the like 201a as compared with the case of using aqua regia or the like. The sulfonic acid is substituted with a hydrophobic organic group, and entry into the oxide can be suppressed. That is, the acid treatment is easily controlled, and thus it is possible to properly perform the acid treatment on the entire surface of the oxide or the like 201a without unevenness. With this, it is possible to properly improve the water splitting activity by properly removing a surface defect, an interface defect, or the like of the oxide or the like 201a.

In the present invention, among the polyorganic acid and the sulfonic acid, the polyorganic acid is preferably used. When a polyorganic acid having a small volatility is used, the remaining oxide or the like is easily collected after the acid treatment and can be reused.

The above-described organic acid is dissolved in the solution 202. Here, a solvent dissolving an organic acid is not particularly limited. It is possible to use water, various organic solvents (preferably alcohols such as methanol, ethanol, and ethylene glycol) and a mixed solvent of water. Water is particularly preferable.

The concentration of the organic acid in the solution 202 is not particularly limited as long as the surface of the oxide or the like 201a can be subjected to the acid treatment. Particularly, the concentration in a range of pKa −4 to 4 is preferable. The lower limit of pKa is preferably equal to or greater than −3, and the upper limit thereof is preferably equal to or less than 2. When pKa is within the aforementioned range, the balance between the solubility of the optical semiconductor by the acid treatment and the controllability of the acid treatment becomes more excellent. Note that, the above-described pKa is changed depending on the types of the solvents in addition to the concentration of the organic acid. In other words, it is possible to preferably adjust pKa by not only adjusting the concentration of the organic acid, but also changing the types of the solvents.

Note that, the solution 202 may contain "other organic acids" in addition that the above-described organic acids to the extent that the effect of the present invention is not impaired. For example, a solution containing a polysulfonic acid and a small amount of carboxyl acids is also within the scope of the present invention. The content of the "other organic acids" is preferably equal to or less than 50% by mass with respect to the entire content (100% by mass) of the solution 202. In addition, the solution 202 may contain an inorganic acid to the extent that the effect of the present invention is not impaired. Here, as described above, the inorganic acid excessively corrodes the oxide or the like 201a in a short time, and thus the content needs to be very small. For example, the content is set to be equal to or less than 10% by mass with respect to the entire content (100% by mass) of the solution 202.

(Method of Contact Between Oxide 201a and Solution 202)

In the first step, the method of contact between the oxide or the like 201a and the solution 202 described above is not particularly limited as long as the acid treatment is properly performed on the oxide or the like 201a by the contact. For example, various configurations are applicable, for example, a configuration in which the oxide or the like 201a is impregnated into the solution 202, a configuration in which the surface of the oxide or the like 201a is coated with the solution 202, and a configuration in which the solution 202 is sprayed to the surface of the oxide or the like 201a.

In addition, the temperature of the solution 202 is not particularly limited. With the solution 202 at room temperature, the effect is sufficiently exhibited. The temperature of the solution 202 is typically equal to or higher than 0° C. and less than 100° C., preferably in a range of 5° C. to 80° C., and more preferably in a range of 10° C. to 50° C.

The contact time between the oxide or the like 201a and the solution 202 may be appropriately adjusted in accordance with the types or shapes of the oxide or the like 201a. That is, in the second step described below, the contact time may be set to the extent that the oxide or the like 201b remains as a solid content. Note that, even when the contact time is very short, it is possible to reduce the surface defect, the interface defect, and the like, and the effect of the present invention is exhibited. On the other hand, as described above, since the acid treatment is performed by using a solution of organic acid 202 in the present invention, even when the contact time is set to be long (for example, approximately 15 hours to 20 hours), the effect of the present invention is exhibited without excessively roughening the surface of the oxide or the like 201a. This is, the contact time may be short or long. The relationship between the contact time and the photolytic water splitting activity will be more specifically described in Examples.

In addition, the pressure at the time of contact between the oxide or the like 201a and the solution 202 is not particularly limited, and may be either reduced pressure, normal pressure, or increased pressure. Typically, it is typically in a range of 0 atm to 10 atm, preferably in a range of 0 atm to 5 atm, and is further preferably in a range of 0 atm to 3 atm.

3.1.2. Second Step (Collecting Step)

The second step is a step of collecting the remaining oxide or the like 201b as a solid content after performing the first step. The collecting method is not particularly limited. For example, in a case where the particulate oxide or the like 201b is immersed into the solution 202, the particulate oxide or the like 201b can be collected through the filtration and washing. In addition, in a case where the sheet-like oxide or the like 201b is immersed into the solution 202, the sheet-like oxide or the like 201b can be collected by pulling up the sheet-like oxide or the like 201b from the solution 202. In any case, the solution 202 remains on the surface of oxide or the like 201b after performing the first step. For this reason, when collecting the oxide or the like 201b, the solution 202 is preferably removed from the surface of the oxide or the like 201b by washing the oxide or the like 201b by using water and the organic solvent.

As described above, through the first step and the second step, it is possible to obtain the oxide or the like 201b in which the surface defect, the interface defect, and the like as illustrated in FIG. 7B are reduced. The oxide or the like 201b is an optical semiconductor having excellent water splitting activity.

3.2. Surface State of Optical Semiconductor to be Produced

An element derived from the organic acid remains on the surface of the optical semiconductor to be produced in the third aspect of the present invention in some cases. A functional group (a hydroxyl group, an amino group, or the like) on the surface of the photocatalyst and the element derived from the organic acid are chemically bonded to each other through a hydrogen bond or the like, and if the optical semiconductor is washed with water or the organic solvent, completely removing the element derived from the organic acid from the surface of the optical semiconductor is considered to be difficult. For example, in the first step, in a case of using a polysulfonic acid as an organic acid, in many cases, an S content in a range of 0.05 atm % to 2 atm % remains on the surface of the optical semiconductor to be produced even though the optical semiconductor is formed of an oxide, a nitride, or an oxynitride. This is specific to the product according to the present invention. In other words, it can be presumed that the optical semiconductor which is formed of an oxide, a nitride, or an oxynitride, and has the S content in a range of 0.05 atm % to 2 atm % remains on the surface thereof was produced by the producing method according to the present invention.

3.3. Method of Producing Photocatalyst

The third aspect of the present invention also has an aspect of a method of producing a photocatalyst. That is the method of producing a photocatalyst including a step of loading the promotor on the surface of the optical semiconductor produced by the above-described method of producing an optical semiconductor.

3.3.1. Co-Catalyst

The co-catalyst may be a material which can be used as a co-catalyst of the photocatalyst. Examples of the co-catalyst for producing oxygen include metal such as Co, Cr, Sb, Nb, Th, Mn, Fe, Co, Ni, Ru, Rh, and Ir, and an oxide, a sulfide, or a composite oxide thereof. In addition, examples of the co-catalyst for producing hydrogen include Pt, Pd, Rh, Ru, Ni, Au, Fe, Ru—Ir, Pt—Ir, NiO, $RuO_2$, $IrO_2$, $Rh_2O_3$, or Cr—Rh composite oxide, and a sulfide obtained by adding sulfur and thiourea to the aforementioned metal.

The size of the co-catalyst may be set to be the extent that the co-catalyst can be loaded on the surface of the optical semiconductor. In order to load the co-catalyst on the surface of the optical semiconductor, the co-catalyst needs to be smaller than the particulate, bulky, or sheet-like optical semiconductor. Particularly, a configuration in which the co-catalyst having the particle size in a range of 1.0 nm to 25 nm is loaded on the surface the optical semiconductor particle having the particle size in a range of 50 nm to 500 μm is preferable. The lower limit of the particle size of the co-catalyst is preferably equal to or greater than 1.2 nm, and further preferably equal to or greater than 1.5 nm, and the upper limit thereof is preferably equal to or smaller than 20 nm, and further preferably equal to or smaller than 10 nm. It is possible to further improve the photolytic water splitting activity by adjusting the particle size of the co-catalyst to be within the above-described range.

If the loaded amount of the co-catalysts is excessively small, no effect is obtained, and if the loaded amount is excessively large, the co-catalyst itself absorbs or scatters the light so as to inhibit the light absorption of the optical semiconductor, or serves as a recombination center, and therefore, the catalytic activity is rather deteriorated. From this viewpoint, the loaded amount of the co-catalysts in the photocatalyst is preferably in a range of 0.01% by mass to 20% by mass, further preferably equal to or less than 15% by mass, and particularly preferably equal to or less than 10% by mass with respect to the entire content of the photocatalysts (100% by mass).

3.3.2. Method of Loading Co-Catalyst

Regarding the method of loading the co-catalyst on the optical semiconductor, as described in the first aspect of the present invention and the second aspect of the present invention, using the microwave is preferable. In this regard, the method of loading the co-catalyst in the third aspect of the present invention is not limited to using the microwave. Any known loading method can be used. It is possible to load the co-catalyst on the surface of the optical semiconductor by using, for example, a method of immersing powders or molds of the optical semiconductor into a solution containing a metal source to be the co-catalyst or a colloidal solution, and evaporating and drying the obtained solution, or a method of sublimating a metal carbonyl compound so as to be adhered to the surface of the optical semiconductor, and then performing thermal composition. In addition, the co-catalyst may be loaded by using a method as disclosed in document (PNAS vol. 106, 20633-20636 (2009)), in which the powders or molds of the optical semiconductor are immersed into a solution containing ions serving as a co-catalyst, and the solution is irradiated with light.

As described above, it is possible to produce the photocatalyst which is excellent in the water splitting activity by loading the co-catalyst on the surface of the optical semiconductor produced in the third aspect of the present invention. Note that, after the co-catalyst is loaded on the optical semiconductor, it is not possible to perform the acid treatment appropriately on the optical semiconductor. The reason of this is that the co-catalyst may be dissolved by the acid treatment. Accordingly, in the present invention, it is important to load the co-catalyst on the optical semiconductor obtained through the acid treatment by using the organic acid.

Note that, the optical semiconductor produced in the third aspect of the present invention can be used as a photocatalyst without loading the co-catalyst thereon. However, it is preferable that the co-catalyst be loaded on the optical semiconductor in order to set the photocatalyst to have more excellent water splitting activity.

As described above, the present invention was described with reference to the drawings. Note that, in the above description, the first to third aspects of the present invention were independently described; however, the present invention may have a configuration in which the first to third aspects of the present invention are combined with each other. In the following description, the present invention will be more specifically described with reference to Examples, and the present invention is not limited to the following Examples as long as it does not exceed its gist.

EXAMPLES

Preliminary Experiment

In closed system, regarding a case where only a solution in which the co-catalyst source is dissolved and which does not allow the optical semiconductor to be present is heated with microwave, and a case where the aforementioned solution and the optical semiconductor particle are heated with microwave, the presence or absence of precipitation of co-catalyst particle was confirmed.

(Case where Optical Semiconductor Particle is not Allowed to be Present)

$Co(NO_3)_2$ (29 mg, 0.1 N) was dissolved in ethylene glycol (3 mL) so as to form a solution, the obtained solution is irradiated with a microwave (frequency of 2.45 GHz) in closed system, and was heated for 15 minutes by raising the temperature up to 250° C. However, there was no change in the appearance of the solution before and after heating, and the precipitation of the co-catalyst particle was confirmed.

(Case where Optical Semiconductor Particle is Allowed to be Present)

100 mg of $BiVO_4$ was put as the optical semiconductor into the above-described solution, and the obtained solution was irradiated with the microwave as described above, and filtrated and washed so as to obtain a solid content. The color of $BiVO_4$ which was yellow before the heat treatment was changed to black after heat treatment, and CoO, $Co_2O_3$, or the mixture thereof (hereinafter, refer to $CoO_x$) can be loaded as the co-catalyst onto the surface of $BiVO_4$.

On the basis of the above-described preliminary experiment result, the plurality of types of different optical semiconductors are composited with the co-catalyst in the solution by using the heat from the microwave so as to obtain a composite photocatalyst, and the water splitting activity was evaluated.

1. Regarding First Aspect of the Present Invention

1.1. TaON:LaTiO$_2$N Composite Photocatalyst

Examples 1-1, 1-2, and 1-3

Producing of TaON:LaTiO$_2$N Composite Photocatalyst

Co(NH$_3$)$_6$Cl$_3$ was dissolved as a co-catalyst source in 18 mL of ethylene glycol so as to obtain 2% by mass of solution. A total of 150 mg of TaON particles (particle size distribution several μm) and LaTiO$_2$N particles (particle size distribution several μm) as the plurality of types of optical semiconductors were put in the obtained solution at a predetermined mass ratio indicated in the following Table 1, and then the solution was closed in a container. Thereafter, the inside of the container was irradiated with the microwave (frequency of 2.45 GHz) such that a temperature of the inside was raised up to 150° C., and then the container was heated and held for 60 minutes. After performing the heat treatment, a solid content was extracted from the inside of the container so as to be filtrated and washed with ethanol, and thereby a composite photocatalyst in which CoO$_x$ was loaded as the co-catalyst on the surface of the TaON:LaTiO$_2$N composite particle was obtained.

Manufacturing of Electrode for Photolytic Water Splitting Reaction

Figure 8:
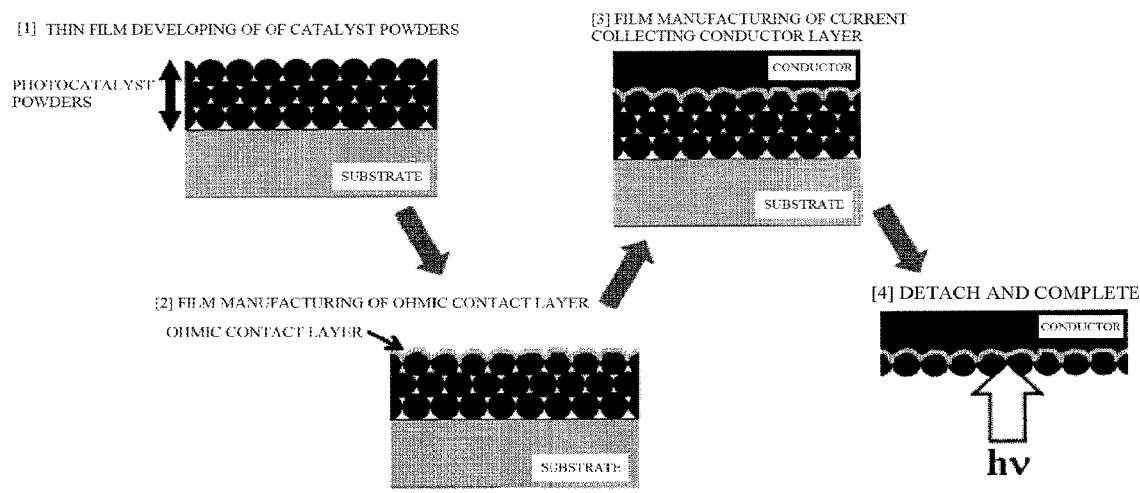
FIG. 8 is a schematic view illustrating procedure of manufacturing an electrode for photolytic water splitting reaction.

The electrode for photolytic water splitting reaction was manufactured by using the method illustrated in FIG. 8. That is, the obtained composite photocatalyst (30 mg) is suspended in 1 mL of 2-propanol, 200 μL of suspended solution was added dropwise onto a first glass substrate (soda-lime glass 30×30 mm), and the first glass substrate was repeatedly dried three times so as to form a photocatalyst layer. Subsequently, Nb corresponding to a contact layer was laminated by a sputtering method. The layers were stacked by approximately several hundred nm with ULVAC VPC-260F as an apparatus to be used. Then, Ti corresponding to a current collecting conductor layer was stacked by approximately several nm by a sputtering method. Thereafter, a second glass substrate (soda-lime glass; not shown) was adhered to the current collecting conductor layer by using an epoxy resin. Lastly, the first glass substrate was removed, ultrasonic cleaning was performed in pure water for 10 minutes, and thereby an electrode for photolytic water splitting reaction including a composite photocatalyst layer/a contact layer/a current collecting layer was obtained.

Performance Evaluation

The electrolyte decomposition was performed by using the obtained electrode for photolytic water splitting reaction under the following measurement conditions. The photocurrent density in measurement potentials of 0.7 V, 1.0 V, and 1.2 V was set as an index of evaluation. The results are indicated in the following Table 1.

Measurement Conditions

Light source AM 1.5 solar simulator [AM 1.5 G (100 mW/cm$^2$)]
pH=13.0 Electrolyte NaOH, 100 mL
Argon atmosphere
Reference electrode Ag/AgCl, Counter electrode Pt wire
LSV measurement ($E_0$=−1.1 V, $E_1$=0.3 V, $T_0$=1 s, $T_1$=10 ms/V)

Example 1-4

Producing TaON/CoO$_x$ Photocatalyst Particle

Co(NH$_3$)$_6$Cl$_3$ was dissolved as a co-catalyst source in 18 mL of ethylene glycol so as to obtain 2% by mass of solution. 150 mg of TaON particles (particle size distribution several μm) were put in the obtained solution and then the solution was closed in a container. Thereafter, the inside of the container was irradiated with the microwave (frequency of 2.45 GHz) such that a temperature of the inside was raised up to 150° C., and then the container was heated and held for 60 minutes. After performing the heat treatment, a solid content was extracted from the inside of the container so as to be filtrated and washed with ethanol, and thereby a photocatalyst particle (hereinafter, referred to as photocatalyst particle (A)) in which CoO$_x$ was loaded as the co-catalyst on the surface of the TaON particle was obtained.

Producing of LaTiO$_2$N/CoO$_x$ Photocatalyst Particle

Co(NH$_3$)$_6$Cl$_3$ was dissolved as a co-catalyst source in 18 mL of ethylene glycol so as to obtain 2% by mass of solution. 150 mg of LaTiO$_2$N particles (Particle size distribution several μm) were put in the obtained solution, and then closed into a container. Thereafter, the inside of the container was irradiated with the microwave (frequency of 2.45 GHz) such that a temperature of the inside was raised up to 198° C., and then the container was heated and held for 30 minutes. After performing the heat treatment, a solid content was extracted from the inside of the container so as to be filtrated and washed with ethanol, and thereby a photocatalyst particle (hereinafter, referred to as photocatalyst particle (B)) in which CoO$_x$ was loaded as the co-catalyst on the surface of the LaTiO$_2$N particle was obtained.

Producing TaON:LaTiO$_2$N Composite Photocatalyst

The photocatalyst particle (A) and the photocatalyst particle (B) were put in ethylene glycol at a predetermined mass ratio indicated in Table 1, and was closed in the container. Thereafter, the inside of the container was irradiated with the microwave (frequency of 2.45 GHz) such that a temperature of the inside was raised up to 150° C., and then the container was heated and held for 60 minutes. After performing the heat treatment, a solid content was extracted from the inside of the container so as to be filtrated and washed with ethanol, and thereby a composite photocatalyst in which the photocatalyst particle (A) and the photocatalyst particle (B) were composited was obtained.

Manufacturing of Electrode for Photolytic Water Splitting Reaction and Performance Evaluation Except for using composite photocatalyst according to Example 1-4 as a TaON:LaTiO$_2$N composite photocatalyst, the electrode for photolytic water splitting reaction was manufactured by using the same way as that in Example 1-1, and the performance was evaluated based on the same evaluation criteria. The results are indicated in the following Table 1.

Example 1-5

Manufacturing of TaON:LaTiO$_2$N Composite Semiconductor

The TaON particles (particle size distribution several μm) and the LaTiO$_2$N particles (particle size distribution several μm) were put in ethylene glycol at a predetermined mass ratio indicated in Table 1, and was closed in the container. Thereafter, the inside of the container was irradiated with the microwave (frequency of 2.45 GHz) such that a temperature of the inside was raised up to 150° C., and then the container was heated and held for 60 minutes. After performing the heat treatment, a solid content was extracted from the inside of the container so as to be filtrated and washed with ethanol, and thereby a TaON:LaTiO$_2$N composite semiconductor.

Producing TaON:LaTiO$_2$N Composite Photocatalyst

Except for using the above-described TaON:LaTiO$_2$N composite semiconductor as the plurality of types of the optical semiconductors, the TaON:LaTiO$_2$N composite photocatalyst was obtained by the irradiation of microwave by using the same method as that in Example 1-1.

Manufacturing Electrode for Photolytic Water Splitting Reaction and Performance Evaluation Except for using composite photocatalyst according to Example 1-5 as a TaON:LaTiO$_2$N composite photocatalyst, the electrode for photolytic water splitting reaction was manufactured by using the same way as that in Example 1-1, and the performance was evaluated based on the same evaluation criteria. The results are indicated in the following Table 1.

Example 1-6

Producing of TaON/CoO$_x$ the Photocatalyst Particle 0.17 mM of Co(NO$_3$)$_2$ was dissolved as the co-catalyst source in 0.2 mL of water so as to obtain 2% by mass of solution. 100 mg of TaON particles (particle size distribution several μm) which were dispersed in 0.3 mL of water were put in the obtained solution, and 0.3 mL of water was added thereto. After applying ultrasonic wave for 1 minute, water was removed, the obtained powder was heated at 600° C. for one hour under the air flow of 50 mL/min of ammonia, and thereby a TaON photocatalyst particle (the photocatalyst particle (C)) in which CoO$_x$ was loaded was obtained.

Producing LaTiO$_2$N/CoO$_x$ Photocatalyst Particle 0.17 mM of Co(NO$_3$)$_2$ was dissolved as the co-catalyst source in 0.2 mL of water so as to obtain 2% by mass of solution. 100 mg of LaTiO$_2$N particles (particle size distribution several μm) which were dispersed in 0.3 mL of water were put in the obtained solution, and 0.3 mL of water was added thereto. After applying ultrasonic wave for 1 minute, water was removed, the obtained powder was heated at 600° C. for one hour under the air flow of 50 mL/min of ammonia, and thereby a LaTiO$_2$N photocatalyst particle (the photocatalyst particle (D)) in which CoO$_x$ was loaded was obtained.

Producing of TaON:LaTiO$_2$N Composite Photocatalyst

Except for using the photocatalyst particle (C) and the photocatalyst particle (D) as the plurality of types of the optical semiconductors, a composite photocatalyst in which the photocatalyst particle (C) and the photocatalyst particle (D) were composited was obtained by the irradiation of microwave by using the same method as that in Example 1-4.

Manufacturing Electrode for Photolytic Water Splitting Reaction and Performance Evaluation Except for using composite photocatalyst according to Example 1-6 as a TaON:LaTiO$_2$N composite photocatalyst, the electrode for photolytic water splitting reaction was manufactured by using the same way as that in Example 1-4, and the performance was evaluated based on the same evaluation criteria. The results are indicated in the following Table 1.

Comparative Example 1-1

Producing of TaON:LaTiO$_2$N Photocatalyst Mixture

A photocatalyst mixture was obtained by mixing the photocatalyst particle (A) and the photocatalyst particle (B) according to Example 1-4 at a predetermined ratio indicated in the following Table 1.

Manufacturing Electrode for Photolytic Water Splitting Reaction and Performance Evaluation Except for using the photocatalyst mixture instead of a TaON:LaTiO$_2$N composite photocatalyst, the electrode for photolytic water splitting reaction was manufactured by using the same way as that in Example 1-1, and the performance was evaluated based on the same evaluation criteria. The results are indicated in the following Table 1.

<Comparative Example 1-2: Impregnation Loading> (Producing of TaON:LaTiO$_2$N Composite Photocatalyst)

The TaON particle and the LaTiO$_2$N particle were mixed with each other at a predetermined ratio indicated in the following Table 1, 300 μL of water was added to a total of 0.1 g of the obtained mixture, then 10 mM of Co(NO$_3$)$_2$ was added thereto so as to obtain 2% by mass of solution, the obtained solution was irradiated with an ultrasonic wave for one minute such that a solvent was distilled off under reduced pressure. The obtained powder was sintered at 500° C. for one hour under the air flow of ammonia (200 mL/min), and thereby a TaON:LaTiO$_2$N composite photocatalyst in which CoO$_x$ was loaded as the co-catalyst onto the surface of the TaON:LaTiO$_2$N composite optical semiconductor was obtained.

Manufacturing Electrode for Photolytic Water Splitting Reaction and Performance Evaluation Except for using composite photocatalyst according to Comparative Example 1-2 as a TaON:LaTiO$_2$N composite photocatalyst, the electrode for photolytic water splitting reaction was manufactured by using the same way as that in Example 1-1, and the performance was evaluated based on the same evaluation criteria. The results are indicated in the following Table 1.

Reference Example 1-1

Except for using the TaON particle instead of a TaON:LaTiO$_2$N composite photocatalyst, the electrode for photolytic water splitting reaction was manufactured by using the same way as that in Example 1-1, and the performance was evaluated based on the same evaluation criteria. The results are indicated in the following Table 1.

Reference Example 1-2

Except for using the LaTiO$_2$N particle instead of a TaON:LaTiO$_2$N composite photocatalyst, the electrode for photolytic water splitting reaction was manufactured by using the same way as that in Example 1-1, and the performance was evaluated based on the same evaluation criteria. The results are indicated in the following Table 1. Note that, LTON in the table is an abbreviation for LaTiO$_2$N.

TABLE 1

|  | Mass ratio TaON:LTON | mA/cm$^2$ @0.7 V$_{RHE}$ | mA/cm$^2$ @1.0 V$_{RHE}$ | mA/cm$^2$ @1.2 V$_{RHE}$ |
| --- | --- | --- | --- | --- |
| Example 1-1 | 1:1 | 0.49 | 4.06 | 7.23 |
| Example 1-2 | 3:1 | 0.50 | 2.50 | 3.55 |
| Example 1-3 | 1:3 | 0.15 | 2.80 | 4.67 |
| Example 1-4 | 1:1 | 0.38 | 3.00 | 5.33 |
| Example 1-5 | 1:1 | 0.33 | 0.96 | 2.03 |
| Example 1-6 | 1:1 | 0.37 | 3.20 | 5.18 |
| Comparative Example 1-1 | 1:1 | 0.25 | 1.77 | 2.63 |
| Comparative Example 1-2 | 1:1 | 0.21 | 1.29 | 2.51 |
| Reference Example 1-1 | 1:0 | 0.68 | 1.46 | 1.53 |
| Reference Example 1-2 | 0:1 | 0 | 1.54 | 3.32 |

1.2. BiVO$_4$:LaTiO$_2$N Composite Photocatalyst

Example 1-7

Except for using BiVO$_4$ instead of TaON, an experiment was performed by using the same way as in Example 1-1. The results are indicated in the following Table 2.

Reference Example 1-3>

Except for using the BiVO$_4$ particle instead of a TaON:LaTiO$_2$N composite photocatalyst, the electrode for photolytic water splitting reaction was manufactured by using the same way as that in Example 1-1, and the performance was evaluated based on the same evaluation criteria. The results are indicated in the following Table 2.

TABLE 2

|  | Mass ratio BiVO$_4$:LTON | mA/cm$^2$ @0.7 V$_{RHE}$ | mA/cm$^2$ @1.0 V$_{RHE}$ | mA/cm$^2$ @1.2 V$_{RHE}$ |
| --- | --- | --- | --- | --- |
| Example 1-7 | 1:1 | 0.40 | 0.52 | 3.97 |
| Reference Example 1-2 | 0:1 | 0 | 1.54 | 3.32 |
| Reference Example 1-3 | 1:0 | 1.20 | 1.52 | 1.70 |

1.3. TaON:BaTaO$_2$N Composite Photocatalyst

Example 1-8

Except for using BaTaO$_2$N instead of LaTiO$_2$N, an experiment was performed by using the same way as in Example 1-1. The results are indicated in the following Table 3.

Reference Example 1-4>

Except for using the BaTaO$_2$N particle instead of a TaON:LaTiO$_2$N composite photocatalyst, the electrode for photolytic water splitting reaction was manufactured by using the same way as that in Example 1-1, and the performance was evaluated based on the same evaluation criteria. The results are indicated in the following Table 3.

TABLE 3

|  | Mass ratio TaON:BTON | mA/cm$^2$ @0.7 V$_{RHE}$ | mA/cm$^2$ @1.0 V$_{RHE}$ | mA/cm$^2$ @1.2 V$_{RHE}$ |
| --- | --- | --- | --- | --- |
| Example 1-8 | 1:1 | 0.30 | 1.03 | 1.54 |
| Reference Example 1-1 | 1:0 | 0.68 | 1.46 | 1.53 |
| Reference Example 1-4 | 0:1 | 0.05 | 0.55 | 1.00 |

Evaluation by TEM and STEM-EDS

Figure 9A:
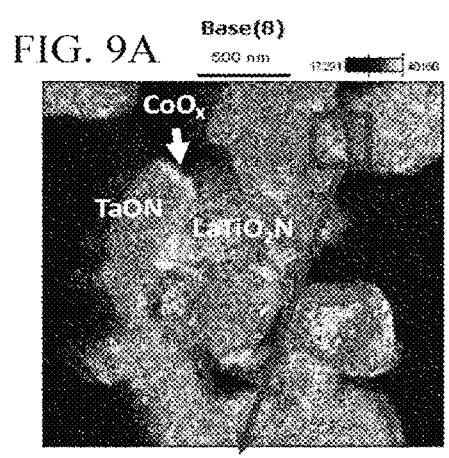
FIG. 9A to FIG. 9D are STEM images of a composite photocatalyst according to Example 1-1.
Figure 9B:
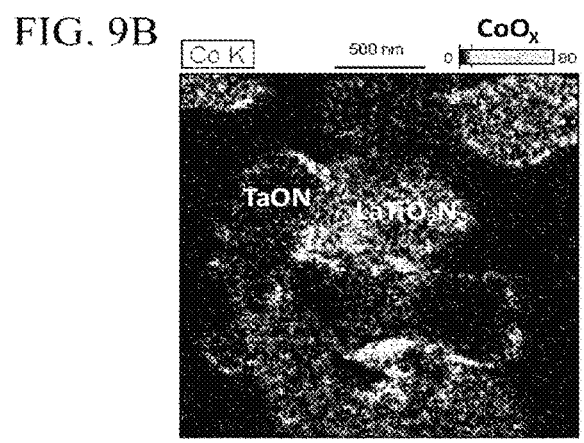
Figure 9C:
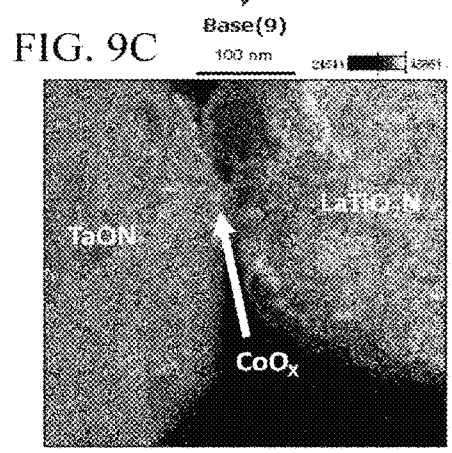
Figure 9D:
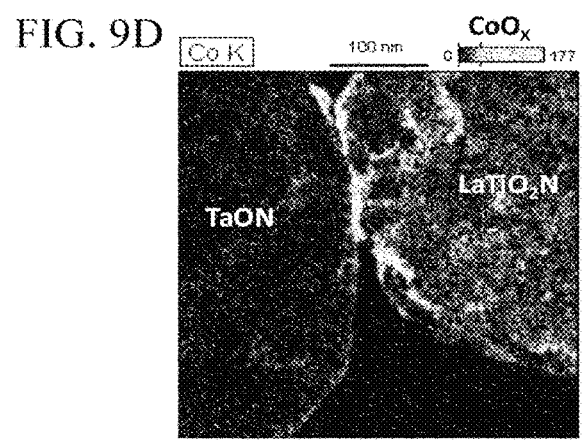
Figure 10:
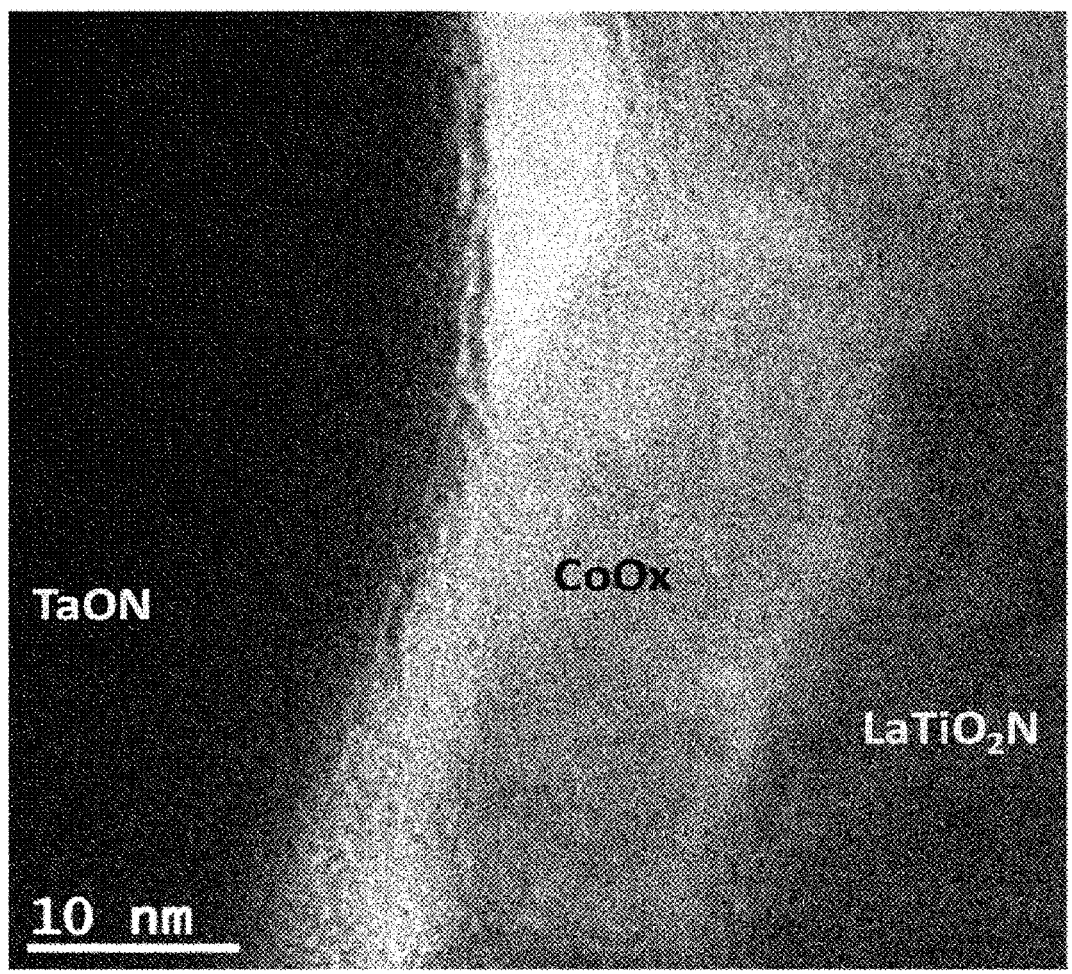
FIG. 10 is a STEM image (an enlarged view) of the composite photocatalyst according to Example 1-1.

The surface properties of the composite photocatalysts according to Example 1-1, and Comparative Examples 1-1 and 1-2 were evaluated by using TEM and STEM-EDS. The results are indicated in FIGS. 9 to 11. Note that, FIG. 9A illustrates a TEM observation image, FIG. 9C is an enlarged image in which a part of FIG. 9A is enlarged, FIG. 9B is an image of elemental EDS (Energy Dispersive x-ray Spectroscopy) mapping of Co in the same field of view as in FIG. 9A, and FIG. 9D is an image of the elemental EDS mapping of Co in the same field of view as FIG. 9C.

Figure 11A:
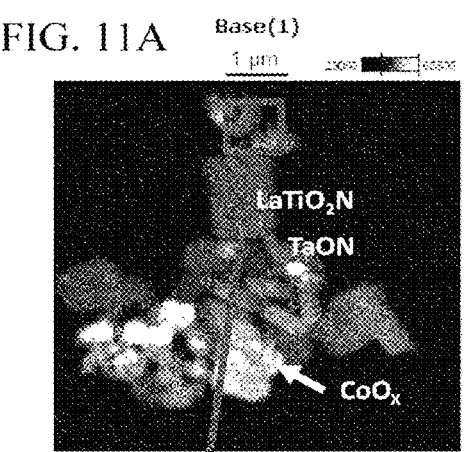
FIG. 11A to FIG. 11D are STEM images of a composite photocatalyst according to Comparative Example 1-2.
Figure 11B:
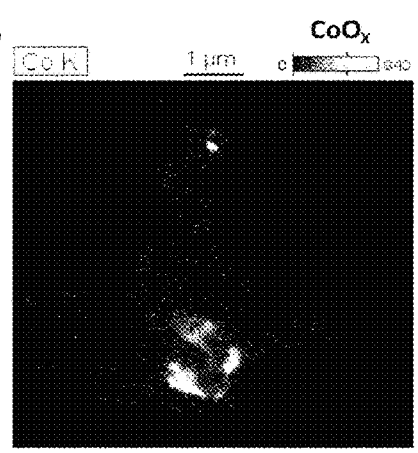
Figure 11C:
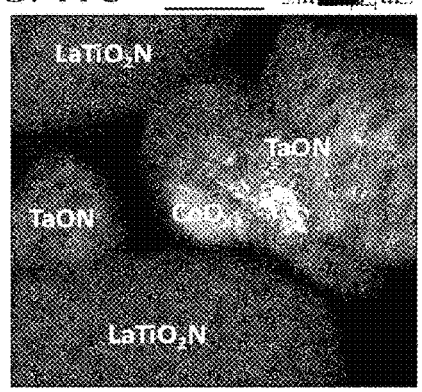
Figure 11D:
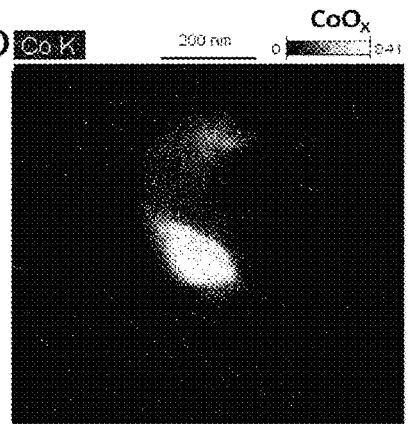

As apparent from FIGS. 9 and 10, the composite photocatalyst according to Example 1-1 is present between the TaON particle and the LaTiO$_2$N particle, and is present so as to cover the surface of the composite photocatalyst. That is, regarding the composite photocatalyst according to Example 1-1, it was found that the co-catalyst is present on the surfaces of the plurality of types of the optical semiconductors, and is present in a state of being interposed between the bonding surfaces of the plurality of types of the optical semiconductors, or is present in a state of covering the optical semiconductor. Further, in the composite photocatalyst according to Example 1-1, a crystal lattice was also observed in the co-catalyst portion. On the other hand, as apparent from FIG. 11, regarding the composite photocatalyst according to Comparative Example 1-2, the co-catalysts are aggregated on the photocatalyst, and are almost not present on the interface. Note that, FIG. 11A illustrates a TEM observation image, FIG. 11C is an enlarged image in which a part of FIG. 11A is enlarged, FIG. 11B is an image of elemental EDS (Energy Dispersive x-ray Spectroscopy) mapping of Co in the same field of view as in FIG. 11A, and FIG. 11D is an image of the elemental EDS mapping of Co in the same field of view as FIG. 11C.

As described above, it was found that through the heating step in which a solid-liquid mixture containing the solvent, the co-catalyst, or the co-catalyst source, and the plurality of types of the optical semiconductors was irradiated with microwave such that the solid-liquid mixture was heated, it is possible to efficiently load the co-catalyst having the small particle size on the surface of the optical semiconductor in a highly dispersed manner, and to produce the photocatalyst having the excellent water splitting activity.

2. Second Aspect of the Present Invention

2.1. BaNbO$_2$N

Example 2-1-1

Producing of Photocatalyst

Co(NO$_3$)$_2$ was dissolved as a co-catalyst source in 18 mL of ethylene glycol so as to obtain 2% by mass of solution, then 150 mg of BaNbO$_2$N particles (particle size distribution several μm) was put into the obtained solution, and the solution is closed in a container. Thereafter, the inside of the container was irradiated with the microwave (frequency of 2.45 GHz) such that a temperature of the inside was raised up to 250° C., and then the container was heated and held for 15 minutes. After performing the heat treatment, a solid content was extracted from the inside of the container so as to be filtrated and washed with ethanol, and thereby a photocatalyst particle in which CoO$_x$ was loaded as the co-catalyst on the surface of the BaNbO$_2$N particle was obtained.

Producing of Electrode for Photolytic Water Splitting Reaction

The electrode for photolytic water splitting reaction was manufactured by using the method illustrated in FIG. 8. That is, the obtained photocatalyst (30 mg) is suspended in 1 mL of 2-propanol, 200 μL of suspended solution was added dropwise onto a first glass substrate (soda-lime glass 30×30 mm), and the first glass substrate was repeatedly dried three times so as to form a photocatalyst layer. Subsequently, Nb corresponding to a contact layer was laminated by a sputtering method. The layers were stacked by approximately several hundred nm with ULVAC VPC-260F as an apparatus to be used. Then, Ti corresponding to a current collecting conductor layer was stacked by approximately several nm by a sputtering method. Thereafter, a second glass substrate (soda-lime glass; not shown) was adhered to the current collecting conductor layer by using an epoxy resin. Lastly, the first glass substrate was removed, ultrasonic cleaning was performed in pure water for 10 minutes, and thereby an electrode for photolytic water splitting reaction including a photocatalyst layer/a contact layer/a current collecting layer was obtained.

Performance Evaluation

The electrolyte decomposition was performed by using the obtained electrode for photolytic water splitting reaction under the following measurement conditions. The photocurrent density in measurement potential of 1.2 V was set as an index of evaluation. The results are indicated in the following Table 4.

Measurement Conditions

Light source AM 1.5 solar simulator [AM 1.5 G (100 mW/cm$^2$)]
pH=13.0 Electrolyte NaOH, 100 mL
Argon atmosphere
Reference electrode Ag/AgCl, Counter electrode Pt wire
LSV measurement ($E_0$=−1.1 V, $E_1$=0.3 V, $T_0$=1 s, $T_1$=10 ms/V)

Example 2-1-2

Producing of Photocatalyst

Except for using Co(NH$_3$)$_6$Cl$_3$ as the co-catalyst source, a photocatalyst particle in which CoO$_x$ was loaded as the co-catalyst on the surface of the BaNbO$_2$N particle was obtained by using the same way as that in Example 2-1-1.

Example 2-1-3

Producing of Photocatalyst

Fe(NO$_3$)$_2$ was dissolved as a co-catalyst source in 18 mL of ethylene glycol so as to obtain 2% by mass of solution, then 150 mg of BaNbO$_2$N particles (particle size distribution several μm) was put into the obtained solution, and the solution is closed in a container. Thereafter, the inside of the container was irradiated with the microwave (frequency of 2.45 GHz) such that a temperature of the inside was raised up to 150° C., and then the container was heated and held for 60 minutes. After performing the heat treatment, 2% by mass of Co(NH$_3$)$_2$Cl$_3$ was added to the inside of the container was irradiated with the microwave (frequency of 2.45 GHz) such that a temperature of the inside was raised up to 150° C., and then the container was heated and held for 60 minutes. After performing the heat treatment, a solid content was extracted from the inside of the container so as to be filtrated and washed with ethanol, and thereby a photocatalyst particle in which FeO$_x$ (FeO, Fe$_2$O$_3$, or the mixture thereof) and CoO$_x$, or the composite oxide were loaded as the co-catalyst on the surface of the BaNbO$_2$N particle was obtained.

Comparative Example 2-1-1: Immersing and Loading of Amine

Producing of Photocatalyst 10 mM of 5 mL Co(NO$_3$)$_2$ as the co-catalyst source and 0.1 N of 5 mL ammonia water each was added into 40 mL of pure water, pH of the mixture was adjusted to be 8.5, then 0.1 g of BaNbO$_2$N was added thereto, and the mixture was immersed for one hour. After removing the supernatant by centrifugation, the mixture was subjected to suction filtration, was dried at 70° C. for one night, and thereby a photocatalyst particle in which CoO$_x$ was loaded as the co-catalyst on the surface of the BaNbO$_2$N particle was obtained.

Comparative Example 2-1-2: Impregnation Loading

Producing of Photocatalyst

After 300 μL of water was added to BaNbO$_2$N (0.1 g) 10 mM of Co(NO$_3$)$_2$ was added thereto so as to obtain 2% by mass of solution, and the obtained solution was irradiated with an ultrasonic wave for one minute such that a solvent was distilled off under reduced pressure. The obtained powder was sintered at 500° C. for one hour under the air flow of ammonia (200 mL/min), and thereby a photocatalyst particle in which CoO$_x$ was loaded as the co-catalyst on the surface of the BaNbO$_2$N particle was obtained.

Manufacturing Electrode for Photolytic Water Splitting Reaction, and Evaluation

Regarding each of the photocatalyst particles according to Examples 2-1-2 and 2-1-3, and Comparative Examples 2-1-1 and 2-1-2, the electrode for photolytic water splitting reaction was manufactured by using the same way as that in Example 2-1-1, and the performance thereof was evaluated. The results are indicated in the following Table 4.

TABLE 4

| | Reaction conditions | mA/cm$^2$@1.2 V$_{RHE}$ |
|---|---|---|
| Example 2-1-1 | Microwave (250° C., 15 min) | 0.95 |
| Example 2-1-2 | Microwave (150° C., 60 min) | 1.52 |
| Example 2-1-3 | Microwave (150° C., 60 min) | 0.70 |
| Comparative Example 2-1-1 | Immersing and loading of ammine (70° C., dry for one night) | 0.47 |
| Comparative Example 2-1-2 | Impregnation loading (500° C., sintered for 60 min) | 0.60 |

As apparent from the results indicated in Table 4, Example 2-1-1 to Example 2-1-3 in which the heat treatment was performed by using the microwave in the closed system, even when comparing with a method of immersing and loading of amine (Comparative Example 2-1-1) and an impregnation loading method (Comparative Example 2-1-2) which are conventional methods, the photocurrent density of the electrode for photolytic water splitting reaction is large and the performance thereof is excellent.

Figure 12:
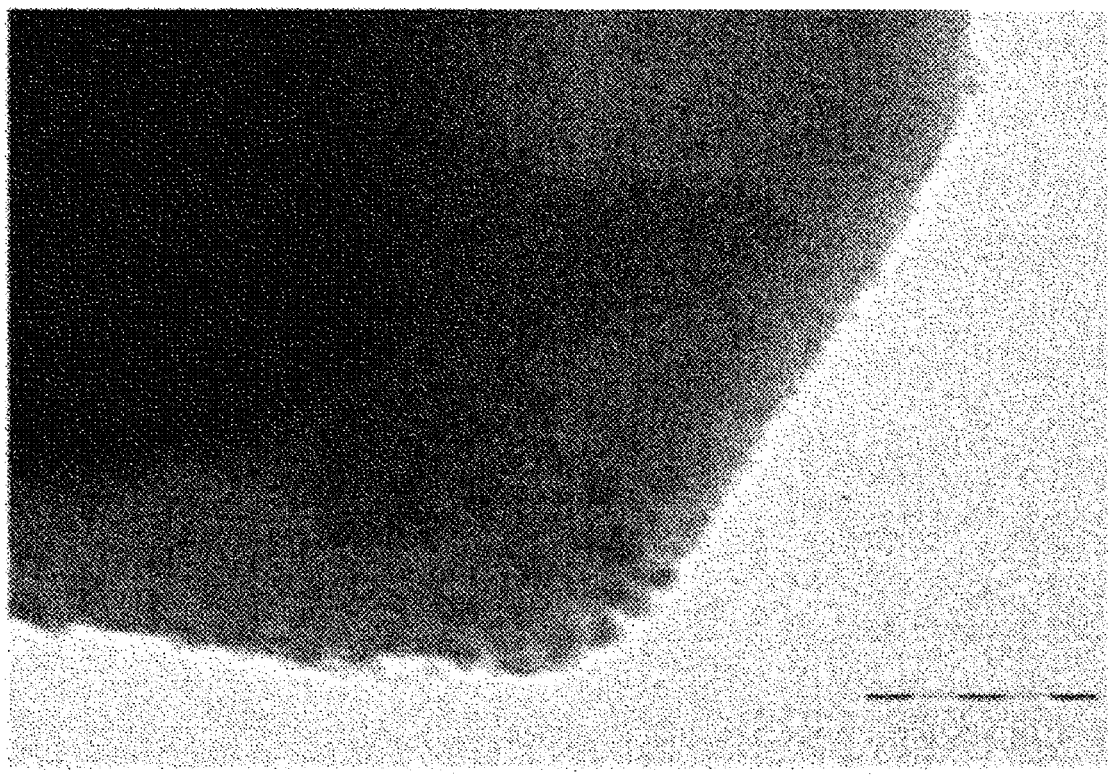
FIG. 12 is a TEM observation image of a photocatalyst particle according to Example 2-1-1.
Figure 13:
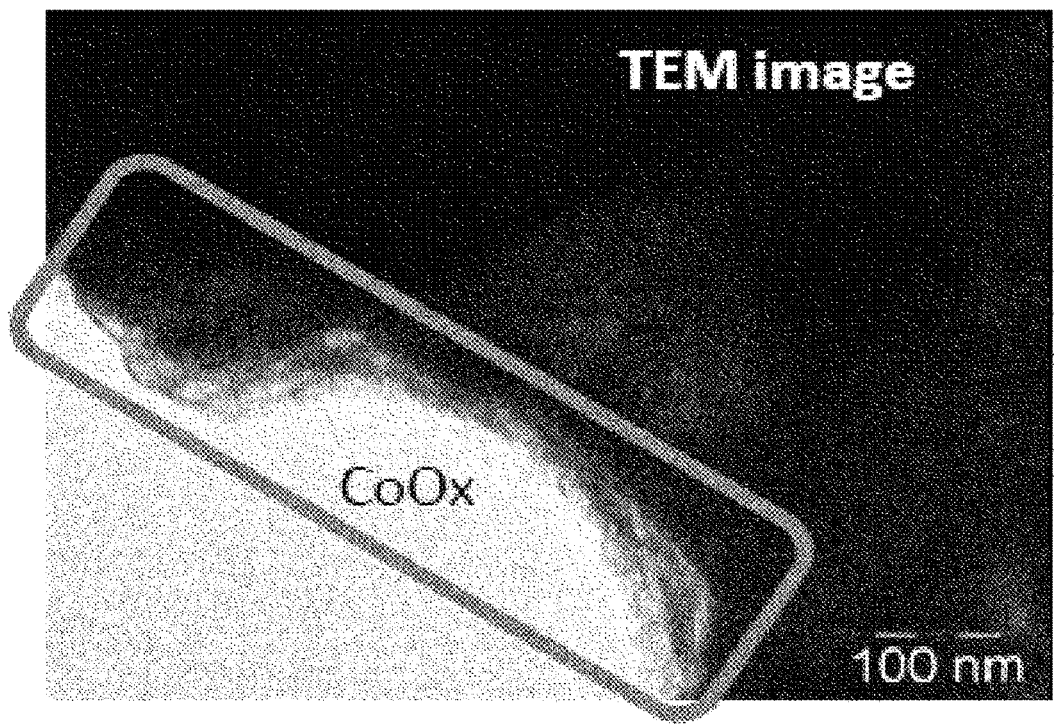
FIG. 13 is a TEM observation image of a photocatalyst particle according to Comparative Example 2-1-1.
Figure 14:
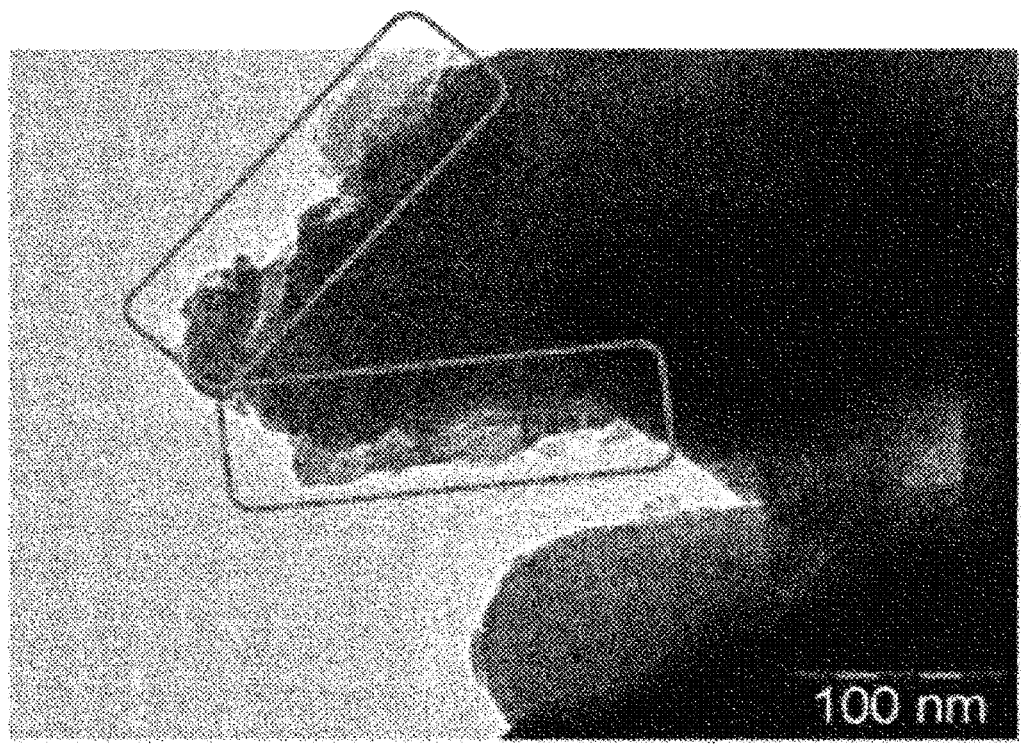
FIG. 14 is a TEM observation image of a photocatalyst particle according to Comparative Example 2-1-2.

FIGS. 12 to 14 illustrate the TEM observation image of the photocatalyst according to Example 2-1-1, Comparative Example 2-1-1, and Comparative Example 2-1-2. The photocatalyst in FIG. 12 corresponds to the photocatalyst in Example 2-1-1, the photocatalyst in FIG. 13 corresponds to the photocatalyst in Comparative Example 2-1-1, and the photocatalyst in FIG. 14 corresponds to the photocatalyst in Comparative Example 2-1-2. As apparent from FIG. 12, in the photocatalyst according to Example 2-1-1, very small co-catalyst particles are loaded in a highly dispersed manner. On the other hand, as apparent from FIGS. 13 and 14, in the photocatalyst according to Comparative Example, the co-catalysts are aggregated on the surface of the optical semiconductor.

2.2. TaON

Example 2-2-1

Producing of Photocatalyst

Co(NH$_3$)$_6$Cl$_3$ was dissolved as a co-catalyst source in 18 mL of ethylene glycol so as to obtain 2% by mass of solution. 150 mg of TaON particles (particle size distribution several μm) were put in the obtained solution and then the solution was closed in a container. Thereafter, the inside of the container was irradiated with the microwave (frequency of 2.45 GHz) such that a temperature of the inside was raised up to 150° C., and then the container was heated and held for 60 minutes. After performing the heat treatment, a solid content was extracted from the inside of the container so as to be filtrated and washed with ethanol, and thereby a photocatalyst particle in which CoO$_x$ was loaded as the co-catalyst on the surface of the TaON particle was obtained.

Manufacturing Electrode for Photolytic Water Splitting Reaction, and Evaluation

Except for changing the types of the photocatalysts and using Ti as a conductive layer, an electrode for photolytic water splitting reaction was manufactured by using the same way as that in Example 2-1-1, and the performance under the following conditions was evaluated. The photocurrent density in measurement potentials of 0.6 V and 1.2 V was set as an index of evaluation. The results are indicated in the following Table 5.

Measurement Conditions

Light source AM 1.5 solar simulator [AM 1.5 G (100 mW/cm$^2$)]
pH=13.0 Electrolyte 0.1M Na$_3$PO$_4$, 100 mL
Argon atmosphere
Reference electrode Ag/AgCl, Counter electrode Pt wire
LSV measurement (E$_0$=−1.267 V, E$_1$=0.333 V, T$_0$=1 s, T$_1$=10 ms/V)

Comparative Example 2-2-1: Impregnation Loading

Producing of Photocatalyst

After 300 μL of water was added to TaON (0.1 g), 0.17 mM of Co(NO$_3$)$_2$ (2% by mass) was added the mixture, 300 μL of water was added again, and the mixture was irradiated with ultrasonic wave for one minute such that a solvent was distilled off under reduced pressure. The obtained powder was sintered at 600° C. for one hour under the air flow of ammonia (50 mL/min), and thereby a photocatalyst particle in which CoO$_x$ was loaded as the co-catalyst on the surface of the TaON particle.

Manufacturing Electrode for Photolytic Water Splitting Reaction, and Evaluation

Regarding the photocatalyst particle according to Comparative Example 2-2-1, the electrode for photolytic water splitting reaction was manufactured by using the same way as that in Example 2-2-1, and the performance was evaluated. The results are indicated in the following Table 5.

TABLE 5

| | Reaction conditions | mA/cm$^2$@ 0.6 V$_{RHE}$ | mA/cm$^2$@ 1.2 V$_{RHE}$ |
|---|---|---|---|
| Example 2-2-1 | Microwave (150° C., 60 min) | 0.70 | 1.59 |
| Comparative Example 2-2-1 | Impregnation loading (600° C., sintered for 60 min) | 0.34 | 1.57 |

As apparent from the results indicated in Table 5, Example 2-2-1 in which the heat treatment was performed by using the microwave in the closed system, even when comparing with a method of impregnating and loading of amine (Comparative Example 2-2-1) which is the conventional method, the photocurrent density of the electrode for photolytic water splitting reaction is large and the performance thereof is excellent. Particularly, it was found that the current density in the low potential (0.6 V) was improved more than twice, and was useful for water splitting without bias.

Figure 15A:
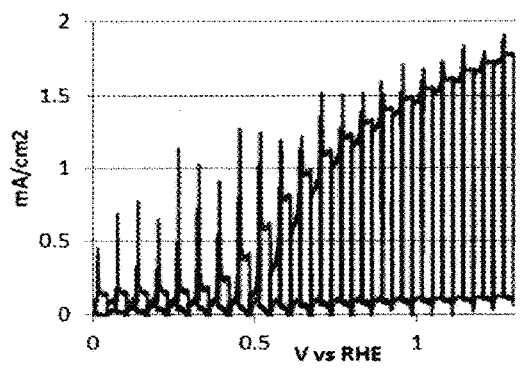
FIG. 15A and FIG. 15B are diagrams illustrating a PEC evaluation result regarding Example 2-2-1 and Comparative Example 2-2-1.
Figure 15B:
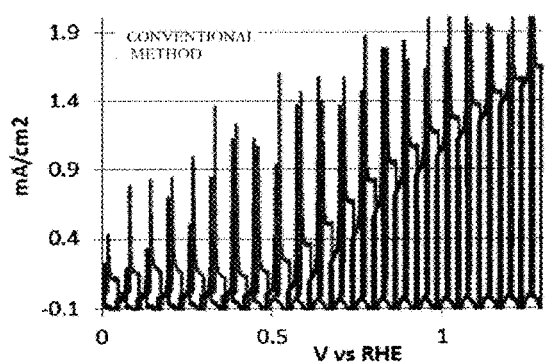

FIG. 15 illustrates PEC evaluation results of the electrode for photolytic water splitting reaction according to Example 2-2-1 and Comparative Example 2-2-1. FIG. 15A corresponds to Example 2-2-1, and FIG. 15B corresponds to Comparative Example 2-2-1. As apparent from FIG. 15, the activity was greatly improved particularly in the low potential in Example 2-2-1 as compared with Comparative Example 2-2-1.

Figure 16:
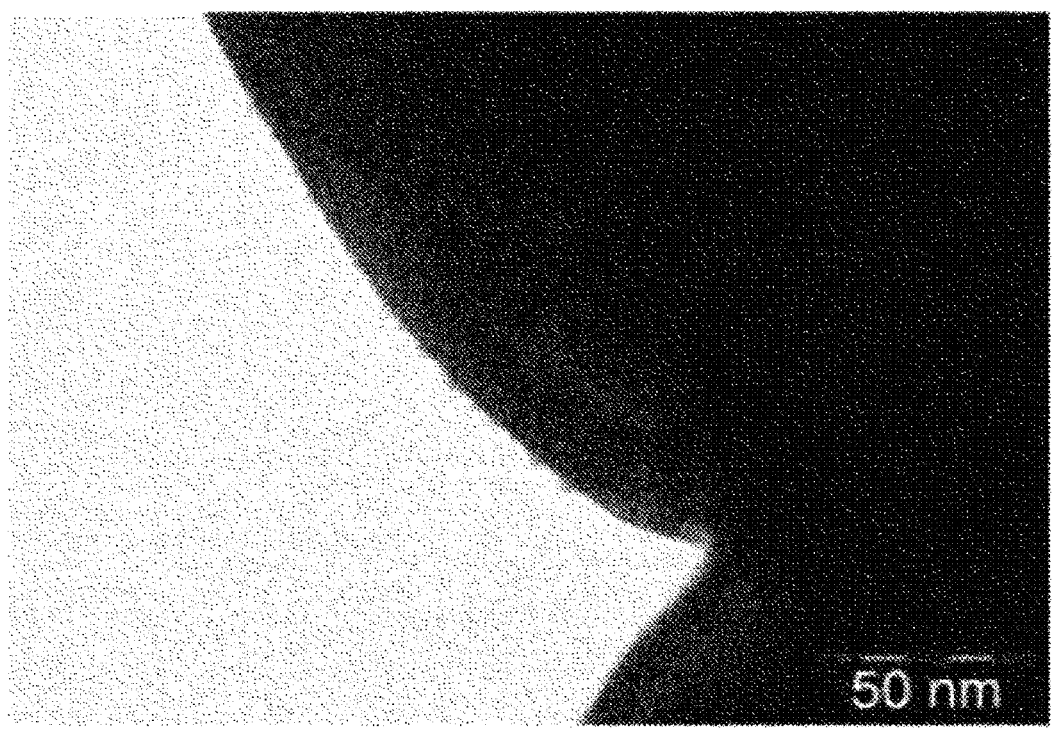
FIG. 16 is a TEM observation image of a photocatalyst particle according to Example 2-2-1.
Figure 17A:
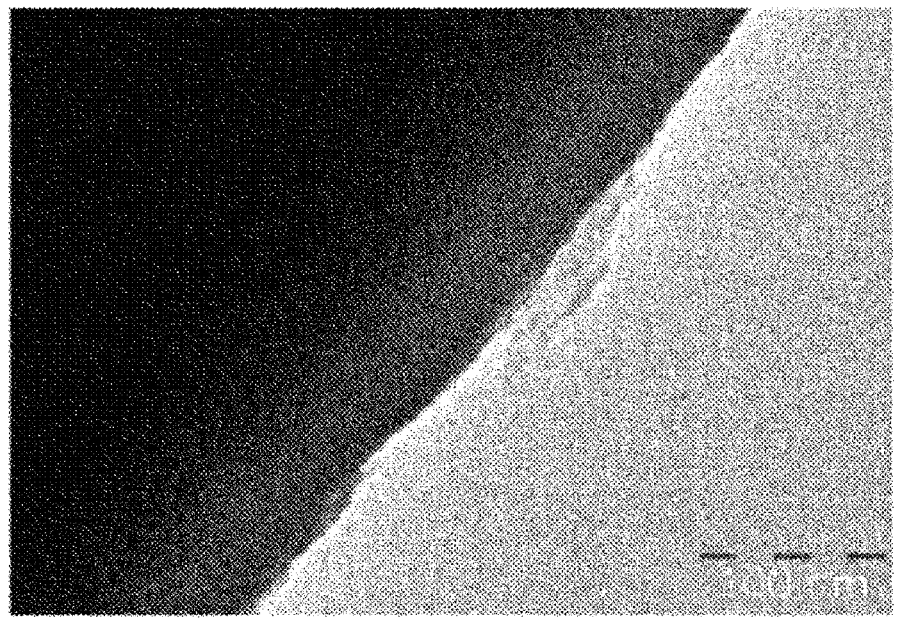
FIG. 17A and FIG. 17B are TEM observation images of a photocatalyst particle according to Comparative Example 2-2-1.
Figure 17B:
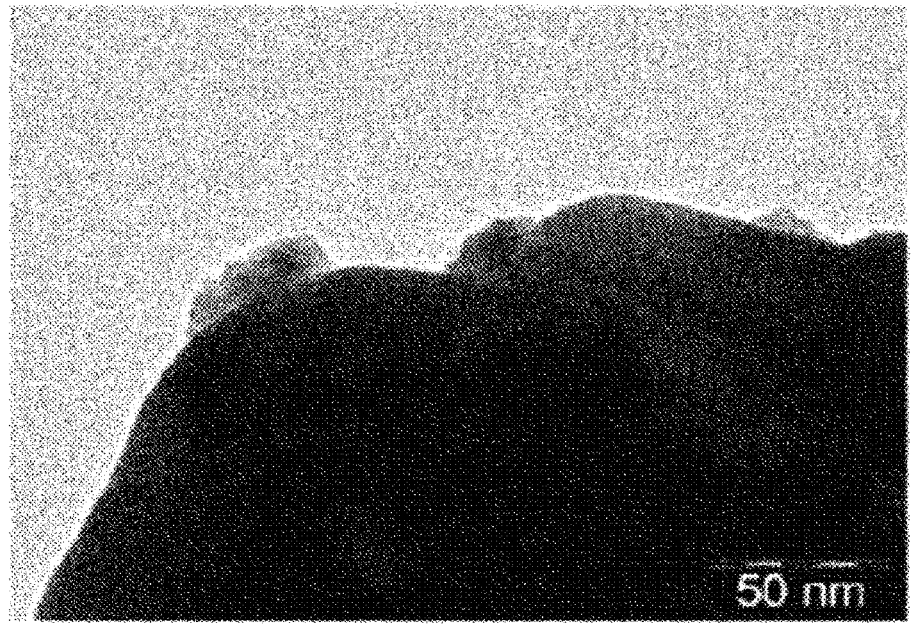

FIGS. 16 and 17 illustrate the TEM observation image of the photocatalyst according to Example 2-2-1 and Comparative Example 2-2-1. FIG. 16 corresponds to Example 2-2-1, and FIG. 17 corresponds to Comparative Example 2-2-1. As apparent from FIG. 16, in the photocatalyst according to Example 2-2-1, very small co-catalyst particles are loaded in a highly dispersed manner. On the other hand, as apparent from FIG. 17, in the photocatalyst according to Comparative Example, the co-catalysts are aggregated on the surface of the optical semiconductor.

2.3. $Ta_3N_5$

Example 2-3-1

Producing of Photocatalyst $Co(NH_3)_6Cl_3$ was dissolved as a co-catalyst source in 18 mL of ethylene glycol so as to obtain 2% by mass of solution. 150 mg of $Ta_3N_5$ particles (particle size distribution several μm) were put in the obtained solution and then the solution was closed in a container. Thereafter, the inside of the container was irradiated with the microwave (frequency of 2.45 GHz) such that a temperature of the inside was raised up to 150° C., and then the container was heated and held for 60 minutes. After performing the heat treatment, a solid content was extracted from the inside of the container so as to be filtrated and washed with ethanol, and thereby a photocatalyst particle in which $CoO_x$ was loaded as the co-catalyst on the surface of the $Ta_3N_5$ particle was obtained.

Manufacturing Electrode for Photolytic Water Splitting Reaction, and Evaluation Except for changing the types of the photocatalysts and, an electrode for photolytic water splitting reaction was manufactured by using the same way as that in Example 2-1-1, and the performance under the following conditions was evaluated. The results are indicated in the following Table 6.

Measurement Conditions

Light source AM 1.5 solar simulator [AM 1.5 G (100 mW/cm$^2$)]
pH=13.0 Electrolyte 0.1 M $Na_3PO_4$, 100 mL
Argon atmosphere
Reference electrode Ag/AgCl, Counter electrode Pt wire
LSV measurement ($E_0$=−1.3 V, $E_1$=0.33 V, $T_0$=1 s, $T_1$=10 ms/V)

Comparative Example 2-3-1: Impregnation Loading

After 300 μL of water was added to $Ta_3N_5$ (0.1 g), 0.17 mM of $Co(NO_3)_2$ was added thereto so as to obtain 2% by mass of solution. 300 μL of water was added again to the obtained solution, and then obtained solution was irradiated with an ultrasonic wave for one minute such that a solvent was distilled off under reduced pressure. The obtained powder was sintered at 600° C. for one hour under the air flow of ammonia (50 mL/min), and thereby a photocatalyst particle in which $CoO_x$ was loaded as the co-catalyst on the surface of the $Ta_3N_5$ particle was obtained.

Manufacturing Electrode for Photolytic Water Splitting Reaction, and Evaluation Regarding the photocatalyst particle according to Comparative Example 2-3-1, the electrode for photolytic water splitting reaction was manufactured by using the same way as that in Example 2-3-1, and the performance was evaluated. The results are indicated in the following Table 6.

TABLE 6

| | Reaction conditions | mA/cm$^2$@ 1.2 $V_{RHE}$ |
|---|---|---|
| Example 2-3-1 | Microwave (150° C., 60 min) | 1.50 |
| Comparative Example 2-3-1 | Impregnation loading (600° C., sintered for 60 min) | 0.92 |

As apparent from the results indicated in Table 6, Example 2-3-1 in which the heat treatment was performed by using the microwave in the closed system, even when comparing with a method of impregnating and loading of amine (Comparative Example 2-3-1) which is the conventional method, the photocurrent density of the electrode for photolytic water splitting reaction is large and the performance thereof is excellent.

Figure 18A:
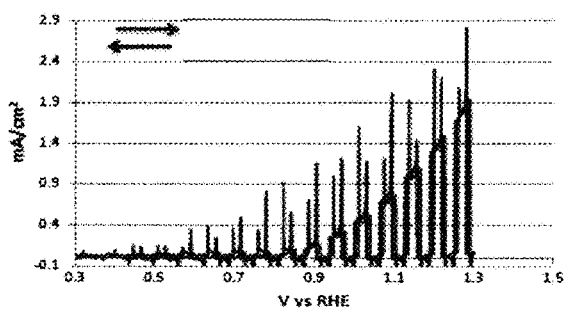
FIG. 18A and FIG. 18B are diagrams illustrating a PEC evaluation result regarding Example 2-3-1 and Comparative Example 2-3-1.
Figure 18B:
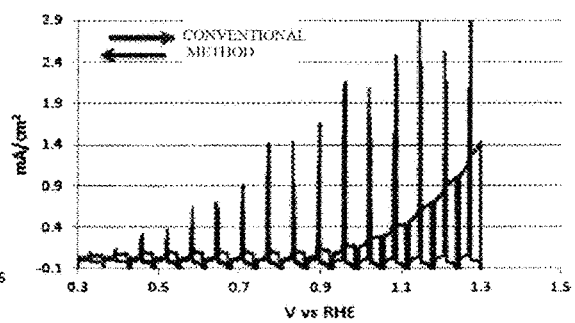

FIG. 18 illustrates PEC evaluation results of the electrode for photolytic water splitting reaction according to Example 2-3-1 and Comparative Example 2-3-1. FIG. 18A corresponds to Example 2-3-1 and FIG. 18B corresponds to Comparative Example 2-3-1. As apparent from FIG. 18, the activity was greatly improved particularly in the high potential in Example 2-3-1 as compared with Comparative Example 2-3-1.

Figure 19A:
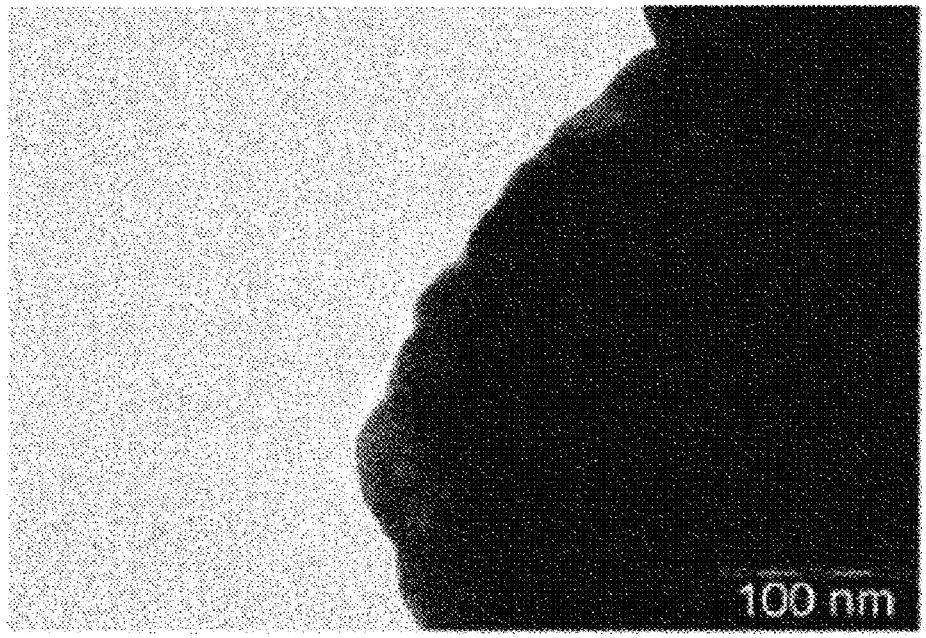
FIG. 19A and FIG. 19B are TEM observation images of a photocatalyst particle according to Example 2-3-1.
Figure 19B:
Figure 20A:
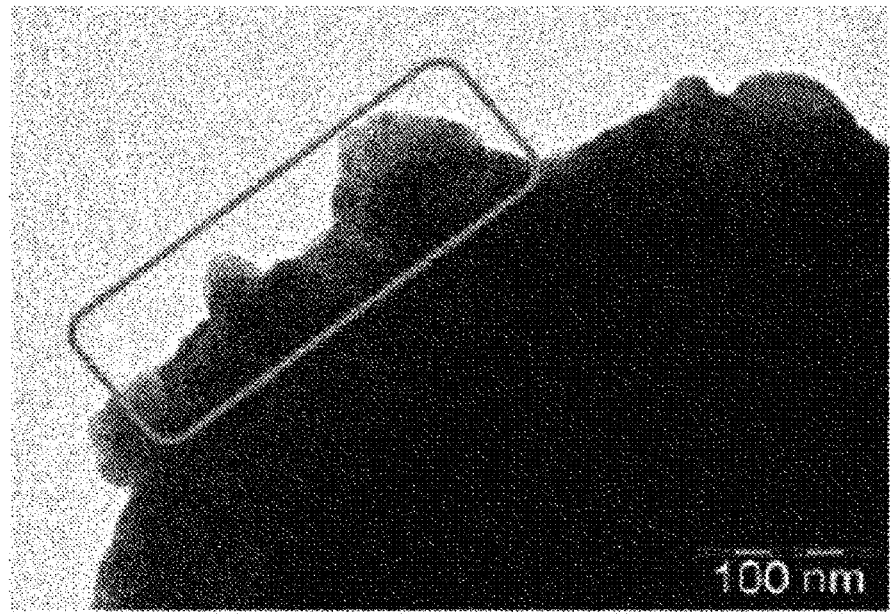
FIG. 20A and FIG. 20B are TEM observation images of a photocatalyst particle according to Example 2-3-1.
Figure 20B:
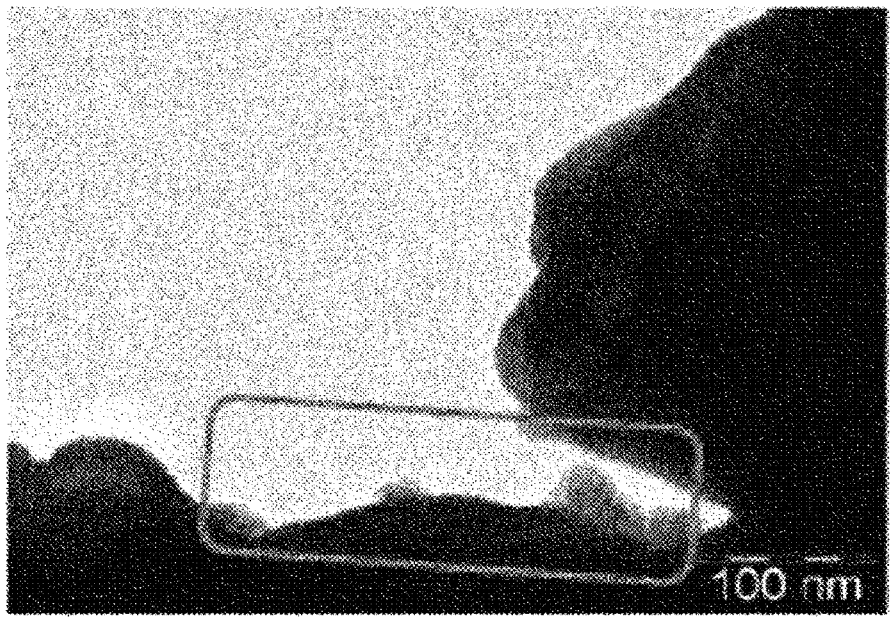

FIGS. 19 and 20 illustrate the TEM observation image of the photocatalyst according to Example 2-3-1 and Comparative Example 2-3-1. FIG. 19 corresponds to Example 2-3-1 and FIG. 20 corresponds to Comparative Example 2-3-1. As apparent from FIG. 19, in the photocatalyst according to Example 2-3-1, it was not confirmed that the co-catalyst particles were aggregated on the surface. As described above, it is confirmed that the activity is improved in the high potential, and thus it is presumed that very small co-catalyst particles which canoe be confirmed by the TEM are loaded in the photocatalyst. On the other hand, as apparent from FIG. 20, in the photocatalyst according to Comparative Example, the co-catalysts are aggregated on the surface of the optical semiconductor.

2.4. $LaTiO_2N$

Example 2-4-1

Producing of Photocatalyst $Co(NH_3)_6Cl_3$ was dissolved as a co-catalyst source in 18 mL of ethylene glycol so as to obtain 2% by mass of solution. 150 mg of $LaTiO_2N$ particles (Particle size distribution several μm) were put in the obtained solution, and then closed into a container. Thereafter, the inside of the container was irradiated with the microwave (frequency of 2.45 GHz) such that a temperature of the inside was raised up to 198° C., and then the container was heated and held for 30 minutes. After performing the heat treatment, a solid content was extracted from the inside of the container so as to be filtrated and washed with ethanol, and thereby a photocatalyst particle in which $CoO_x$ was loaded as the co-catalyst on the surface of the $LaTiO_2N$ particle was obtained.

Manufacturing Electrode for Photolytic Water Splitting Reaction, and Evaluation Except for changing the types of the photocatalysts and, an electrode for photolytic water splitting reaction was manufactured by using the same way as that in Example 2-1-1, and the performance under the following conditions was evaluated. The results are indicated in the following Table 7.

Measurement Conditions

Light source AM 1.5 solar simulator [AM 1.5 G (100 mW/cm$^2$)]

pH=13.0 Electrolyte 1 M NaOH, 100 mL

Argon atmosphere

Reference electrode Ag/AgCl, Counter electrode Pt wire

LSV measurement ($E_0$=−1.07 V, $E_1$=0.54 V, $T_0$=1 s, $T_1$=10 ms/V)

Comparative Example 2-4-1: Microwave Heating in Open System

Producing of Photocatalyst

In a reaction container connected with reflux pipe, Co(NH$_3$)$_6$Cl$_3$ is dissolved as the co-catalyst source in 18 mL of ethylene glycol so as to obtain 2% by mass of solution, and 150 mg of LaTiO$_2$N particles (particle size distribution several μm) were put into the obtained solution. Thereafter, the inside of the container was irradiated with microwave (frequency of 2.45 GHz) by using a microreactor (Shikoku measurement equipment) such that a temperature of the inside was raised up to 198° C., and then the container was heated and held for 30 minutes. After performing the heat treatment, a solid content was extracted from the inside of the container so as to be filtrated and washed with ethanol, and thereby a photocatalyst particle in which CoO$_x$ was loaded as the co-catalyst on the surface of the LaTiO$_2$N particle was obtained.

Comparative Example 2-4-2: Impregnation Loading

Producing of Photocatalyst

After 300 μL of water was added to LaTiO$_2$N (0.1 g), 0.17 mM of Co(NO$_3$)$_2$ was added thereto so as to obtain 2% by mass of solution. 300 μL of water was added again to the obtained solution, and then obtained solution was irradiated with an ultrasonic wave for one minute such that a solvent was distilled off under reduced pressure. The obtained powder was sintered at 600° C. for one hour under the air flow of ammonia (50 mL/min), and thereby a photocatalyst particle in which CoO$_x$ was loaded as the co-catalyst on the surface of the LaTiO$_2$N particle was obtained.

Manufacturing Electrode for Photolytic Water Splitting Reaction, and Evaluation

Regarding the photocatalyst particle according to Comparative Examples 2-4-1 and 2-4-2, the electrode for photolytic water splitting reaction was manufactured by using the same way as that in Example 2-4-1, and the performance was evaluated. The results are indicated in the following Table 7.

TABLE 7

| | Reaction conditions | mA/cm$^2$@ 1.2 V$_{RHE}$ |
|---|---|---|
| Example 2-4-1 | Closed system, microwave (198° C., 30 min) | 3.31 |
| Comparative Example 2-4-1 | Open system, microwave (198° C., 30 min) | 0.66 |
| Comparative Example 2-4-2 | Impregnation loading (600° C., sintered for 60 min) | 2.83 |

As apparent from the results indicated in Table 7, Example 2-4-1 in which the heat treatment was performed by using the microwave in the closed system, the photocurrent density of the electrode for photolytic water splitting reaction is large and the performance thereof is excellent as compared with Comparative Example 2-4-1 in which the heat treatment was performed by using the microwave in the open system. In addition, in Example 2-4-1, even when comparing with an impregnation loading method (Comparative Example 2-4-2) which is the conventional method, the photocurrent density of the electrode for photolytic water splitting reaction is large and the performance thereof is excellent.

Measuring of Coverage of Co-Catalyst on Surface of the Optical Semiconductor

The surface of a Co-loaded photocatalyst (Co$_x$/LaTi$_2$ON) which was produced in Example 2-4-1 and Comparative Example 2-4-2 was confirmed by using SEM. On the basis of data obtained by SEM-EDX, an area (pixel) of a Co (yellow-green) portion of the photocatalyst surface was derived by using Photoshop CC soft, and was calculated by the following formula.

Coverage=(area of Co portion/entire area of photocatalyst)×100(%)

Figure 21A:
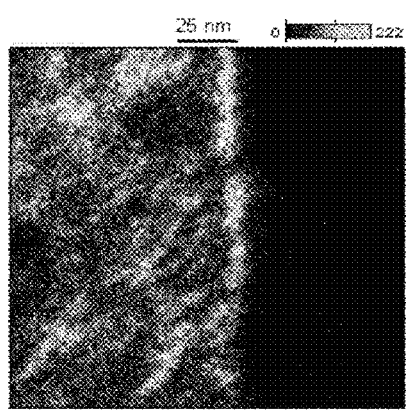
FIG. 21A and FIG. 21B are explanatory views illustrating a coating state of a co-catalyst $Co_x$ on a photocatalyst surface on which 2% by mass of Co is loaded.
Figure 21B:
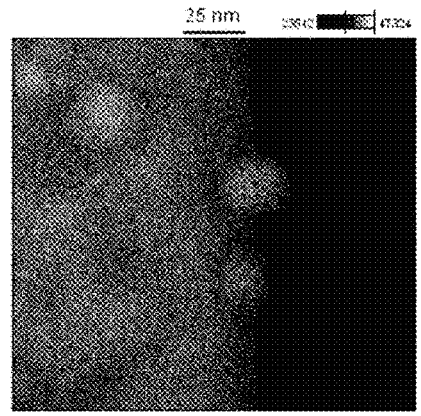

As a result of calculation, as illustrated in FIG. 21A, the surface of the photocatalyst which was treated with microwave was covered with Co$_x$ having the particle size in a range of 5 to 10 nm by the coverage of 75.2%. In contrast, it was possible to confirm that the photocatalyst surface which was treated by using the conventional method (impregnation loading method) as illustrated in FIG. 21B was covered with Co$_x$ having the particle size of greater than 20 nm and equal to or less than 40 nm by the coverage of 9.6%. With this, it is found that in the photocatalyst of the present invention, the loaded co-catalyst has a small particle size, and the co-catalyst loaded on the photocatalyst surface with high coverage in high dispersion.

3. Regarding Third Aspect of the Present Invention 3.1. LaTiO$_2$N

Manufacturing of Optical Semiconductor

Example 3-1

500 mg of LaTiO$_2$N (average particle size of 700 nm) was immersed into 10 g of aqueous solution (PSS:water=18:82% by weight) of a polystyrene sulfonic acid (PSS, degree of polymerization: 75,000), and was left to stand for 17 hours at 27° C. so as to perform an acid treatment. Thereafter, the remaining LaTiO$_2$N particles as the solid content were collected through the suction filtration, and 100 mL of water was added to the collected particles and the collected particles was subjected to the suction filtration, and 100 mL of ethanol was further added and the suction filtration was performed so as to wash the particles, thereby obtaining 460 mg of optical semiconductor according to Example 3-1. Note that, it is considered that the following acid hydrolysis reaction occurs through the acid treatment, for example. The same is true for a nitride.

Examples 3-2 to 3-6

Figure 22:
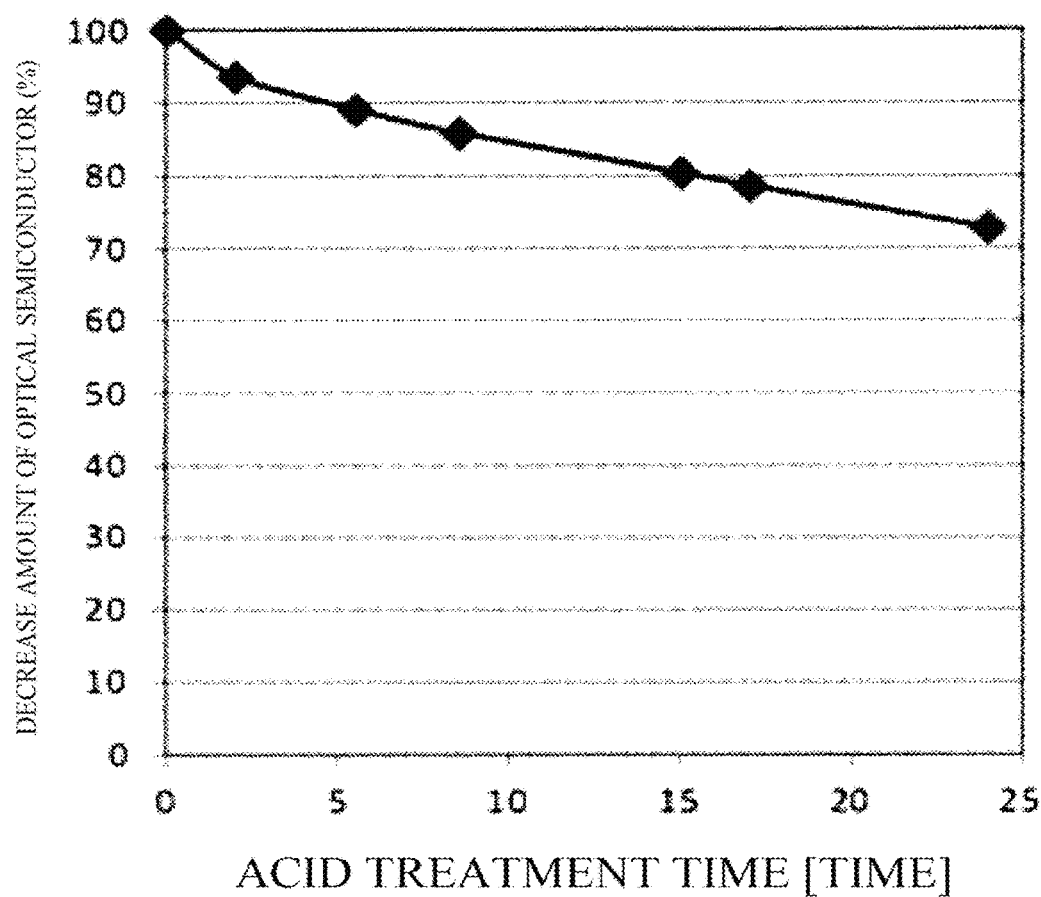
FIG. 22 is a diagram illustrating a relationship between a standing time for an acid treatment and a decrease amount of the optical semiconductor.

Except that the standing time for the acid treatment is set to 15 minutes, 30 minutes, 60 minutes, 90 minutes, and two hours, an optical semiconductor according to Examples 3-2 to 3-6 was obtained by using the same way as that in Example 3-1. Note that, the amount of the obtained optical semiconductor was decreased in accordance with the increase in the standing time. FIG. 22 illustrates the relationship between the standing time and the decrease amount of the optical semiconductor.

Example 3-7

Except that as a aqueous solution for acid treatment, an aqueous solution (TS:water=18:82% by weight) of a toluene sulfonic acid (TS) was used instead of the PSS aqueous solution, an optical semiconductor according to Example 3-7 was obtained by using the same way as that in Example 3-1.

Example 3-8

Except that as a aqueous solution for acid treatment, an aqueous solution (TS:water=18:82% by weight) of a toluene sulfonic acid (TS) was used instead of the PSS aqueous solution, and the standing time for the acid treatment was set to two hours an optical semiconductor according to Example 3-8 was obtained by using the same way as that in Example 3-1.

Example 3-9

Except that as a aqueous solution for acid treatment, an aqueous solution (MS:water=18:82% by weight) of a methane sulfonic acid (MS) was used instead of the PSS aqueous solution, and the standing time for the acid treatment was set to two hours an optical semiconductor according to Example 3-9 was obtained by using the same way as that in Example 3-1.

Comparative Example 3-1

An optical semiconductor according to Comparative Example 3-1 was obtained without performing the acid treatment on $LaTiO_2N$ used in Example 3-1.

Comparative Example 3-2

When the same operation as that in Example 3-1 was performed by using aqua regia (stock solution, concentrated hydrochloric acid HCl:concentrated nitric acid $HNO_3$ (3:1), 15 mL:5 mL with respect to 1 g of catalyst) as the aqueous solution for acid treatment, instead using the PSS aqueous solution, all of the optical semiconductors were dissolved, and thus it was not possible to collect the solid contents.

Comparative Example 3-3

Except that the aqua regia (stock solution, concentrated hydrochloric acid HCl:concentrated nitric acid $HNO_3$ (3:1), 15 mL:5 mL with respect to 1 g of catalyst) was used as the aqueous solution for acid treatment instead using the PSS aqueous solution, and the solid contents were collected immediately after impregnating $LaTiO_2N$, an optical semiconductor according to Comparative Example 3-3 was obtained by using the same way as that in Example 3-1.

Producing Photocatalyst $CoO_x$ was loaded as the co-catalyst to each of the optical semiconductors according to Examples and Comparative Examples obtained the photocatalyst. The co-catalyst was loaded as follows.

$Co(NO_3)_2$ was dissolved as a co-catalyst source in 18 mL of ethylene glycol so as to obtain 2% by mass of solution, then 150 mg of optical semiconductor was put into the obtained solution, and the solution is closed in a predetermined container. Thereafter, the inside of the container was irradiated with the microwave (frequency of 2.45 GHz) such that a temperature of the inside was raised up to 250° C., and then the container was heated and held for 15 minutes. After performing the heat treatment, a solid content was extracted from the inside of the container so as to be filtrated and washed with ethanol, and thereby a photocatalyst particle in which $CoO_x$ was loaded as the co-catalyst on the surface of the optical semiconductor was obtained.

Manufacturing of Electrode for Photolytic Water Splitting Reaction

The electrode for photolytic water splitting reaction was manufactured by using the method illustrated in FIG. 8. That is, the obtained photocatalyst (30 mg) is suspended in 1 mL of 2-propanol, 200 µL of suspended solution was added dropwise onto a first glass substrate (soda-lime glass 30×30 mm), and the first glass substrate was repeatedly dried three times so as to form a photocatalyst layer. Subsequently, Nb corresponding to a contact layer was laminated by a sputtering method. The layers were stacked by approximately several hundred nm with ULVAC VPC-260F as an apparatus to be used. Then, Ti corresponding to a current collecting conductor layer was stacked by approximately several nm by a sputtering method. Thereafter, a second glass substrate (soda-lime glass; not shown) was adhered to the current collecting conductor layer by using an epoxy resin. Lastly, the first glass substrate was removed, ultrasonic cleaning was performed in pure water for 10 minutes, and thereby an electrode for photolytic water splitting reaction including a photocatalyst layer/a contact layer/a current collecting layer was obtained.

Evaluation 1: X-Ray Diffraction Measurement

Figure 23:
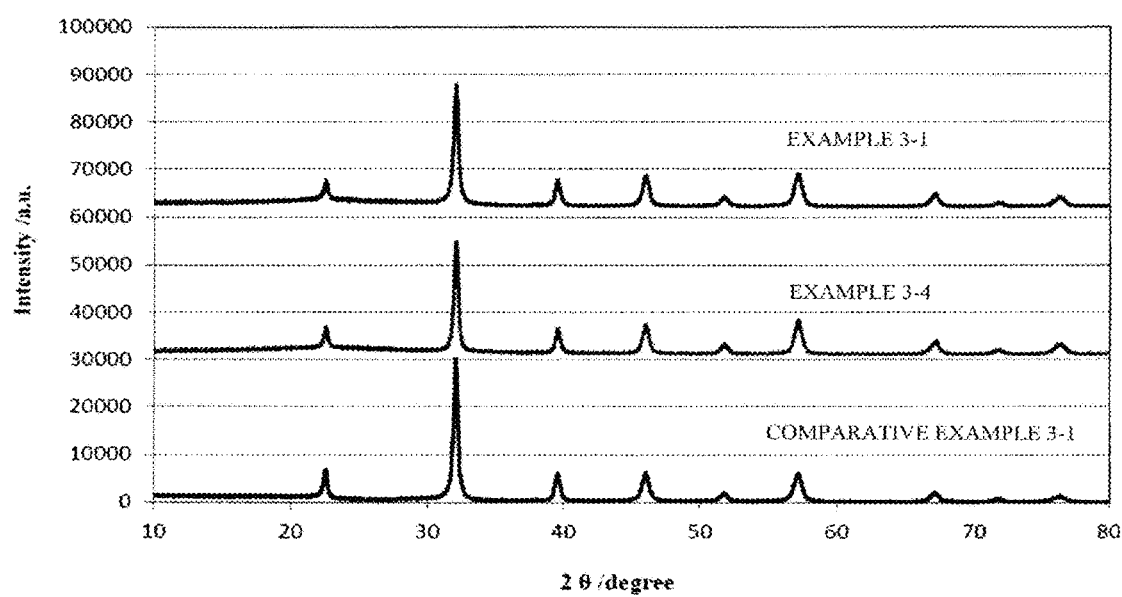
FIG. 23 is an X-ray diffraction measurement result of an optical semiconductor regarding Examples 3-1 and 3-4, and Comparative Example 3-1.

Regarding the optical semiconductors according to Examples 3-1 and 3-4, and Comparative Example 3-1, X-ray diffraction measurement was performed by using CuKα rays. The results are indicated in FIG. 23. As apparent from the result illustrated in FIG. 23, there was no change in X-ray diffraction peak of the optical semiconductor before the acid treatment (Comparative Example 3-1) and after the acid treatment (Examples 3-1 and 3-4) by using the PSS aqueous solution.

Evaluation 2: Analysis of Surface Elements of Optical Semiconductor

Regarding the optical semiconductor according to Examples in which the acid treatment was performed by using the PSS solution, the analysis of S which is present on the surface was performed by using the STEM-EDX device. The results are indicated in Table 8.

TABLE 8

| | Time for acid treatment [Time] | S content [atm %] |
|---|---|---|
| Comparative Example 3-1 | 0 | 0.01 |
| Example 3-1 | 17 | 0.39 |

As indicated in Table 8, due to the acid treatment by using the PSS aqueous solution, the content of S on the surface of the optical semiconductor was 0.39 atm %. That is, it was found that in a case where the oxide or the like was subjected to the acid treatment by using the PSS aqueous solution, the content of S, which is not able to be normally present, was present on the surface.

Evaluation 3: Observation of Optical Semiconductor Form

The form of the optical semiconductor according to Comparative Example 3-1, and Examples 3-1 and 3-4 was observed by using TEM. The results are indicated in FIGS. 24 to 26. FIG. 24 corresponds to Comparative Example 3-1, FIG. 25 corresponds to Example 3-1, and FIG. 26 corresponds to Example 3-4. Note that, in FIGS. 24 to 26, A is an HRTEM observation image, and B is an enlarged image in which a part of A is enlarged, and C is an enlarged image in which a part of B is enlarged. In addition, D in FIGS. 24 to 26 is a diffraction grating image incident from the [210] plane, and can be confirmed whether or not it is a single crystal.

Figure 24A:
FIG. 24A to FIG. 24D are diagrams illustrating a TEM observation picture of an optical semiconductor according to Comparative Example 3-1.
Figure 24B:
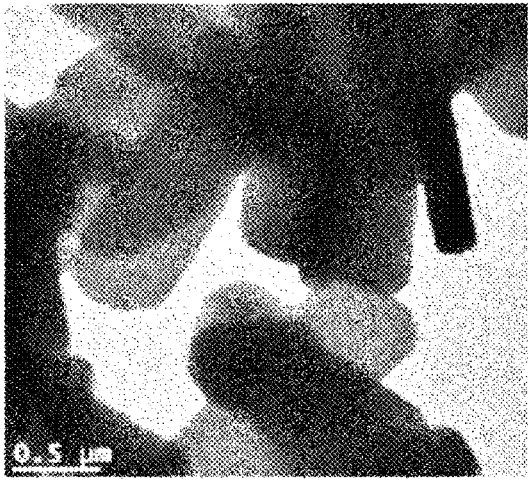

As illustrated in FIG. 24, in the optical semiconductor according to Comparative Example 3-1, it was confirmed that the crystals were thick, and the aggregation of the crystals within the observation range (FIGS. 24A and 24B). It is considered that when the crystal lattice is thick, a movement path of charges excited by light becomes long, and recombination is likely to occur, and thereby the catalytic activity is deteriorated. In addition, it is considered that the aggregation of the crystals also causes the recombination. On the other hand, from FIGS. 25 and 26, in the optical semiconductor according to Examples, it was found that each of the crystals is thin, and the aggregation of the crystals is crushed within the observation range. It was found that due to the acid treatment, it was possible to divide the aggregation of crystals into each crystal by dissolving a contact point between the crystals while dissolving the entire surface of the surface layer.

Figure 24C:
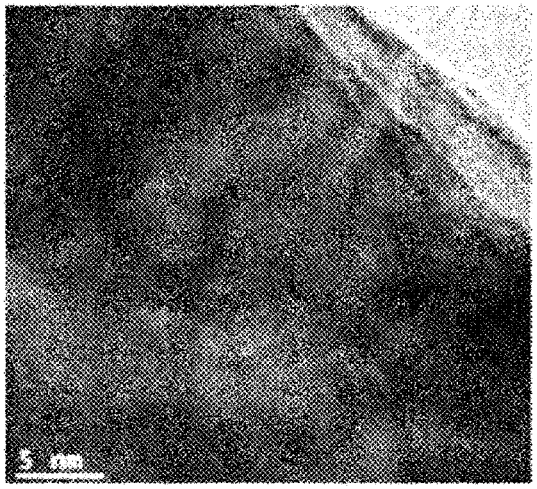
Figure 24D:
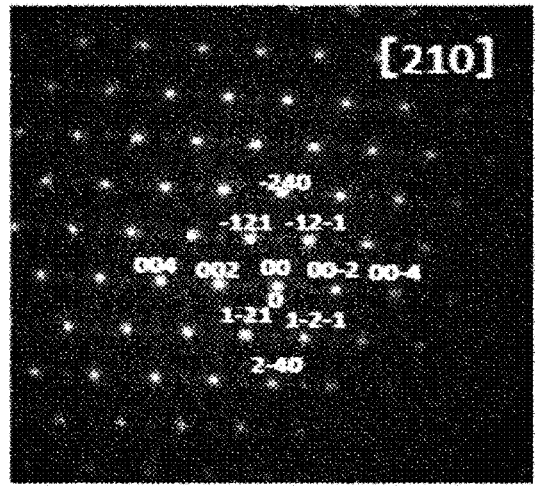
Figure 25A:
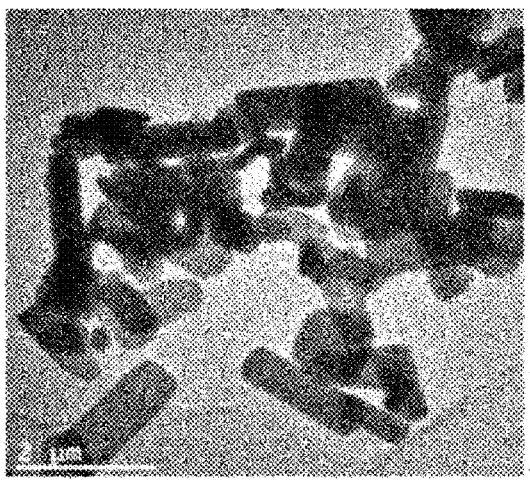
FIG. 25A to FIG. 25D are diagrams illustrating the TEM observation picture of the optical semiconductor according to Example 3-1.
Figure 25B:
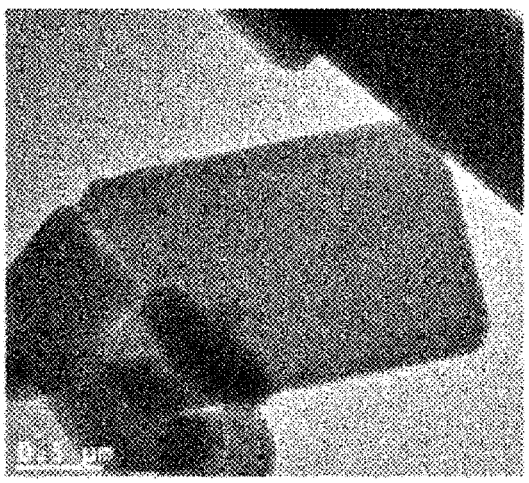
Figure 25C:
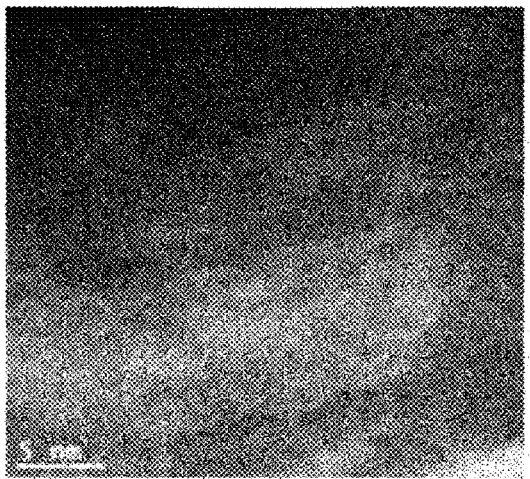
Figure 25D:
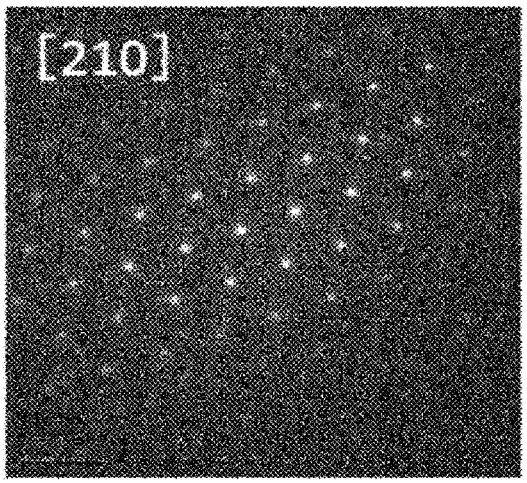
Figure 26A:
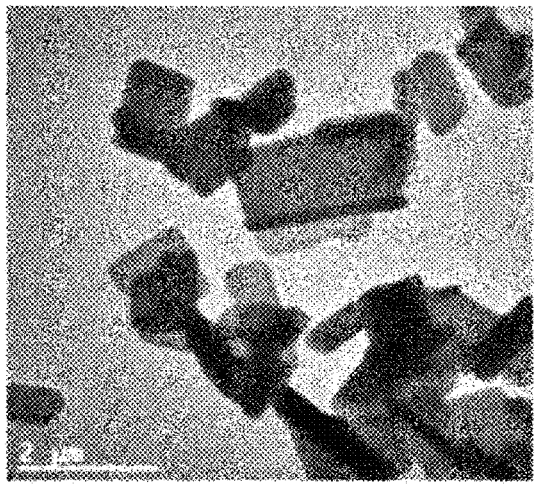
FIG. 26A to FIG. 26D are diagrams illustrating the TEM observation picture of the optical semiconductor according to Example 3-4.
Figure 26B:
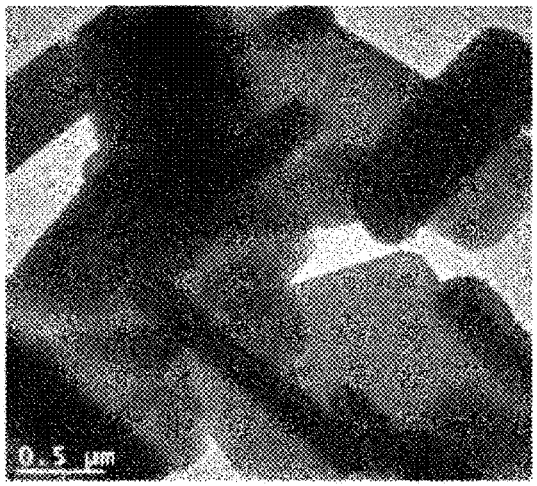
Figure 26C:
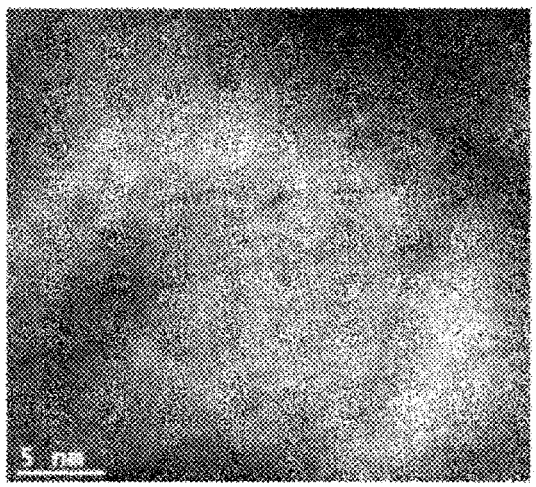
Figure 26D:
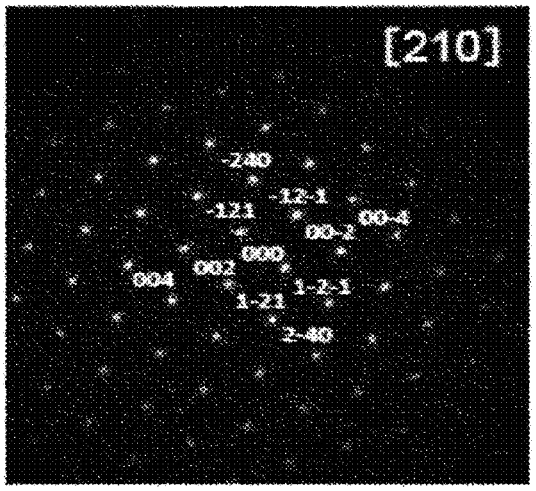

Further, as illustrated in FIG. 24, in the optical semiconductor according to Comparative Example 3-1, the strain and deviation of the crystal lattice were confirmed within the observation range (FIGS. 24C and 24D). Particularly, as apparent from FIG. 24D, the positions of the crystal planes do not coincide (misaligned in the horizontal direction on the paper), for example, the [210] plane is positioned in an outermost surface portion of the optical semiconductor particle, and the [210] plane is positioned in a portion deeper than the outermost surface portion. On the other hand, as apparent from FIGS. 25 and 26, in the optical semiconductor according to Examples, the strain and deviation of the crystal lattice were not confirmed within the observation range, and due to the acid treatment, surface defects and interface defects are decreased.

Evaluation 4: Photolytic Water Splitting Activity

The performance of the electrode for photolytic water splitting reaction by the current-potential measurement in a three-electrode system using a potentiostat is evaluated. With Pyrex (registered trademark) glass electrochemical cell with flat window, an Ag/AgCl electrode was used as a reference electrode, and a Pt wire was used as a counter electrode. As the electrolyte, 100 mL of NaOH aqueous solution (pH=13.0) was used. The inside of the electrochemical cell was filled with argon, and oxygen and carbon dioxide which were generated by sufficiently performing gas bubbling of the electrochemical cell before measurement were removed. In photoelectrochemical measurement, a solar simulator (AM 1.5 G (100 mW/cm$^2$)) was used as a light source, and the light is irradiated from the flat window of the electrochemical cell. The LSV measurement conditions were set such that $E_0=-1.1$ V, $E_1=0.3$ V, $T_0=1$ s, and $T_1=10$ ms/V, and the photocurrent density in measurement potential of 1.23 V was set as an index of evaluation. The results are indicated in the following Table 9 and FIG. 27.

TABLE 9

(results of performance evaluation in a case of where an electrode for photolytic water splitting reaction)

| Types of optical semiconductors | Types of acids | Time for acid treatment [Time] | Photocurrent density @ 1.23 V [mA/cm$^2$] |
|---|---|---|---|
| Example 3-1 | PSS | 17 | 5.58(8.86) |
| Example 3-2 | PSS | 0.25 | 3.08(3.13) |
| Example 3-3 | PSS | 0.5 | 3.36(3.5) |
| Example 3-4 | PSS | 1 | 3.46(5.46) |
| Example 3-5 | PSS | 1.5 | 3.29(3.96) |
| Example 3-6 | PSS | 2 | 3.82(6.92) |
| Example 3-7 | TS | 17 | 2.80 |
| Example 3-8 | TS | 2 | 2.90 |
| Example 3-9 | MS | 2 | 2.70(3.7) |
| Comparative Example 3-1 | — | — | 2.50 |
| Comparative Example 3-2 | Aqua regia | 17 | Not possible to be measured due to dissolution |
| Comparative Example 3-3 | Aqua regia | 0 (several seconds) | 2.70 |

Note that, in the above-described Table 9, the values without parentheses are an average value obtained by several times of measurement of the photocurrent density, and the values in parentheses are an example of an actual measurement value.

Figure 27:
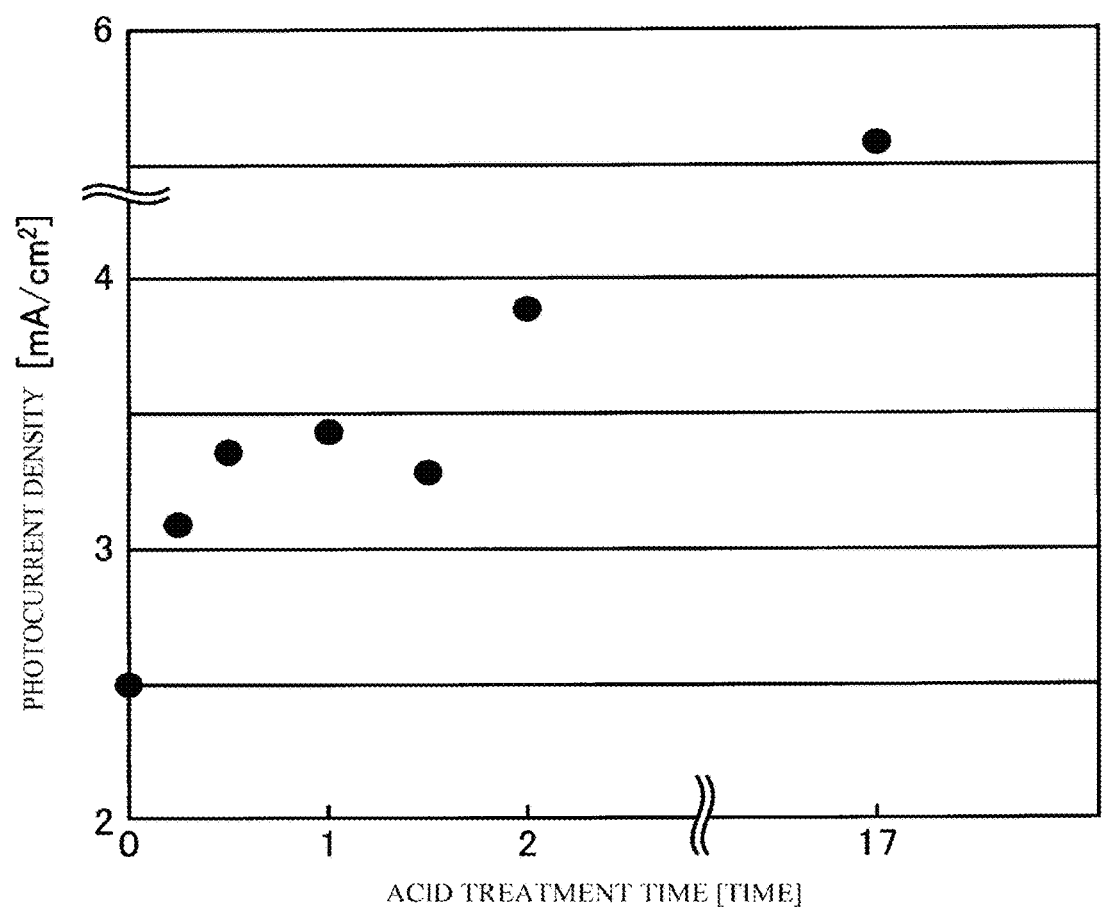
FIG. 27 is a diagram illustrating a relationship between standing time and photocurrent density relating to an acid treatment regarding Examples 3-1 to 3-6.

As illustrated in Table 9 and FIG. 27, it was possible to improve the water splitting activity by performing the acid treatment of the optical semiconductor by using a polyorganic acid or a sulfonic acid. In addition, even in a case where the standing time for the acid treatment was set to be very short, the improvement of the water splitting activity was confirmed, and even in a case where the standing time was set to be long, for example, 17 hours, it was confirmed that the water splitting activity was not deteriorated, but was further improved. That is, it was found that in a case where the acid treatment was performed by using a polyorganic acid or a sulfonic acid, as long as the optical semiconductor remains as a solid content, it was possible to improve the water splitting activity regardless of the time for the acid treatment, and the acid treatment was easily controlled.

Note that, in the above-described embodiments, a case where a polysulfonic acid (PSS) is used as a polyorganic acid was described; however, it is considered that the effect of the present invention is obtained even in a case where a polyorganic acid other than PSS is used. For example, it is considered that even in a case where a polyacrylic acid (PAA) is used as a polyorganic acid, it is possible to produce an optical semiconductor which has excellent performance as compared with that in Comparative Example 3-1. However, the PAA has acidity lower than the PSS, and thus in a case of using the PAA, it is considered to require a long period of time for properly melting the surface of oxide or the like. That is, in order to easily control the acid treatment, it is possible to use a polyorganic acid having the lower acidity such as the PAA; however, it is likely that the acidity is low and the efficiency is slightly deteriorated. Accordingly, while easily controlling the acid treatment, from the aspect that it is possible to more efficiently produce an optical semiconductor in which the photolytic water splitting activity is remarkably improved, using the PSS as a polyorganic acid is considered to be most preferable.

Figure 28:
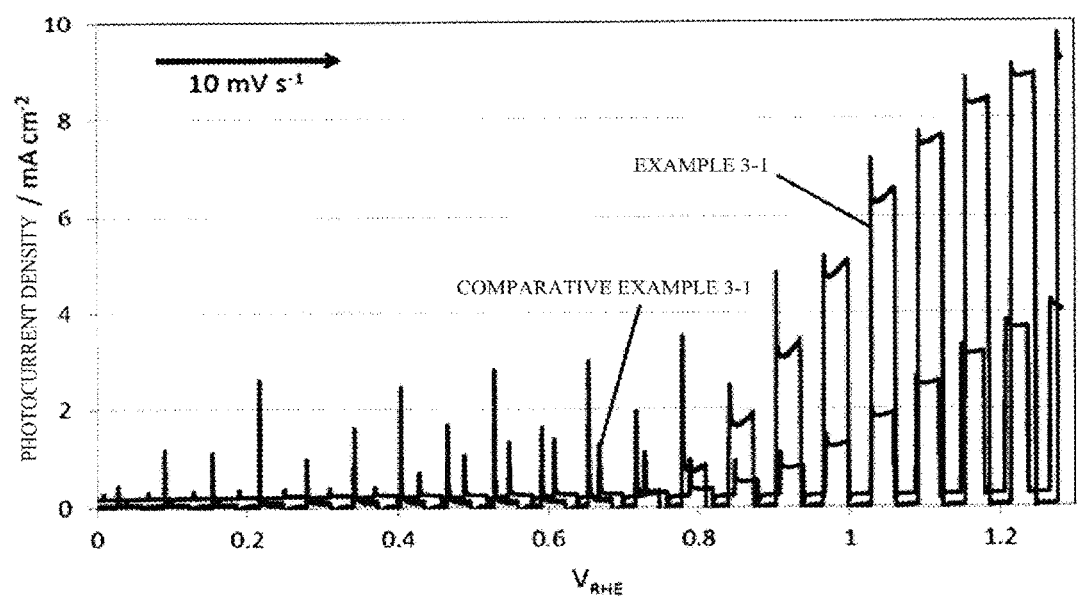
FIG. 28 is a diagram illustrating results of comparing photolytic water splitting activities in Example 3-1 and Comparative Example 3-1.

FIG. 28 illustrates an example of a relationship between a voltage and a photocurrent density regarding each of an electrode using the optical semiconductor according to Comparative Example 3-1, and an electrode using the optical semiconductor according to Example 3-1. As illustrated in FIG. 28, the electrode in Example 3-1 has a photocurrent density higher than the electrode in Comparative Example 3-1 in any measurement voltage. That is, it is found that the optical semiconductor according to Example 3-1 has the water splitting activity.

As described above, with the acid treatment using a polyorganic acid or a sulfonic acid as an organic acid, it was possible to control the surface defect and the interface defect of the optical semiconductor to be low, and to improve the water splitting activity of the optical semiconductor. It is considered that the same effect is exhibited as long as a crystalline inorganic compound capable of being melted with a polyorganic acid or a sulfonic acid is used. That is, it is obvious that the same effect is exhibited with, for example, a niobium-containing oxynitride such as $BaNbO_2N$, a tantalum-containing nitride such as $Ta_3N_5$, a tantalum-containing oxynitride such as $BaTaO_2N$, a vanadium-containing oxide such as $BiVO_4$, a gallium-containing nitride such as GaN:ZnO, and a germanium-containing nitride such as $ZnGe\ N_2$:ZnO, in addition to $LaTiO_2N$.

4. Data on Other Embodiments 4.1. Other Co-Catalysts

A case of using a co-catalyst other than $CoO_x$ was examined.

Example 4-1-1

Acid Treatment of Optical Semiconductor 500 mg of $LaTiO_2N$ (average particle size of 700 nm) was impregnated into 10 g of aqueous solution (PSS:water=18:82% by weight) of a polystyrene sulfonic acid (PSS, degree of polymerization: 75,000) and the obtained solution was left to stand for one hour at 27° C. so as to perform an acid treatment. Thereafter, the remaining $LaTiO_2N$ particles as a solid content were collected though the suction filtration, the collected particles where subjected to the suction filtration by adding 100 mL of water thereto, then the particles were further washed with 100 mL of ethanol added thereto through the suction filtration, and thereby a $LaTiO_2N$ particle which was subjected to the acid treatment were obtained.

Producing of Photocatalyst $IrCl_3$ was dissolved as a co-catalyst source in 18 mL of ethylene glycol so as to obtain 2% by mass of solution. 150 mg of $LaTiO_2N$ particles (particle size distribution several μm) were put in the obtained solution and then the solution was closed in a container. Thereafter, the inside of the container was irradiated with the microwave (frequency of 2.45 GHz) such that a temperature of the inside was raised up to 150° C., and then the container was heated and held for 60 minutes. After performing the heat treatment, a solid content was extracted from the inside of the container so as to be filtrated and washed with ethanol, and thereby a photocatalyst particle in which $IrO_2$ was loaded as the co-catalyst on the surface of the $LaTiO_2N$ particle was obtained.

Manufacturing Electrode for Photolytic Water Splitting Reaction, and Evaluation

Except for changing the types of the photocatalysts and, an electrode for photolytic water splitting reaction was manufactured by using the same way as that in Example 2-1-1, and the performance under the following conditions was evaluated. The results are indicated in the following Table 10.

Measurement Conditions

Light source AM 1.5 solar simulator [AM 1.5 G (100 mW/cm$^2$)]
pH=13.0 Electrolyte 1 M NaOH, 100 mL
Argon atmosphere
Reference electrode Ag/AgCl, Counter electrode Pt wire
LSV measurement ($E_0$=−1.07 V, $E_1$=0.54 V, $T_0$=1 s, $T_1$=10 ms/V)

Example 4-1-2

Except that the concentration of the solution in which the co-catalyst source is dissolved was set to be 3% by mass, the photocatalyst particle was obtained by using the same way as that in Example 4-1-1, the electrode for photolytic water splitting reaction was manufactured by using the same way as that in Example 4-1-1, and the evaluation therefor was performed. The results are indicated in the following Table 10.

Example 4-1-3

Except that the heat retention temperature due to the microwave was set to be 200° C., the photocatalyst particle was obtained by using the same way as that in Example 4-1-1, the electrode for photolytic water splitting reaction was manufactured by using the same way as that in Example 4-1-1, and the evaluation therefor was performed. The results are indicated in the following Table 10.

Example 4-1-4

Except that the heat retention temperature due to the microwave was set to be 250° C., the photocatalyst particle was obtained by using the same way as that in Example 4-1-1, the electrode for photolytic water splitting reaction was manufactured by using the same way as that in Example 4-1-1, and the evaluation therefor was performed. The results are indicated in the following Table 10.

Example 4-1-5

Producing of Photocatalyst Particle $Ga(NO_3)_2$ was dissolved as a co-catalyst source in 18 mL of ethylene glycol so as to obtain 1.8% by mass of solution. 150 mg of $LaTiO_2N$ particles (Particle size distribution several µm) were put in the obtained solution, and then closed into a container. Thereafter, the inside of the container was irradiated with the microwave (frequency of 2.45 GHz) such that a temperature of the inside was raised up to 200° C., and then the container was heated and held for 60 minutes. After performing the heat treatment, $Co(NH_3)_6Cl_3$ is added to the obtained solution as a co-catalyst source so as to adjust 2% by mass of solution, then the inside of the container is irradiated with the microwave (frequency of 2.45 GHz) such that a temperature of the inside was raised up to 200° C., and then the container was heated and held for 60 minutes. After performing the heat treatment, a solid content was extracted from the inside of the container so as to be filtrated and washed with ethanol, and thereby a photocatalyst particle in which $CoO_x$ was loaded as the co-catalyst on the surface of the photocatalyst precursor. With the obtained photocatalyst particle, the electrode for photolytic water splitting reaction was manufactured by using the same way as that in Example 4-1-1, and the evaluation therefor was performed. The results are indicated in the following Table 10.

TABLE 10

| | Co-catalyst source, heat retention temperature, heating time | mA/cm²@ 1.2 $V_{RHE}$ |
|---|---|---|
| Example 4-1-1 | $IrCl_3$ (2% by mass), 150° C., 60 min | 4.7 |
| Example 4-1-2 | $IrCl_3$ (3% by mass), 150° C., 60 min | 4.4 |
| Example 4-1-3 | $IrCl_3$ (2% by mass), 200° C., 60 min | 3.4 |
| Example 4-1-4 | $IrCl_3$ (2% by mass), 250° C., 60 min | 4.0 |
| Example 4-1-5 | $Ga(NO_3)_2$ (1.8% by mass), 200° C., 60 min $Co(NH_3)_6Cl_3$ (2% by mass), 150° C., 60 min | 3.82 |

As apparent from the result illustrated in Table 10, even in a case of loading the co-catalyst other than $CoO_x$ with the irradiation of the microwave, it was possible to obtain the photocatalyst particle having very high photolytic water splitting activity.

4.2. Other Optical Semiconductor

A case where $BaTaO_2N$ and GaN:ZnO were used as the optical semiconductor was examined.

Example 4-2-1

Producing of Photocatalyst $Co(NO_3)_2$ was dissolved as a co-catalyst source in 18 mL of ethylene glycol so as to obtain 2% by mass of solution, then 150 mg of $BaTaO_2N$ particles (particle size distribution several µm) was put into the obtained solution, and the solution is closed in a container. Thereafter, the inside of the container was irradiated with the microwave (frequency of 2.45 GHz) such that a temperature of the inside was raised up to 150° C., and then the container was heated and held for 60 minutes. After performing the heat treatment, a solid content was extracted from the inside of the container so as to be filtrated and washed with ethanol, and thereby a photocatalyst particle in which $CoO_x$ was loaded as the co-catalyst on the surface of the $BaTaO_2N$ particle was obtained.

Manufacturing Electrode for Photolytic Water Splitting Reaction, and Evaluation

Except for changing the types of the photocatalysts and, an electrode for photolytic water splitting reaction was manufactured by using the same way as that in Example 2-1-1, and the performance under the following conditions was evaluated. The results are indicated in the following Table 11.

Measurement Conditions

Light source AM 1.5 solar simulator [AM 1.5 G (100 mW/cm²)]
pH=13.0 Electrolyte NaOH, 100 mL
Argon atmosphere
Reference electrode Ag/AgCl, Counter electrode Pt wire
LSV measurement ($E_0$=−1.1 V, $E_1$=0.3 V, $T_0$=1 s, $T_1$=10 ms/V)

Example 4-2-2

Except for using a GaN:ZnO particle instead of the $BaTaO_2N$ particle, the photocatalyst particle was obtained by using the same way as that in Example 4-2-1, the electrode for photolytic water splitting reaction was manufactured by using the same way as that in Example 4-2-1, and the evaluation therefor was performed. The results are indicated in the following Table 11.

Comparative Example 4-2-1

10 mM of 5 mL $Co(NO_3)_2$ as a co-catalyst source and 0.1N of 5 mL ammonia water each was added into 40 mL of pure water, pH was adjusted to be 8.5, then 0.1 g of $BaTaO_2N$ was added thereto, and the mixture was immersed for one hour. After removing the supernatant by centrifugation, the mixture was subjected to suction filtration, was dried at 70° C. for one night, and thereby a photocatalyst particle in which $CoO_x$ was loaded as the co-catalyst on the surface of the $BaTaO_2N$ particle was obtained. With the obtained photocatalyst particle, the electrode for photolytic water splitting reaction was manufactured by using the same way as that in Example 4-2-1, and the evaluation therefor was performed. The results are indicated in the following Table 11.

Comparative Example 4-2-2

With the GaN:ZnO particle in which the co-catalyst was not loaded, the electrode for photolytic water splitting reaction was manufactured by using the same way as that in Example 4-2-1. In 0.1 M of 100 mL phosphate buffer solution (pH=7.0) prepared such that cobalt nitrate becomes 0.5 mM, the obtained electrode for photolytic water splitting reaction is irradiated with AM 1.5 G of light, and then was subjected to the photo-electrodeposition with 10 µA/cm² of current density for five minutes. Thereafter, the electrode was extracted, washed, and then the evaluation of the electrode was performed similar to Example 4-2-1. The results are indicated in the following Table 11.

TABLE 11

| Optical semiconductor, reaction conditions | mA/cm$^2$@ 1.2 V$_{RHE}$ |
|---|---|
| Example 4-2-1 BaTaO$_2$N, Microwave (150° C., 60 min) | 1.66 |
| Example 4-2-2 GaN: ZnO, Microwave (150° C., 60 min) | 0.57 |
| Comparative Example 4-2-1 BaTaO$_2$N, Immersing and loading of ammine (70° C., dry for one night) | 1.47 |
| Comparative Example 4-2-2 GaN:ZnO, Electrodiposition | 0.2 |

As apparent from the results of Table 11, even in a case of using BaTaO$_2$N or GaN:ZnO as an optical semiconductor, it was possible to obtain the photocatalyst particle having very high photolytic water splitting activity by loading the co-catalyst with the microwave irradiation.

4.3. Change of Optical Semiconductor Shape

In the above-described examples, the case of using the particulate optical semiconductor was examined. Hereinafter, a case of using a sheet-like optical semiconductor will be examined.

Example 4-3

Manufacturing Electrode for LaTiO$_2$N/TaN/Ta

With the following procedure, a LaTiO$_2$N layer (the thickness of 300 nm) and a TaN layer (the thickness of 200 nm) were manufactured on a Ta substrate so as to manufacture a three-layered electrode sheet (LaTiO$_2$N/TaN/Ta electrode).

First, TaN having a film thickness of 200 nm was formed on a Ta mirror substrate (10 mm×10 mm) by sputtering, and then La$_2$Ti$_2$O$_7$ having a film thickness of 300 nm was formed (under the conditions of 90 W, working pressure: 1×10$^0$ Pa, and three hours by using a sputtering machine manufactured by Eicoh Co., Ltd.) by sputtering on the formed TaN, and was nitrated for one hour in nitriding furnace under the conditions of an ammonia flow rate of 200 sccm and a temperature of 900° C., thereby obtaining an electrode sheet.

Loading of Co-Catalyst

Figure 29:
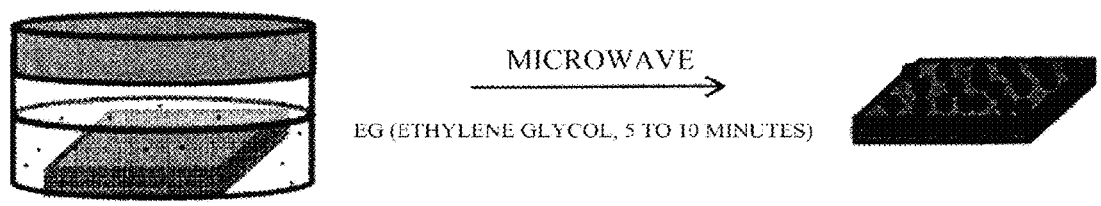
FIG. 29 is a schematic view illustrating procedure of manufacturing an electrode for photolytic water splitting reaction according to Example 4-3.

As illustrated in FIG. 29, the above-described electrode sheet was immersed into the ethylene glycol solution (20 mL) containing Co(NH$_3$)$_6$Cl$_3$ (3 mg), and then the solution was closed in a container. Thereafter, the inside of the container was irradiated with the microwave (frequency of 2.45 GHz) such that a temperature of the inside was raised up to 150° C., and then the container was heated and held for 6 minutes. After then, the electrode sheet was extracted, washed with water, and thereby the electrode for photolytic water splitting reaction in which CoO$_x$ was loaded as the co-catalyst was obtained. Similar to the case of Example 4-2-1, the evaluation was performed on the obtained electrode for photolytic water splitting reaction.

Comparative Example 4-3

A three-layered electrode sheet (LaTiO$_2$N/TaN/Ta electrode) was manufactured by using the same way as that in Example 4-3. In 0.1 M of 100 mL phosphate buffer solution (pH=7.0) prepared such that cobalt nitrate becomes 0.5 mM, the obtained electrode sheet is irradiated with AM 1.5 G of light, and then was subjected to the photo-electrodeposition with 10 μA/cm$^2$ of current density for five minutes. Thereafter, the electrode sheet was extracted, washed with water, and then the evaluation of the electrode was performed similar to Example 4-3.

Figure 30:
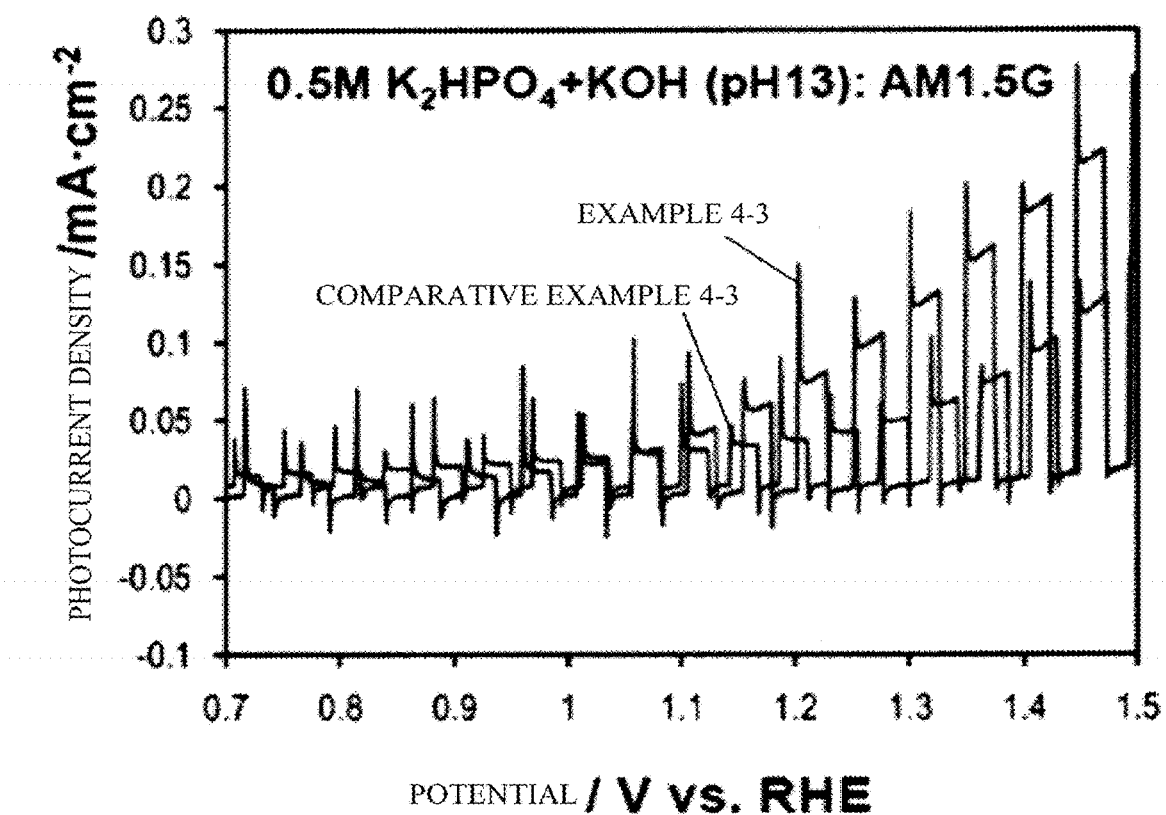
FIG. 30 is a diagram illustrating a PEC evaluation result in Example 4-3 and Comparative Example 4-3.

FIG. 30 illustrates a PEC evaluation result of the electrode for photolytic water splitting reaction according to Example 4-3 and Comparative Example 4-3. As apparent from FIG. 30, the photolytic water splitting activity is improved in Example 4-3 as compared with Comparative Example 4-3. As such, it is found that with not only the particulate optical semiconductor but also the optical semiconductor having various types of molds such as a sheet-like optical semiconductor, the same effect according to the present invention is exhibited by loading the co-catalyst with the irradiation of the microwave.

INDUSTRIAL APPLICABILITY

An optical semiconductor and a photocatalyst obtained by a producing method of the present invention have high water splitting activity, and are preferably used particularly in photolytic water splitting reaction for producing hydrogen and/or oxygen through water splitting reaction by utilizing sunlight.

Although the invention has been described in detail using specific embodiments, it will be apparent to those skilled in the art that various modifications and variations are possible without departing from the spirit and scope of the invention. Note that, the present application is based on Japanese Patent Application (Japanese Patent Application No. 2014-236221) filed on Nov. 21, 2014, Japanese Patent Application (Japanese Patent Application No. 2015-013006) filed on Jan. 27, 2015, and Japanese Patent Application (Japanese Patent Application No. 2015-161131) filed on Aug. 18, 2015, and its entirety is incorporated by reference.

REFERENCE SIGNS LIST

1$a$, 1$b$, 11$a$, 11$b$ optical semiconductor
2', 12' co-catalyst source
2, 12, 22 co-catalyst
3, 13 solvent
4, 14 solution
5, 15, 25 solid-liquid mixture
10, 20, 30 composite photocatalyst
101 optical semiconductor
102 co-catalyst
105 solution
110 photocatalyst
201$a$ oxide, oxynitride or nitride
201$b$ oxide, oxynitride or nitride
202 solution

The invention claimed is:

1. A composite photocatalyst which comprises a plurality of types of optical semiconductors on which a co-catalyst is loaded, wherein the co-catalyst is present on the surfaces of the plurality of types of the optical semiconductors, and is present in a state of being interposed between bonding surfaces of the plurality of types of the optical semiconductors, or is present in a state of covering the optical semiconductor.

2. The composite photocatalyst according to claim 1, wherein at least one of the plurality of types of optical semiconductors is an oxide, a nitride, an oxynitride, a chalcogenide, or an oxychalcogenide each of which contains one or more elements selected from the group consisting of Ti, V, Ga, Zn, Bi, Nb, and Ta.

3. The composite photocatalyst according to claim 2, wherein at least one of the plurality of types of optical semiconductors is $BaTaO_2N$, $BaNbO_2N$, TaON, $Ta_3N_5$, $LaTiO_2N$, $BiVO_4$, GaN:ZnO, or a partial substitution thereof.

4. The composite photocatalyst according to claim 1, wherein the co-catalyst contains Co.

5. A method of producing a composite photocatalyst as claimed in claim 1 from a plurality of types of optical semiconductors, the method comprising:
heating a solid-liquid mixture containing a solvent, a co-catalyst or a co-catalyst source and the plurality of types of optical semiconductors by irradiating the solid-liquid mixture with microwave.

6. The method of producing a composite photocatalyst according to claim 5, wherein before the microwave irradiation, the co-catalyst source in the solid-liquid mixture is present in a state of being dissolved in a solvent.

7. The method of producing a composite photocatalyst according to claim 5, wherein before the microwave irradiation, the co-catalyst or a co-catalyst source and the plurality of types of optical semiconductors in the solid-liquid mixture are present as a solid in the solvent, and the cocatalyst or a co-catalyst source is in a state of being loaded on the plurality of types of optical semiconductors.

8. The method of producing a composite photocatalyst according to claim 7, further comprising as a pre-step of the heating:
first loading a co-catalyst on a first optical semiconductor by heating with the microwave in a state where the first optical semiconductor is brought into contact with a solution in which a co-catalyst source is dissolved;
second loading a co-catalyst on a second optical semiconductor by heating with the microwave in a state where the second optical semiconductor is brought into contact with the solution in which the co-catalyst source is dissolved; and
mixing the first optical semiconductor on which the co-catalyst is loaded and the second optical semiconductor on which the co-catalyst is loaded, into the solvent so as to obtain the solid-liquid mixture.

9. The method of producing a composite photocatalyst according to claim 8, wherein the microwave irradiation is performed in a closed system in the first loading step and the second loading step.

10. The method of producing a composite photocatalyst according to claim 8, further comprising as pre-steps of the first loading and the second loading:
bringing a solution of one or more types of organic acids containing a polyorganic acid into contact with a surface of an oxide, an oxynitride, or a nitride containing one or more elements selected from Ti, V, Ga, Ge, Nb, La, and Ta; and
collecting the oxide, the oxynitride, or the nitride which remains as a solid content after the organic acid contact, wherein the collected solid contents are used as the first optical semiconductor and the second optical semiconductor.

11. The method of producing a composite photocatalyst according to claim 5, wherein at least one of the plurality of types of optical semiconductors is an oxide, a nitride, an oxynitride, a chalcogenide, or an oxychalcogenide, each of which contains one or more elements selected from the group consisting of Ti, V, Ga, Zn, Bi, Nb, and Ta.

12. The method of producing a composite photocatalyst according to claim 11, wherein at least one of the plurality of types of optical semiconductors is $BaTaO_2N$, $BaNbO_2N$, TaON, $Ta_3N_5$, $LaTiO_2N$, $BiVO_4$, GaN:ZnO, or a partial substitution thereof.

13. The method of producing a composite photocatalyst according to claim 5, wherein the co-catalyst or the co-catalyst source contains Co or Co-ion.

14. The method of producing a composite photocatalyst according to claim 5, wherein the solvent is water, alcohols, or a mixed solvent thereof.

15. The method of producing a composite photocatalyst according to claim 5, wherein the solid-liquid mixture is heated by being irradiated with the microwave in a closed system in the heating.

16. The method of producing a composite photocatalyst according to claim 15, wherein pressure in the closed system is higher than pressure outside the system.

17. The method of producing a composite photocatalyst according to claim 5, further comprising as a pre-step of the heating:
bringing a solution of one or more types of organic acids containing a polyorganic acid into contact with a surface of an oxide, an oxynitride, or a nitride each of which contains one or more elements selected from Ti, V, Ga, Ge, Nb, La, and Ta; and
collecting the oxide, the oxynitride, or the nitride which remains as a solid content after the organic acid contact step,
wherein the collected solid contents are used as the plurality of types of optical semiconductors.

18. The method of producing a composite photocatalyst according to claim 17, wherein the organic acid is a polysulfonic acid.

19. The method of producing a composite photocatalyst according to claim 17, wherein the organic acid has an aryl group.

20. The method of producing a composite photocatalyst according to claim 17, wherein the organic acid has a weight average molecular weight in a range of 1,000 to 1,000,000.

* * * * *